(12) United States Patent
Yang et al.

(10) Patent No.: US 11,070,854 B2
(45) Date of Patent: Jul. 20, 2021

(54) BROADCASTING SIGNAL TRANSMISSION DEVICE, BROADCASTING SIGNAL RECEPTION DEVICE, BROADCASTING SIGNAL TRANSMISSION METHOD, AND BROADCASTING SIGNAL RECEPTION METHOD

(71) Applicant: LG ELECTRONICS INC., Seoul (KR)

(72) Inventors: Seungryul Yang, Seoul (KR); Minsung Kwak, Seoul (KR); Kyoungsoo Moon, Seoul (KR); Woosuk Ko, Seoul (KR); Sungryong Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/387,216

(22) Filed: Apr. 17, 2019

(65) Prior Publication Data

US 2019/0246147 A1    Aug. 8, 2019

Related U.S. Application Data

(62) Division of application No. 15/579,482, filed as application No. PCT/KR2016/007278 on Jul. 6, 2016, now Pat. No. 10,721,502.

(51) Int. Cl.
*H04N 21/235* (2011.01)
*H04N 21/44* (2011.01)
(Continued)

(52) U.S. Cl.
CPC ..... *H04N 21/235* (2013.01); *H04N 21/23892* (2013.01); *H04N 21/435* (2013.01);
(Continued)

(58) Field of Classification Search
CPC .......... H04N 21/235; H04N 21/23892; H04N 21/435; H04N 21/44; H04N 21/462;
(Continued)

(56) References Cited

U.S. PATENT DOCUMENTS 6,389,055 B1    5/2002  August et al.
6,430,233 B1 *  8/2002  Dillon ................... H04B 7/10
                                                              375/316
(Continued)

FOREIGN PATENT DOCUMENTS

CN    103283251 A    9/2013
CN    104412609 A    3/2015
(Continued)

*Primary Examiner* — Nathan J Flynn
*Assistant Examiner* — Caroline Somera
(74) *Attorney, Agent, or Firm* — Birch, Stewart, Kolasch & Birch, LLP

(57) ABSTRACT

A method and device for processing a broadcast content are discussed. The method includes receiving a broadcast content of a broadcast service; displaying the broadcast content on a display screen; and detecting a first user input, in response to the first user input that is to display an ESG: displaying the ESG overlaid on the broadcast content being displayed on the display screen; determining whether information for controlling execution of an application, that is embedded in an audio component of the broadcast content, is received; and controlling the execution of the application based on the determination; or in response to the first user input that indicates a mute mode to mute sound of the broadcast content: determining whether information for controlling execution of the application, that is embedded in a video component of the broadcast content, is received; and controlling the execution of the application based on the determination.

18 Claims, 41 Drawing Sheets

Related U.S. Application Data

(60) Provisional application No. 62/189,187, filed on Jul. 6, 2015, provisional application No. 62/202,180, filed on Aug. 7, 2015, provisional application No. 62/207,356, filed on Aug. 19, 2015, provisional application No. 62/213,626, filed on Sep. 3, 2015, provisional application No. 62/214,181, filed on Sep. 3, 2015.

(51) Int. Cl.
| | |
|---|---|
| *H04N 21/462* | (2011.01) |
| *H04N 21/4722* | (2011.01) |
| *H04N 21/61* | (2011.01) |
| *H04N 21/858* | (2011.01) |
| *H04N 21/435* | (2011.01) |
| *H04N 21/643* | (2011.01) |
| *H04N 21/8358* | (2011.01) |
| *H04N 21/2389* | (2011.01) |

(52) U.S. Cl.
CPC ........... *H04N 21/44* (2013.01); *H04N 21/462* (2013.01); *H04N 21/4722* (2013.01); *H04N 21/61* (2013.01); *H04N 21/643* (2013.01); *H04N 21/8358* (2013.01); *H04N 21/858* (2013.01); *H04N 21/8586* (2013.01)

(58) Field of Classification Search
CPC .. H04N 21/4722; H04N 21/61; H04N 21/643; H04N 21/8358; H04N 21/858; H04N 21/8586
USPC .......................................................... 725/112
See application file for complete search history.

(56) References Cited

U.S. PATENT DOCUMENTS

| | | | |
|---|---|---|---|
| 10,687,121 B2* | 6/2020 | Yang | .................... H04N 21/236 |
| 2010/0226526 A1 | 9/2010 | Modro et al. | |
| 2013/0167120 A1 | 6/2013 | Amano et al. | |
| 2014/0013374 A1 | 1/2014 | Oh et al. | |
| 2014/0181887 A1 | 6/2014 | Moon et al. | |
| 2015/0052570 A1 | 2/2015 | Lee et al. | |
| 2016/0094895 A1* | 3/2016 | Stadelmeier | .......... H04L 1/0015 |
| | | | 725/33 |
| 2016/0148334 A1* | 5/2016 | Petrovic | ................ G10L 19/018 |
| | | | 382/100 |
| 2016/0149886 A1 | 5/2016 | Korokithakis et al. | |
| 2016/0182973 A1 | 6/2016 | Winograd et al. | |
| 2016/0309238 A1 | 10/2016 | An et al. | |
| 2017/0078765 A1 | 3/2017 | Yang et al. | |
| 2017/0251282 A1 | 8/2017 | Winograd et al. | |
| 2018/0098111 A1 | 4/2018 | Yang et al. | |
| 2018/0213266 A1 | 7/2018 | Kwak et al. | |
| 2019/0246147 A1 | 8/2019 | Yang et al. | |
| 2019/0320241 A1 | 10/2019 | An et al. | |

FOREIGN PATENT DOCUMENTS

| | | |
|---|---|---|
| CN | 104471951 A | 3/2015 |
| WO | WO 01/99325 A2 | 12/2001 |
| WO | WO 2005/089476 A2 | 9/2005 |
| WO | WO 2014/200248 A1 | 12/2014 |
| WO | WO 2015/030467 A1 | 3/2015 |

* cited by examiner

FIG. 3

| Syntax | No. of Bits | Format |
|---|---|---|
| LLS_table( ) { | | |
|   LLS_table_id | 8 | uimsbf |
|   provider_id | 8 | uimsbf |
|   LLS_table_version | 8 | uimsbf |
|   switch (LLS_table_id) { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       System Time | var | Sec. 6.4 |
|       break; | | |
|     case 0x04: | | |
|       CAP | var | Sec. 6.5 |
|       break; | | |
|     default: | | |
|       reserved | var | |
|   } | | |
| } | | | t3010

| Element or Attribute Name | | | | Use | Data Type |
|---|---|---|---|---|---|
| SLT | | | | | |
| | @bsid | | | 1 | unsignedShort |
| | @sltCapabilities | | | 0..1 | string |
| | sltInetUrl | | | 0..1 | anyURL |
| | | @urlType | | 1 | unsignedByte |
| | Service | | | 1..N | |
| | | @serviceID | | 1 | unsignedShort |
| | | @sltSvcSeqNum | | 1 | unsignedByte |
| | | @protected | | 0..1 | boolean |
| | | @majorChannelNo | | 0..1 | 1...999 |
| | | @minorChannelNo | | 0..1 | 1...999 |
| | | @serviceCategory | | 1 | unsignedByte |
| | | @shortServiceName | | 0..1 | string |
| | | @hidden | | 0..1 | boolean |
| | | @broadbandAccessRequired | | 0..1 | boolean |
| | | @svcCapabilities | | 0..1 | string |
| | | BroadcastSvcCignaling | | 0..1 | |
| | | | @slsProtocol | 1 | unsignedByte |
| | | | @slsMajorProtocolVersion | 1 | unsignedByte |
| | | | @slsMinorProtocolVersion | 1 | unsignedByte |
| | | | @slsPlpID | 0..1 | unsignedByte |
| | | | @slsDestinationIpAddress | 1 | string |
| | | | @slsDestinationUdpPort | 1 | unsignedShort |
| | | | @slsSourceIpAddress | 1 | string |
| | | svcInetUrl | | 0..N | anyURL |
| | | | @urlType | 1 | unsignedByte | t3020

FIG. 4

| Element or Attribute Name | | | | Use | Data Type |
|---|---|---|---|---|---|
| bundleDescription | | | | | |
|   userServiceDescription | | | | | |
| | @globalServiceID | | | 1 | anyURL |
| | @serviceID | | | 1 | unsignedShort |
| | @serviceStatus | | | 0..1 | boolean |
| | @fullMPDUri | | | 1 | anyURL |
| | @sTSIDUri | | | 1 | anyURL |
| | name | | | 0..N | string |
| | | @lang | | 1 | language |
| | serviceLanguage | | | 0..N | language |
| | capabilityCode | | | 0..1 | string |
| | deliveryMethod | | | 1..N | |
| | | broadcastAppService | | 1..N | |
| | | | basePattern | 1..N | string |
| | | unicastAppService | | 0..N | |
| | | | basePattern | 1..N | string |

— t4010

| Element or Attribute Name | | Use | Data Type |
|---|---|---|---|
| S-TSID | | | |
| | @serviceID | 1 | unsignedShort |
| | RS | 1..N | |
| |   @bsid | 0..1 | unsignedShort |
| |   @sIpAddr | 0..1 | string |
| |   @dIpAddr | 0..1 | string |
| |   @dport | 0..1 | unsignedShort |
| |   @PLPID | 0..1 | unsignedByte |
| |   LS | 1..N | |
| |     @tsi | 1 | unsignedInt |
| |     @PLPID | 0..1 | unsignedByte |
| |     @bw | 0..1 | unsignedInt |
| |     @startTime | 0..1 | dateTime |
| |     @endTime | 0..1 | dateTime |
| |     ScrFlow | 0..1 | scrFlowType |
| |     RepairFlow | 0..1 | rprFlowType | t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 6
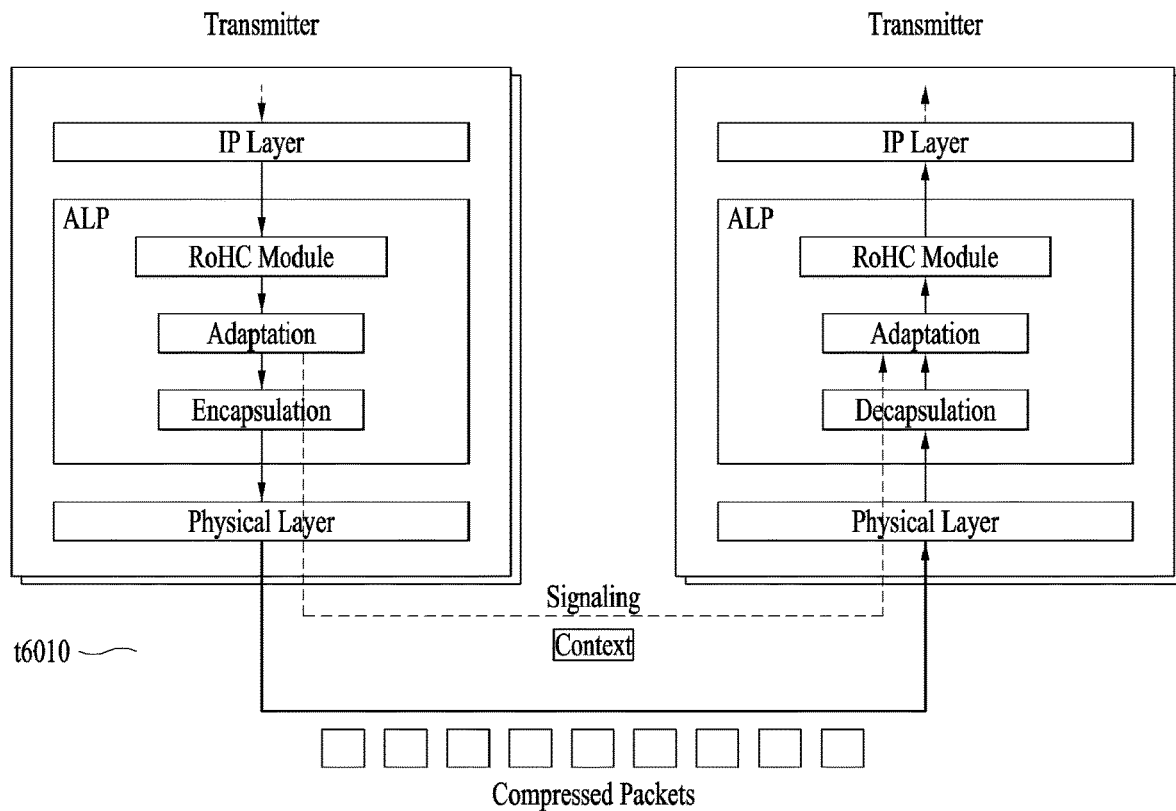
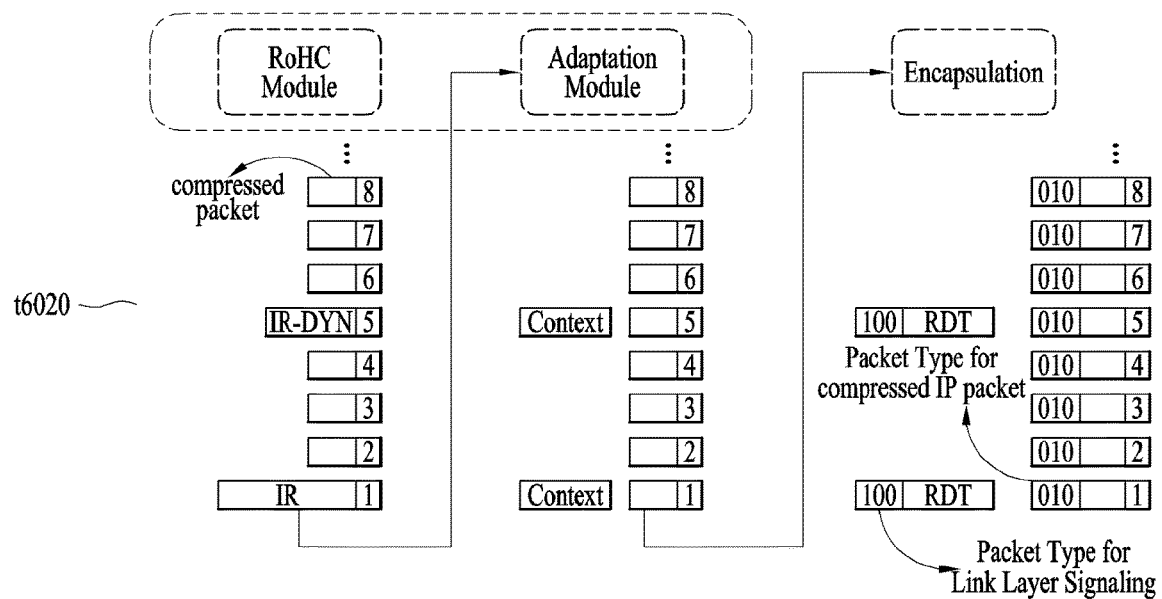

FIG. 7

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i++) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if (SID_flag == "1") { | | |
|             SID | 8 | uimsbf |
|         } | | |
|         if (compressed_flag == "1') { | | |
|             context_id | 8 | uimsbf |
|         } | | |
|     } | | |
| } | | |

Data can be carried by WM
- ID of the contents source
- Timestamp
- Interactive App. URL
- Timestamp's Type
- URL Protocol Type
- Application Event
- Destination Type
- etc...

| Timestamp size value | Description |
|---|---|
| 00 | 1 byte |
| 01 | 2 bytes |
| 10 | 4 bytes |
| 11 | 8 bytes |

| Timestamp size unit value | Description |
|---|---|
| 000 | Mili-sec |
| 001 | Sec |
| 010 | Min |
| 011 | Hour |
| 100 | Variable Unit |
| 101 to 111 | Reservee for future use |

| URL Protocol type value | Description |
|---|---|
| 000 | NULL |
| 001 | http:// |
| 010 | https:// |
| 011 | ws:// |
| 100 to 111 | reserved for future use |

FIG. 20

| Event Value | Description |
|---|---|
| 000 | Prepare |
| 001 | Execute |
| 010 | Suspend |
| 011 | Kill |
| 100 to 111 | reserved for future use |

FIG. 21

| Destination Type (8 bits) | Description |
|---|---|
| 0x00 | Targeting all device classes |
| 0x01 | Targeting devices of the TV class |
| 0x02 | Targeting of the Smartphone class |
| 0x03 | Targeting of the Tablet class |
| 0x04 | Targeting of the PC class |
| 0x05 | Remote server |
| 0x06 to 0xFF | reserved for future use |

FIG. 22

| Timestamp Size = 01 | Timestamp Value = 000 | Timestamp = 5005 | Content Identifier | Event = 001 | Destination = 0x02 | URL Protocol Type = 001 | URL = atsc.org |
|---|---|---|---|---|---|---|---|

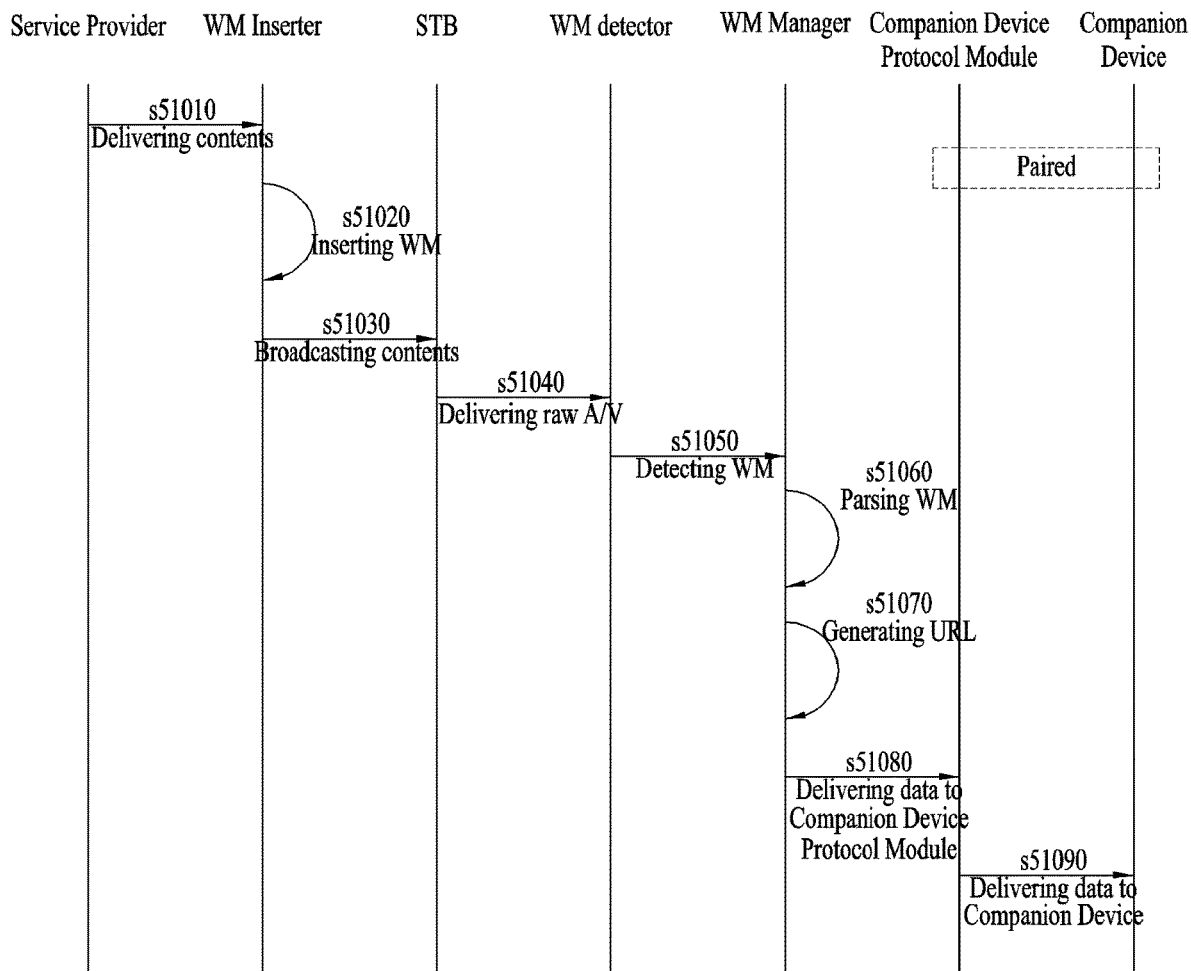

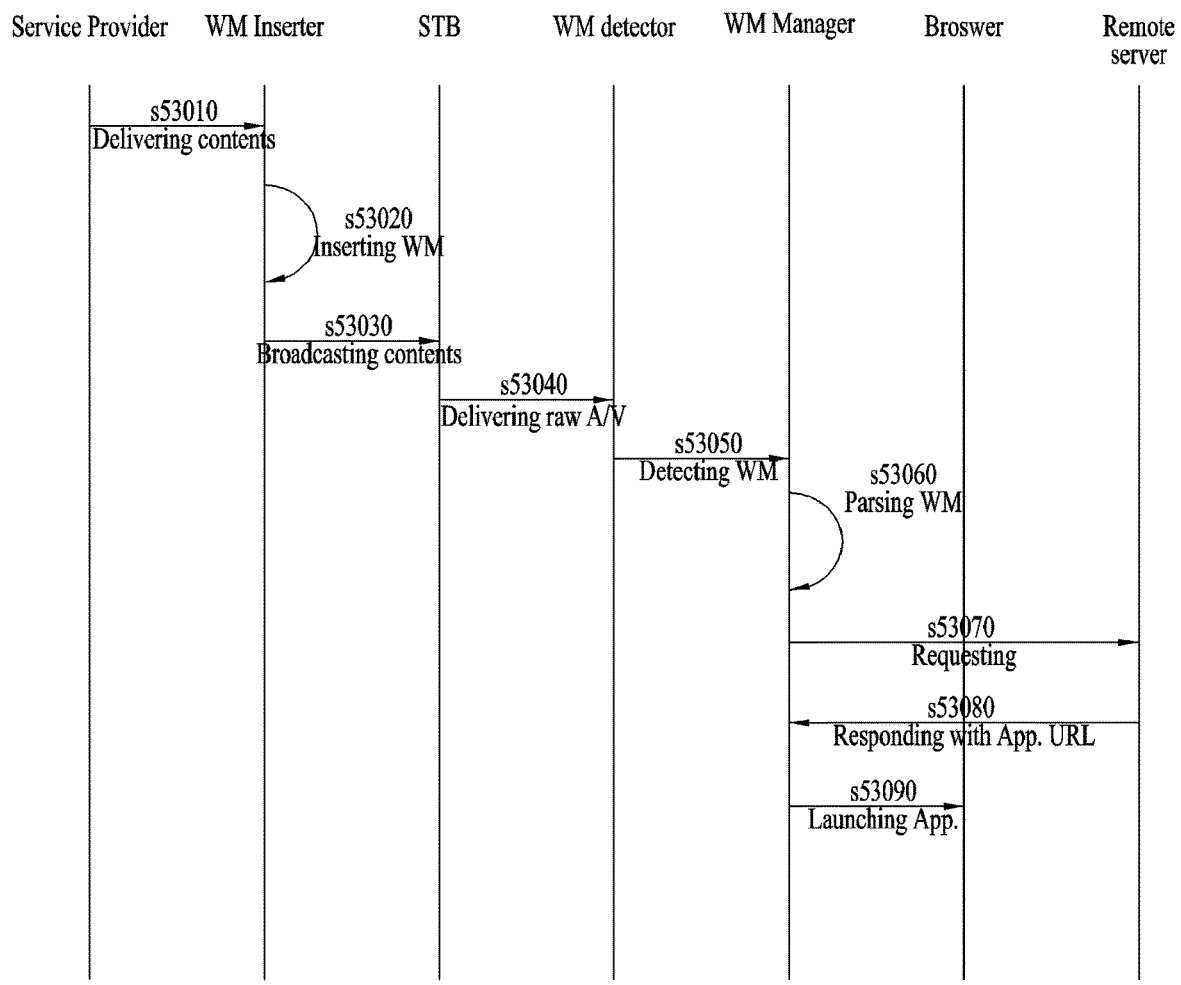

FIG. 27

| Delivery Type (1 bit) = 1 | WMId (8 bits) | Block Number (8 bits) | Last Block Number (8 bits) | Block Length (7 bits) | | | | |
|---|---|---|---|---|---|---|---|---|
| Timestamp Size (2 bits) | Timestamp Unit (3 bits) | Timestamp (var) | Content Identifier Flag (1 bit) | Event (1 bit) | Destination Flag (1 bit) | URL Protocol Flag (1 bit) | URL Flag (1 bit) | Reserved (2 bits) |
| Payload | | | | | | | | |

FIG. 28

| Delivery Type = 1 | WMId = 0x00 | Block Number = 0x00 | Last Block Number = 0x01 | Block Length | | | | |
|---|---|---|---|---|---|---|---|---|
| Timestamp Size = 01 | Timestamp Unit = 000 | Timestamp = 5005 | Content Identifier Flag = 1 | Event Flag = 1 | Destination Flag = 1 | URL Protocol Flag = 1 | URL Flag = 1 | Reserved |
| Content Identifier | Event = 001 | Destination = 0x02 | URL Protocol Type = 001 | URL = atsc.org | | | | |

Payload

FIG. 29

| Delivery Type = 1 | WMId = 0x00 | Block Number = 0x01 | Last Block Number = 0x01 | Block Length | | | | |
|---|---|---|---|---|---|---|---|---|
| Timestamp Size = 01 | Timestamp Unit = 000 | Timestamp = 10005 | Content Identifier Flag = 0 | Event Flag = 0 | Destination Flag = 0 | URL Protocol Flag = 0 | URL Flag = 1 | Reserved |
| URL = /apps/app1.html | | | | | | | | |

Payload

FIG. 32

| | Domain Type | Server URL | Time Stamp | Trigger Type |
|---|---|---|---|---|
| Small Domain → | 2 bits | 30 bits | 17 bits | 1 bits |
| Medium Domain → | 2 bits | 22 bits | 25 bits | 1 bits |
| Large Domain → | 2 bits | 18 bits | 29 bits | 1 bits |

FIG. 33 t502010

| | Domain Type | Server URL | Time Stamp | Trigger Type | Service ID | Content ID |
|---|---|---|---|---|---|---|
| Small Domain → | 2 bits | 30 bits | 17 bits | 2 bits | X bits | Y bits |
| Medium Domain → | 2 bits | 22 bits | 25 bits | 2 bits | X bits | Y bits |
| Large Domain → | 2 bits | 18 bits | 29 bits | 2 bits | X bits | Y bits | t502020

| Server URL | Time Stamp | Trigger Type | Service ID | Content ID |
|---|---|---|---|---|
| 18 bits | 17 bits | 2 bits | X bits | Y bits |

FIG. 34

| DOM | NSC | Server Code | Interval code | Trg |
|---|---|---|---|---|
| 1 | 1 | 22 (4.2million) | 25 (1.59 yrs) | 1 |

| DOM | NSC | Server Code | Interval code | Trg |
|---|---|---|---|---|
| 1 | 1 | 18 (262,144) | 29 (25.5 yrs) | 1 |

FIG. 35

| Video Watermark Payload ||
|---|---|
| Original Video WM Payload | Copy of Audio WM Payload |
| ... | 50 bits |

| Syntax | No. of Bits | Format |
|---|---|---|
| watermark_payload( ) { | | |
|   run_in_pattern | 16 | 0xEB52 |
|   for (i=0; i<N; i++) { | | |
|     wm_message( ) | var | uimsbf |
|   } | | |
|   for (i=0; i<M; i++) { | | |
|     zero_pad | 8 | 0x00 |
|   } | | |
|   AudioWM duplicate | 50 | uimsbf |
| } | | |

| Syntax | No. of Bits | Format |
|---|---|---|
| wm_message () { | | |
|     wm_message_id | 8 | uimsbf |
|     wm_message_length | 8 | uimsbf |
|     wm_message_sequence | 4 | uimsbf |
|     fragment_number | 2 | uimsbf |
|     last_fragment | 2 | uimsbf |
|     switch (wm_message_id) { | | |
|         case 0x01: | | |
|             content_id_message() | var | Sec. 5.1.4 |
|             break; | | |
|         case 0x02: | | |
|             channel_id_message() | var | Sec. 5.1.5 |
|             break; | | |
|         case 0x03: | | |
|             uri_message() | var | Sec. 5.1.6 |
|             break; | | |
|         case 0x04: | | |
|             vp1_message() | 160 | Sec. 5.1.7 |
|             break; | | |
|         case 0x04: | | |
|             dynamic_event_message() | var | Sec.5.1.8 |
|             break; | | |
|         case 0x05: | | |
|             EA_message() | var | Sec. 5.1.9 |
|             break; | | |
|         default: | 8 | uimsbf |
|             reserved | var | |
|     } | | |
|     if (fragment_number == last_fragment) && (!fragment_number)) { | | |
|         message_CRC_32 | 32 | uimsbf |
|     } | | |
|     CRC_32 | 32 | uimsbf |
| } | | |

FIG. 45 t45010:

| Dom | Server Code | Interval Code | Trg |
|---|---|---|---|
| 1 (sm) | 31 (2billion) | 17 (56 hrs) | 1 |

| Dom | Server Code | Interval Code | Trg |
|---|---|---|---|
| 1 (lg) | 23 (8.4 mill) | 25 (1.59 yrs) | 1 | t45020:

| Dom | EA | Server Code | Interval Code | Trg |
|---|---|---|---|---|
| 1 (sm) | 1 | 30 (536 mill) | 17 (56 hrs) | 1 |

| Dom | EA | Server Code | Interval Code | Trg |
|---|---|---|---|---|
| 1 (lg) | 1 | 22 (4.2 mill) | 25 (1.59 yrs) | 1 | t45030:

| EA | Server Code | Interval Code | Trg |
|---|---|---|---|
| 1 | 22 (4.2 mill) | 26 (3.2 yrs) | 1 | t45040:

| Syntax | No. of Bits | Format |
|---|---|---|
| small_domain() { | | |
|     server_field | 31 (or 30) | uimsbf |
|     Interval_field | 16 (or 17) | uimsbf |
|     query_flag | 1 | bslbf |
|     EA_flag | 1 | bslbf |
| } | | | t45050:

| Syntax | No. of Bits | Format |
|---|---|---|
| large_domain() { | | |
|     server_field | 23 (or 22) | uimsbf |
|     Interval_field | 24 (or 25) | uimsbf |
|     query_flag | 1 | bslbf |
|     EA_flag | 1 | bslbf |
| } | | | t45060:

| Domain Type | Server Code Range (hexadecimal) | Interval Code Range (hexadecimal) |
|---|---|---|
| Small Domain | 00000000 - 7FFFFFFF | 00000000 - 0001FFFF |
| Large Domain | 00000000 - 007FFFFF | 00000000 - 01FFFFFF |

FIG. 46 t46010

| Syntax | No. of Bits | Format |
|---|---|---|
| emergency_alert_message() { | | |
|     CAP_message_ID_length (N1) | 8 | uimsbf |
|     CAP_message_ID | 8*(N1) | |
|     CAP_message_url_length (N2) | 8 | uimsbf |
|     CAP_message_url | 8*(N2) | |
|     expires | 32 | uimsbf |
|     urgency | 1 | bslbf |
|     severity_cerainty | 4 | bslbf |
|     reserved | 3 | "111" |
| } | | | t46030

| Syntax | No. of Bits | Format |
|---|---|---|
| emergency_alert_message() { | | |
|     EA_present_flag | 1 | bslbf |
|     EA_present_version | ?? | |
|     CAP_message_ID | ?? | |
|     CAP_message_version | ?? | |
|     CAP_message_url_length(N1) | 8 | uimsbf |
|     CAP_message_url | 8*(N1) | |
|     EA_message_overlay_area | 8 | |
| } | | | t46020

| Syntax | No. of Bits | Format |
|---|---|---|
| emergency_alert_message() { | | |
|     EA_present_flag | 1 | bslbf |
|     EA_present_version | | |
|     EA_message_ID | | |
|     EA_message_version | | |
|     EA_message_text_length (N1) | 8 | uimsbf |
|     EA_message_text | 8*(N1) | |
|     EA_rich_media_url_length (N2) | 8 | uimsbf |
|     EA_rich_media_url | 8*(N2) | |
| } | | | t46040

| Syntax | No. of Bits | Format |
|---|---|---|
| emergency_alert_message() { | | |
|     EA_present_flag | 1 | bslbf |
|     EA_present_version | | |
|     EA_message_ID | | |
|     EA_message_version | | uimsbf |
|     EA_message_text_length (N1) | | |
|     EA_message_text | 8*(N1) | |
|     EA_rich_media_url_length (N2) | 8 | uimsbf |
|     EA_rich_media_url | 8*(N2) | |
|     EAT_server_url_length (N3) | 8 | uimsbf |
|     EAT_server_url | 8*(N3) | |
|     EAM_position | 7 | |
| } | | |

FIG. 47 t47010

| Dom | DE Flag | Server Code | Interval Code | Trg |
|---|---|---|---|---|
| 1 | 1 | 22 (4.2 million) | 25 (1.59 yrs) | 1 | t47020

| Syntax | No. of Bits | Format |
|---|---|---|
| small_domain() { | | |
|     server_field | 31 | uimsbf |
|     Interval_field | 17 | uimsbf |
|     query_flag | 1 | bslbf |
|     dynamic_event_flag | 1 | bslbf |
| } | | | t47030

| Syntax | No. of Bits | Format |
|---|---|---|
| large_domain() { | | |
|     server_field | 23 | uimsbf |
|     Interval_field | 25 | uimsbf |
|     query_flag | 1 | bslbf |
|     dynamic_event_flag | 1 | bslbf |
| } | | |

FIG. 48 t48010

| Syntax | No. of Bits | Format |
|---|---|---|
| dynamic_event_message() { | | |
|     delivet_potocol_type | 4 | uimsbf |
|     reserved | 4 | '1111' |
|     id (delivery_protocol_type == '1' \|\| '2'){ | | |
|         scheme_id_uri_length (N1) | 8 | uimsbf |
|         scheme_id_uri_string | 8*N1 | |
|         value_strlen (N2) | 8 | uimsbf |
|         value_string | 8*N2 | |
|         timescale | 32 | uimsbf |
|         presentation_time | 32 | uimsbf |
|         reserved | 6 | '111111' |
|         presentation_time_ms | 10 | |
|         duration | 32 | uimsbf |
|         id | 32 | uimsbf |
|         data_length (N3) | 8 | uimsbf |
|         data | 8*N3 | |
|     } else { | | |
|         reserved1_field_length (N1) | 8 | uimsbf |
|         reserved1 | 8*N1 | '11..' |
|     } | | |
| } | | | t48020

| Syntax | No. of Bit | Format |
|---|---|---|
| Dynamic_event_message() { | | |
|     delivery_protocol_type | 2 | uimsbf |
|     reserved | 6 | |
|     if(delivery_protocol_type == '1'\|'2'{ | | |
|         scheme_id_uri_length (N1) | 8 | uimsbf |
|         scheme_id_uri_string | 8*N1 | |
|         value_length (N2) | 8 | uimsbf |
|         value_string | 8*N2 | |
|         timescale | 32 | uimsbf |
|         presentation_time | 32 | uimsbf |
|         duration | 32 | uimsbf |
|         id | 32 | uimsbf |
|         data_length (N3) | 8 | uimsbf |
|         data | 8*N3 | |
|         if (delivery_protocol_type =='1' /* ROUTE */{ | | |
|             MPD_id_length (N4) | 8 | |
|             MPD_id | 8*N4 | |
|             period_id_length (N5) | 8 | |
|             period_id | 8*N5 | |
|         } | | |
|         else if (delivery_protocol_type ==?? /* MMTP */ { | | |
|             asset_id_length (N6) | 8 | |
|             asset_id | 8*N6 | |
|             MPU_seq_num | 32 | |
|         } | | |
|         else /* future extension */{ | | |
|         } | | |
|     } | | |
| } | | |

FIG. 49

| Element or Attribute Name | | | | Use | Data Type |
|---|---|---|---|---|---|
| RecoveryDataTable | | | | 1 | |
| | thisComponent | | | 1 | |
| | | serverCode | | 0..1 | integer |
| | | intervalCode | | 0..1 | integer |
| | | componentDescription | | 1 | object |
| | querySpread | | | 0..1 | integer |
| | otherComponent | | | 0..N | object |
| | contentID | | | 0..N | |
| | | type | | 1 | string |
| | | cid | | 1 | string |
| | | validFrom | | 1 | string (date-time) |
| | | validUntil | | 0..1 | string (date-time) |
| | sourceID | | | 0..1 | |
| | | country | | 1 | integer |
| | | bsid | | 1 | integer |
| | | majorChannelNo | | 1 | integer |
| | | minorChannelNo | | 1 | integer |
| | service | | | 1 | |
| | | serviceId | | 1 | integer |
| | | sltSvcSeqNum | | 1 | integer |
| | | slsProtocol | | 0..1 | integer |
| | | slsMajorProtocolVersion | | 0..1 | integer |
| | | slsMinorProtocolVersion | | 0..1 | integer |
| | | svcInetUrl | | 1 | integer |
| | | | urlType | 1 | unsignedByte |
| | | | urlValue | 0..N | string (uri) |

FIG. 50

| Element or Attribute Name | | | Use | Data Type |
|---|---|---|---|---|
| RecoveryFile | | | 1 | |
| | @intervalCode | | 1 | unsigned integer |
| | @anchorCode | | 1 | unsigned integer |
| | choice | | 1 | |
| | | @mpdPresentationTime | 1 | duration |
| | | @mpdId | 1 | string |
| | | @mttPresentationTime | 1 | long |
| | @querySpread | | 0..1 | unsignedByte |
| | @bsid | | 1 | unsignedShort |
| | Service | | 1 | |
| | | @serviceId | 1 | unsignedShort |
| | | @serviceInfoVersion | 1 | unsignedByte |
| | | @protected | 0..1 | boolean |
| | | @majorChanNum | 1 | unsigned 0..999 |
| | | @minorChanNum | 1 | Unsigned 0..999 |
| | | @serviceCategory | 1 | unsignedByte |
| | | @serviceName | 0..1 | String |
| | | @slsProtocolType | 1 | unsignedByte |
| | | @slsProtocolVersion | 1 | unsignedByte |
| | | @serviceLanguage | 0..1 | 3-char string |
| | | @serviceCapabilities | 0..1 | string |
| | | @signalingUri | 1 | anyURI |
| | choice | | | |
| | | @eventSocketUri | 1 | anyURI |
| | | @eventRequestUri | 1 | anyURI |
| | | @esgUri | 0..1 | anyURI |

BROADCASTING SIGNAL TRANSMISSION DEVICE, BROADCASTING SIGNAL RECEPTION DEVICE, BROADCASTING SIGNAL TRANSMISSION METHOD, AND BROADCASTING SIGNAL RECEPTION METHOD

CROSS-REFERENCE TO RELATED APPLICATIONS

This application is a Divisional Application of U.S. patent application Ser. No. 15/579,482, filed on Dec. 4, 2017, which is the National Phase of PCT International Application No. PCT/KR2016/007278, filed on Jul. 6, 2016, which claims priority under 35 U.S.C. 119(e) to U.S. Provisional Application Nos. 62/189,187, filed on Jul. 6, 2015, 62/202, 180, filed on Aug. 7, 2015, 62/207,356, filed on Aug. 19, 2015, 62/213,626 filed on Sep. 3, 2015 and 62/214,181 filed on Sep. 3, 2015, all of which are hereby expressly incorporated by reference into the present application.

BACKGROUND OF THE INVENTION

Field of the Invention

The present invention relates to an apparatus for transmitting a broadcast signal, an apparatus for receiving a broadcast signal and methods for transmitting and receiving a broadcast signal.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

The present invention provides a system capable of effectively supporting future broadcast services in an environment supporting future hybrid broadcasting using terrestrial broadcast networks and the Internet and related signaling methods.

The present invention can effectively support future broadcast services in an environment supporting future hybrid broadcast using terrestrial broadcast networks and the Internet. In addition, the present invention proposes architectures and schemes for efficiently using video WM and audio WM.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram showing a low level signaling (LLS) table and a service list table (SLT) according to one embodiment of the present invention;

FIG. 4 is a diagram showing a USBD and an S-TSID delivered through ROUTE according to one embodiment of the present invention;

FIG. 5 is a diagram showing a USBD delivered through an MMT according to one embodiment of the present invention;

FIG. 6 is a diagram showing link layer operation according to one embodiment of the present invention;

FIG. 7 is a diagram showing a link mapping table (LMT) according to one embodiment of the present invention;

FIG. 20 is a diagram illustrating the meaning of each value of an event field according to an embodiment of the present invention;

FIG. 21 is a diagram illustrating the meaning of each value of a destination type field according to an embodiment of the present inventions;

FIG. 22 is a diagram illustrating a data structure to be inserted into a WM according to embodiment #1 of the present invention;

FIG. 23 is a sequence diagram illustrating a procedure of processing the data structure to be inserted into a WM according to embodiment #1 of the present invention;

FIG. 24 is a diagram illustrating a data structure to be inserted into a WM according to embodiment #2 of the present invention;

FIG. 25 is a sequence diagram illustrating a procedure of processing the data structure to be inserted into a WM according to embodiment #2 of the present invention;

FIG. 26 is a diagram illustrating a data structure to be inserted into a WM according to embodiment #3 of the present invention;

FIG. 27 is a diagram illustrating a data structure to be inserted into a WM according to embodiment #4 of the present invention;

FIG. 28 is a diagram illustrating a data structure to be inserted into the first WM in embodiment #4 of the present invention;

FIG. 29 is a diagram illustrating a data structure to be inserted into the second WM in embodiment #4 of the present invention;

FIG. 32 is a diagram illustrating a structure of a watermark payload according to another embodiment of the present invention;

FIG. 33 is a diagram illustrating a modification of a watermark payload structure using service/content information according to an embodiment of the present invention;

FIG. 34 is a diagram illustrating a modification of a watermark payload structure using an NSC field according to an embodiment of the present invention;

FIG. 35 is a diagram illustrating a watermark payload structure for linking between video-audio watermarks according to an embodiment of the present invention;

FIG. 44 is a diagram illustrating a wm_message( ) format according to another embodiment of the present invention;

FIG. 45 is a diagram illustrating an audio WM payload structure according to another embodiment of the present invention;

FIG. 46 is a diagram illustrating a structure of an EA_message( ) according to an embodiment of the present invention;

FIG. 47 is a diagram illustrating an audio WM payload structure according to another embodiment of the present invention;

FIG. 48 is a diagram illustrating a structure of a dynamic_event_message( ) according to an embodiment of the present invention;

FIG. 49 is a diagram illustrating a recovery file format according to an embodiment of the present invention;

FIG. 50 is a diagram illustrating a recovery file format according to another embodiment of the present invention;

DETAILED DESCRIPTION OF THE EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
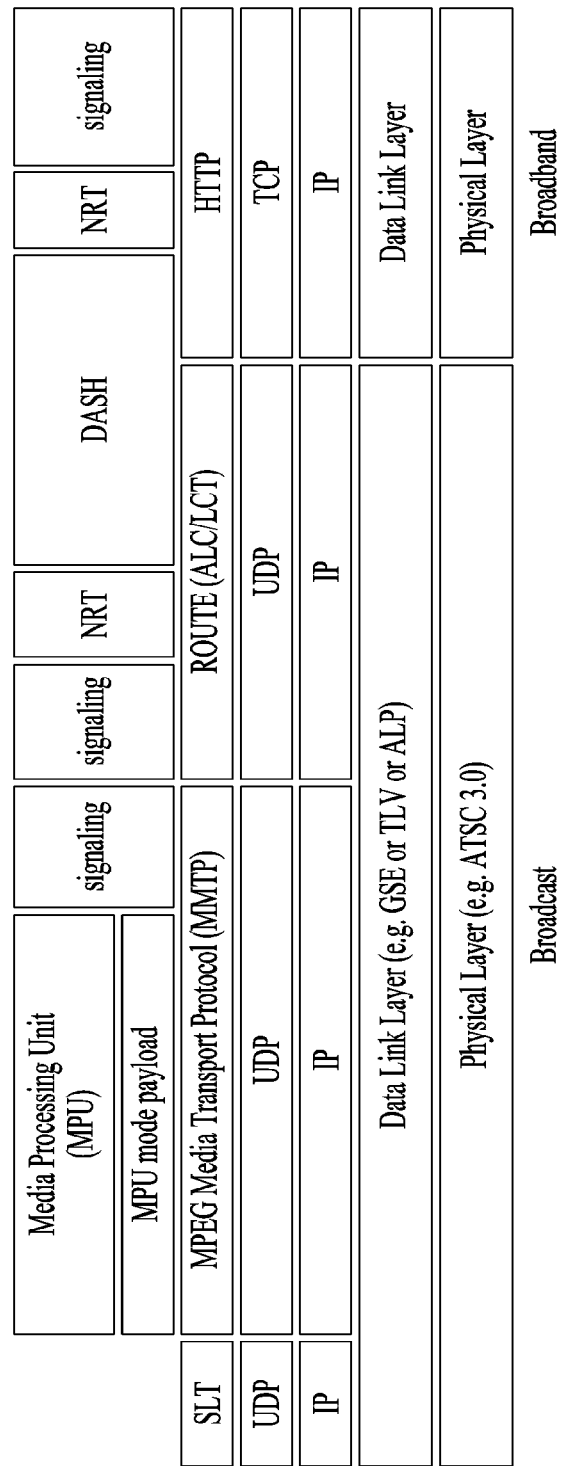
FIG. 1 is a diagram showing a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG).

Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
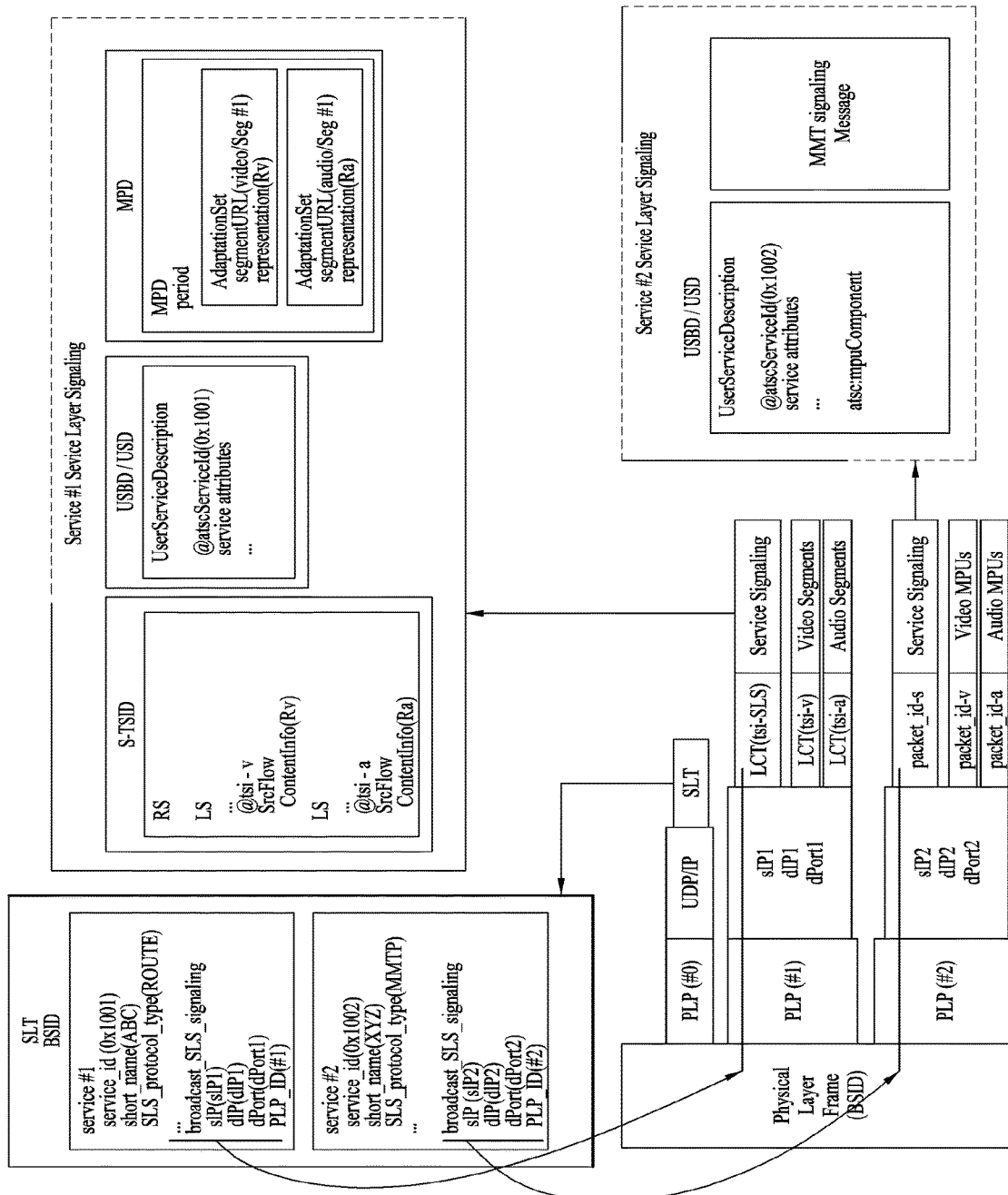
FIG. 2 is a diagram showing a service discovery procedure according to one embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages. [98] The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may include a header compressor/decompressor and/or an adaptation module. The IP header compressor (RoHC compressor) may reduce the size of each IP packet based on a RoHC method. Then, adaptation module may extract context information and generate signaling information from each packet stream. A receiver may parse signaling information related to a corresponding packet stream and attach the context information to the packet stream. The RoHC decompressor may recover a packet header to reconfigure an original IP packet. Hereinafter, IP header compression may refer to only IP header compressor via header compressor and may be a concept that combines IP header compression and the adaptation procedure by the adaptation module. This may be the same as in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may construct link layer signaling using context information and/or configuration parameters. The adaptation function may periodically transmit link layer signaling through each physical frame using a previous configuration parameter and/or context information.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT may be transmitted whenever context information is changed. In some embodiments, the RDT may be transmitted in every physical frame. To transmit the RDT in every physical frame, a previous RDT may be re-used.

The receiver may select a first PLP and first acquire signaling information of the SLT, the RDT, etc., prior to acquisition of a packet stream. Upon acquiring the signaling information, the receiver may combine the information to acquire mapping of service—IP information—context information—PLP. That is, the receiver may recognize IP streams through which a service is transmitted, IP streams transmitted through a PLP, and so on and acquire corresponding context information of the PLPs. The receiver may select a PLP for delivery of a specific packet stream and decode the PLP. The adaptation module may parse the context information and combine the context information with the compressed packets. Thereby, the packet stream may be recovered and transmitted to the RoHC de compressor. Then, decompression may be started. In this case, the receiver may detect an IR packet and start decompression from a first received IR packet according to an adaptation mode (mode 1), may detect an IR-DYN packet and start decompression from a first received IR-DYN packet (mode 2), or may start decompression from any general compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may be referred to as multicast. Information on IP streams or transport sessions transmitted through one PLP may be acquired through the LMT. In contrast, information on through which PLP a specific transport session is delivered may be acquired.

The LMT may be transmitted through any PLP identified to deliver the LLS. Here, the PLP for delivering the LLS may be identified by an LLS flag of L1 detail signaling information of a physical layer. The LLS flag may be a flag field indicating whether the LLS is transmitted through a corresponding PLP with respect to each PLP. Here, the L1 detail signaling information may be correspond to PLS2 data which will be described later.

That is, the LMT may also be transmitted through the same PLP along with the LLS. Each LMT may describe mapping between PLPs and IP address/port as described above. As described above, the LLS may include an SLT and, in this regard, the IP address/ports described by the LMT may be any IP address/ports related to any service, described by the SLT transmitted through the PLP such as a corresponding LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, as described above, the LMT may describe PLPs of all IP addresses/ports related to all service described by the SLT transmitted together using a PLP loop.

The signaling_type field may indicate the type of signaling information delivered by the table. The value of signaling_type field for the LMT may be set to 0x01. The signaling_type field may signaling_type field may be omitted. The PLP_ID field may identify a target PLP to be described. When the PLP loop is used, each PLP_ID field may identify each target PLP. Fields from the PLP_ID field may be included in the PLP loop. Here, the below-described PLP_ID field may be an identifier of one PLP of the PLP loop and the following fields may be fields corresponding to the corresponding PLP.

The num_session field may indicate the number of higher layer sessions delivered through the PLP identified by the PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field, and/or a context_id field.

The src_IP_add field, the dst_IP_add field, the src_UDP_port field, and the dst_UDP_port field may indicate the source IP address, the destination IP address, the source UDP port and the destination UDP port of the transport session among the higher layer sessions delivered through the PLP identified by the PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. When header compression is applied (compressed_flag=1), the RDT may be present and the PLP ID field of the RDT may have the same value as the corresponding PLP_ID field related to the present compressed_flag field.

The SID field may indicate a sub stream ID (SID) of link layer packets for delivering a corresponding transfer session. The link layer packets may include the SID having the same value as the present SID field in the optional header. Thereby, the receiver may filter link layer packets using information of the LMT and SID information of a link layer packet header without parsing of all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
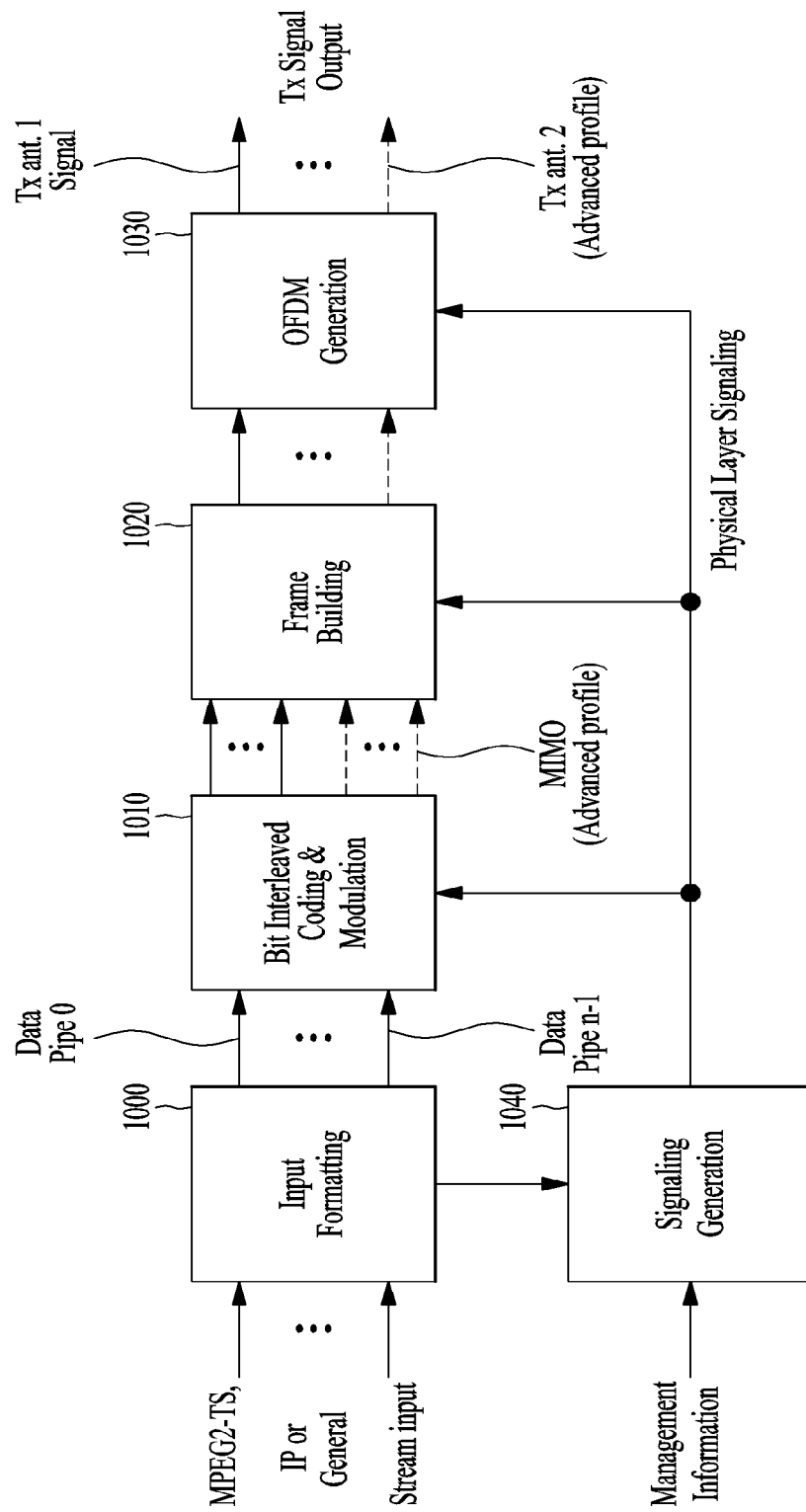
FIG. 8 is a diagram showing a structure of a broadcast signal transmission device of a next-generation broadcast service according to an embodiment of the present invention.

FIG. 8 is a diagram showing a structure of a broadcast signal transmission device of a next-generation broadcast service according to an embodiment of the present invention.

The broadcast signal transmission device of the next-generation broadcast service according to an embodiment of the present invention may include an input format block 1000, a bit interleaved coding & modulation (BICM) block 1010, a frame building block 1020, an orthogonal frequency division multiplexing (OFDM) generation block 1030, and a signaling generation block 1040. An operation of each block of the broadcast signal transmission device will be described.

According to an embodiment of the present invention, input data may use IP stream/packet and MPEG2-TS as main input format and other stream types may be handled as a general stream.

The input format block 1000 may demultiplex each input stream using one or more data pipes to which independent coding and modulation are applied. The data pipe may be a basic unit for robustness control and may affect quality of service (QoS). One or more services or service components may affect one data pipe. The data pipe may be a logical channel in a physical layer for delivering service data or metadata for delivering one or more services or service components.

Since QoS is dependent upon the characteristics of a service provided by the broadcast signal transmission device of the next-generation broadcast service according to an embodiment of the present invention, data corresponding to each service needs to be processed via different methods.

The BICM block 1010 may include a processing block applied to a profile (or system) to which MIMO is not applied and/or a processing block of a profile (or system) to which MIMO is applied and may include a plurality of processing blocks for processing each data pipe.

The processing block of the BICM block to which MIMO is not applied may include a data FEC encoder, a bit interleaver, a constellation mapper, a signal space diversity (SSD) encoding block, and a time interleaver. The processing block of the BICM block to which MIMO is applied is different from the processing block of the BICM to which MIMO is not applied in that a cell word demultiplexer and an MIMO encoding block are further included.

The data FEC encoder may perform FEC encoding on an input BBF to generate a FECBLOCK procedure using external coding (BCH) and internal coding (LDPC). The external coding (BCH) may be a selective coding method. The bit interleaver may interleave output of the data FEC encoder to achieve optimized performance using a combination of the LDPC code and a modulation method. The constellation mapper may modulate cell word from a bit interleaver or a cell word demultiplexer using QPSK, QAM-16, irregular QAM (NUQ-64, NUQ-256, NUQ-1024), or irregular constellation (NUC-16, NUC-64, NUC-256, NUC-1024) and provide a power-normalized constellation point. NUQ has an arbitrary type but QAM-16 and NUQ have a square shape. All of the NUQ and the NUC may be particularly defined with respect to each code rate and signaled by parameter DP_MOD of PLS2 data. The time interleaver may be operated at a data pipe level. A parameter of the time interleaving may be differently set with respect to each data pipe.

The time interleaver according to the present invention may be positioned between the BICM chain and the frame builder. In this case, the time interlever according to the present invention may selectively use a convolution interleaver (CI) and a block interleaver (BI) according to a physical layer pipe (PLP) mode or may use all. The PLP according to an embodiment of the present invention may be a physical path used using the same concept as the aforementioned DP and its term may be changed according to designer intention. The PLP mode according to an embodiment of the present invention may include a single PLP mode or a multiple PLP mode according to the number of PLPs processed by the broadcast signal transmitter or the broadcast signal transmission device. Time interleaving using different time interleaving methods according to a PLP mode may be referred to as hybrid time interleaving.

A hybrid time interleaver may include a block interleaver (BI) and a convolution interleaver (CI). In the case of PLP_NUM=1, the BI may not be applied (BI off) and only the CI may be applied. In the case of PLP_NUM>1, both the BI and the CI may be applied (BI on). The structure and operation of the CI applied in the case of PLP_NUM>1 may be different from those of the CI applied in the case of PLP_NUM=1. The hybrid time interleaver may perform an operation corresponding to a reverse operation of the aforementioned hybrid time interleaver.

The cell word demultiplexer may be used to divide a single cell word stream into a dual cell word stream for MIMO processing. The MIMO encoding block may process output of the cell word demultiplexer using a MIMO encoding method. The MIMO encoding method according to the present invention may be defined as full-rate spatial multiplexing (FR-SM) for providing increase in capacity via relatively low increase in complexity at a receiver side. MIMO processing may be applied at a data pipe level. When a pair of constellation mapper outputs, NUQ $e_{1,i}$ and $e_{2,i}$ is input to a MIMO encoder, a pair of MIMO encoder outputs, g1,i and g2,i may be transmitted by the same carrier k and OFDM symbol 1 of each transmission antenna.

The frame building block 1020 may map a data cell of an input data pipe in one frame to an OFDM symbol and perform frequency interleaving for frequency domain diversity.

According to an embodiment of the present invention, a frame may be divided into a preamble, one or more frame signaling symbols (FSS), and a normal data symbol. The preamble may be a special symbol for providing a combination of basic transmission parameters for effective transmission and reception of a signal. The preamble may signal a basic transmission parameter and a transmission type of a frame. In particular, the preamble may indicate whether an emergency alert service (EAS) is currently provided in a current frame. The objective of the FSS may be to transmit PLS data. For rapid synchronization and channel estimation and rapid decoding of PLS data, the FSS may have a pipe pattern with higher density than a normal data symbol.

The frame building block may include a delay compensation block for adjusting timing between a data pipe and corresponding PLS data to ensure co-time between a data pipe and corresponding PLS data at a transmitting side, a cell mapper for mapping a PLS, a data pipe, an auxiliary stream, a dummy stream, and so on to an active carrier of an OFDM symbol in a frame, and a frequency interleaver.

The frequency interleaver may randomly interleave a data cell received from the cell mapper to provide frequency diversity. The frequency interleaver may operate with respect to data corresponding to an OFDM symbol pair including two sequential OFDM symbols or data corresponding to one OFDM symbol using different interleaving seed orders in order to acquire maximum interleaving gain in a single frame.

The OFDM generation block 1030 may modulate an OFDM carrier by the cell generated by the frame building block, insert a pilot, and generate a time domain signal for transmission. The corresponding block may sequentially insert guard intervals and may apply PAPR reduction processing to generate a last RF signal.

The signaling generation block 1040 may generate physical layer signaling information used in an operation of each functional block. The signaling information according to an embodiment of the present invention may include PLS data. The PLS may provide an element for connecting a receiver to a physical layer data pipe. The PLS data may include PLS1 data and PLS2 data.

The PLS1 data may be a first combination of PLS data transmitted to FSS in a frame with fixed size, coding, and modulation for transmitting basic information on a system as well as a parameter required to data PLS2 data. The PLS1 data may provide a basic transmission parameter including a parameter required to receive and decode PLS2 data. The PLS2 data may be a second combination of PLP data transmitted to FSS for transmitting more detailed PLS data of a data pipe and a system. PLS2 signaling may further include two types of parameters of PLS2 static data (PLS2-STAT data) and PLS2 dynamic data (PLS2-DYN data). The PLS2 static data may be PLS2 data that is static during duration of a frame group and the PLS2 dynamic data may be PLS2 data that is dynamically changed every frame.

The PLS2 data may include FIC_FLAG information. A fast information channel (FIC) may be a dedicated channel for transmitting cross-layer information for enabling fast service acquisition and channel scanning. The FIC_FLAG information may indicate whether a fast information channel (FIC) is used in a current frame group via a 1-bit field. When a value of the corresponding field is set to 1, the FIC may be provided in the current frame. When a value of the corresponding field is set to 0, the FIC may not be transmitted in the current frame. The BICM block 1010 may include a BICM block for protecting PLS data. The BICM block for protecting the PLS data may include a PLS FEC encoder, a bit interleaver, and a constellation mapper.

The PLS FEC encoder may include a scrambler for scrambling PLS1 data and PLS2 data, a BCH encoding/zero inserting block for performing external encoding on the scrambled PLS 1 and 2 data using a BCH code shortened for PLS protection and inserting a zero bit after BCH encoding, a LDPC encoding block for performing encoding using an LDPC code, and an LDPC parity puncturing block. Only the PLS1 data may be permutated before an output bit of zero insertion is LDPC-encoded. The bit interleaver may interleave each of the shortened and punctured PLS1 data and PLS2 data, and the constellation mapper may map the bit-interleaved. PLS1 data and PLS2 data to constellation.

A broadcast signal reception device of a next-generation broadcast service according to an embodiment of the present invention may perform a reverse operation of the broadcast signal transmission device of the next-generation broadcast service that has been described with reference to FIG. 8.

The broadcast signal reception device of a next-generation broadcast service according to an embodiment of the present invention may include a synchronization & demodulation module for performing demodulation corresponding to a reverse operation performed by the broadcast signal transmission device, a frame parsing module for parsing an input signal frame to extract data transmitted by a service selected by a user, a demapping & decoding module for converting an input signal into bit region data, deinterleaving bit region data as necessary, performing demapping on mapping applied for transmission efficiency, and correcting error that occurs in a transmission channel for decoding, an output processor for performing a reverse operation of various compression/signal processing procedures applied by the broadcast signal transmission device, and a signaling decoding module for acquiring and processing PLS information from the signal demodulated by the synchronization & demodulation module. The frame parsing module, the demapping & decoding module, and the output processor may perform the functions using the PLS data output from the signaling decoding module.

Hereinafter, the timer interleaver will be described. A time interleaving group according to an embodiment of the present invention may be directly mapped to one frame or may be spread over $P_1$ frames. In addition, each time interleaving group may be divided into one or more ($N_{TI}$) time interleaving blocks. Here, each time interleaving block may correspond to one use of a time interleaver memory. A time interleaving block in the time interleaving group may include different numbers of XFECBLOCK. In general, the time interleaver may also function as a buffer with respect to data pipe data prior to a frame generation procedure.

The time interleaver according to an embodiment of the present invention may be a twisted row-column block interleaver. The twisted row-column block interleaver according to an embodiment of the present invention may write a first XFECBLOCK in a first column of the time interleaving memory, write a second XFECBLOCK in a next column, and write the remaining XFECBLOCKs in the time interleaving block in the same manner. In an interleaving array, a cell may be read in a diagonal direction to a last row from a first row (a leftmost column as a start column is read along a row in a right direction). In this case, to achieve single memory deinterleaving at a receiver side irrespective of the number of XFECBLOCK in the time interleaving block, the interleaving array for the twisted row-column block interleaver may insert a virtual XFECBLOCK into the time interleaving memory. In this case, to achieve single memory deinterleaving at a receiver side, the virtual XFECBLOCK needs to be inserted into another frontmost XFECBLOCK.

Figure 9:
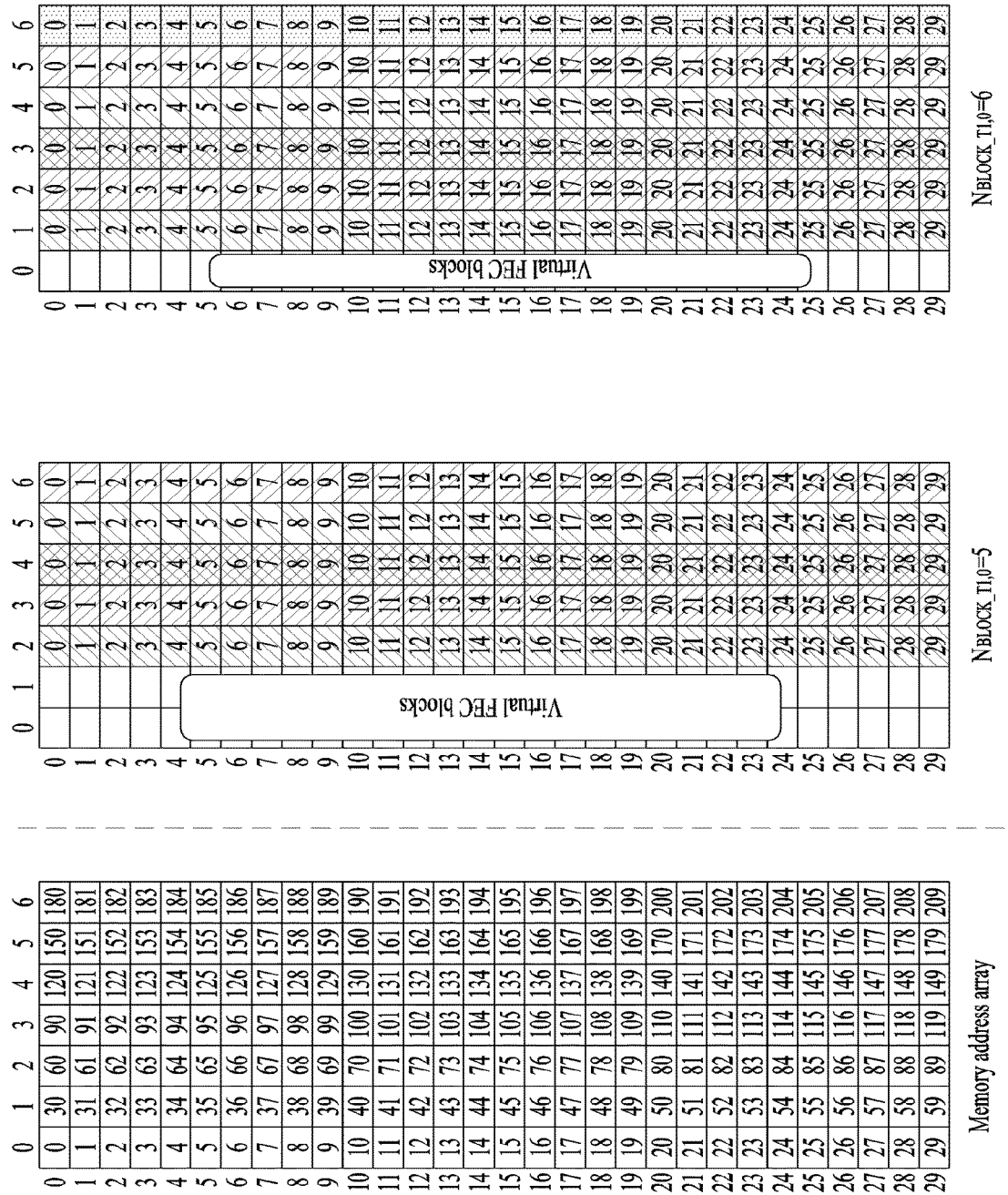
FIG. 9 is a writing operation of a time interleaver according to an embodiment of the present invention.

FIG. 9 is a writing operation of a time interleaver according to an embodiment of the present invention.

A block shown in a left portion of the drawing shows a TI memory address array and a block shown in a right portion of the drawing shows a writing operation when two or one virtual FEC blocks are inserted into a frontmost group of TI groups with respect to two consecutive TI groups.

The frequency interleaver according to an embodiment of the present invention may include an interleaving address generator for generating an interleaving address to be applied to data corresponding to a symbol pair.

Figure 10:
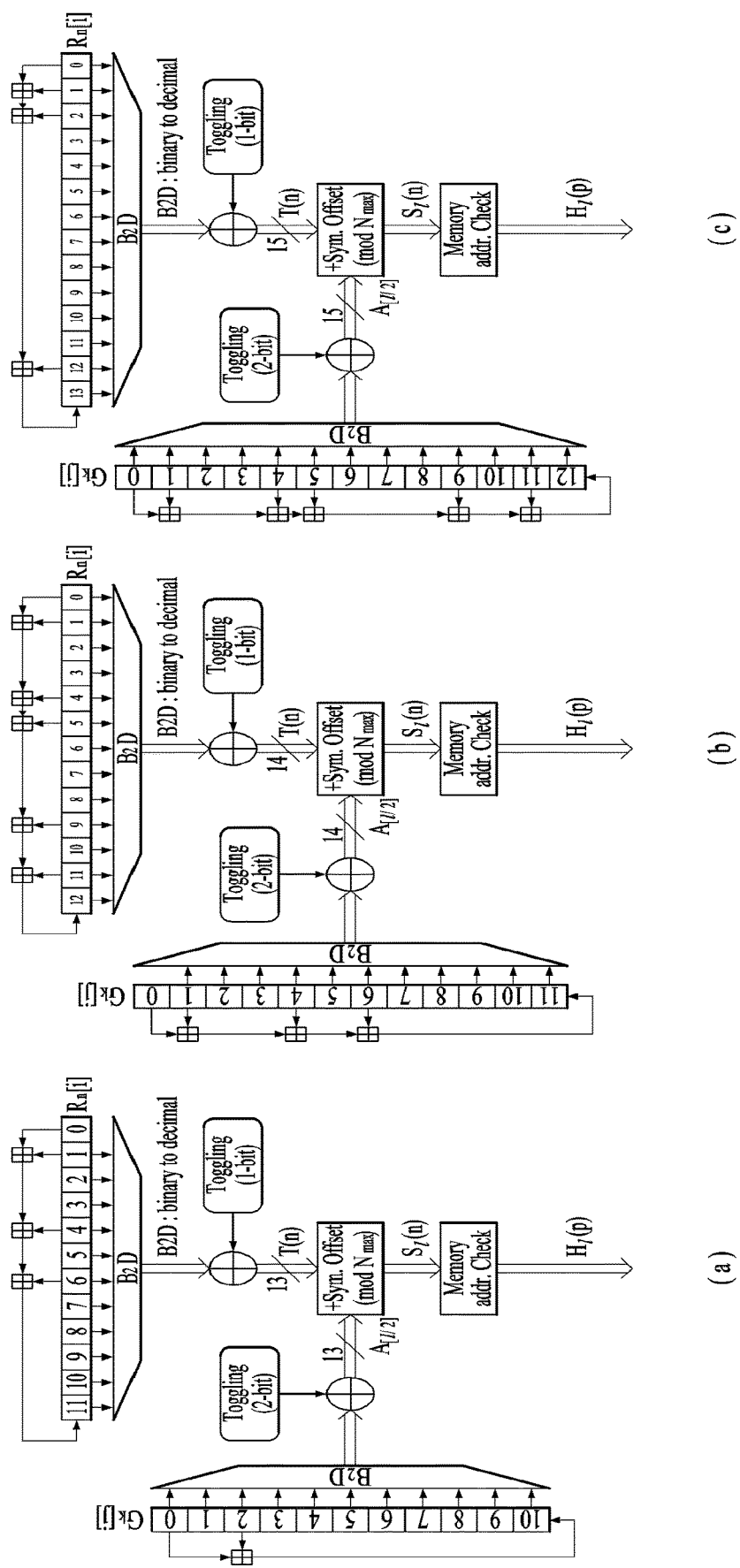
FIG. 10 is a block diagram of an interleaving address generator including a main-PRBS generator and a sub-PRBS generator according to each FFT mode, included in the frequency interleaver, according to an embodiment of the present invention.

FIG. 10 is a block diagram of an interleaving address generator including a main-PRBS generator and a sub-PRBS generator according to each FFT mode, included in the frequency interleaver, according to an embodiment of the present invention.

(a) is a block diagram of an interleaving address generator with respect to a 8K FFT mode. (b) is a block diagram of an interleaving address generator with respect to a 16K FFT mode, and (c) is a block diagram of an interleaving address generator with respect to a 32K FFT mode.

An interleaving procedure with respect to an OFDM symbol pair may use one interleaving sequence and will be described below. First, an available data cell (output cell from a cell mapper) to be interleaved in one OFDM symbol $O_{m,1}$ may be defined as $O_{m,1}=[x_{m,1,0}, \ldots, x_{m,1,p}, \ldots, x_{m,1,Ndata-1}]$ with respect to l=0, ..., $N_{sym}-1$. In this case, $x_{m,1,p}$ may be a $p^{th}$ cell of a $l^{th}$ OFDM symbol in a $m^{th}$ frame and $N_{data}$ may be the number of data cells. In the case of a frame signaling symbol, $N_{data}=C_{FSS}$, in the case of normal data, $N_{data}=C_{data}$, and in the case of a frame edge symbol, $N_{data}=C_{FES}$. In addition, the interleaving data cell may be defined as $P_{m,1}=[v_{m,1,0}, \ldots, v_{m,1,Ndata-1}]$ with respect to l=0, ..., $N_{sym}-1$.

With respect to an OFDM symbol pair, an interleaved OFDM symbol pair may be given according to $v_{m,1,Hi(p)}=x_{m,1,p}$, p=0, ..., $N_{data}-1$ for a first OFDM symbol of each pair and given according to $v_{m,1,p}=x_{m,1,Hi(p)}$, p=0, ..., $N_{data}-1$ for a second OFDM symbol of each pair. In this case, $H_i(p)$ may be an interleaving address generated based on a cyclic shift value (symbol offset) of a PRBS generator and a sub-PRBS generator.

Figure 11:
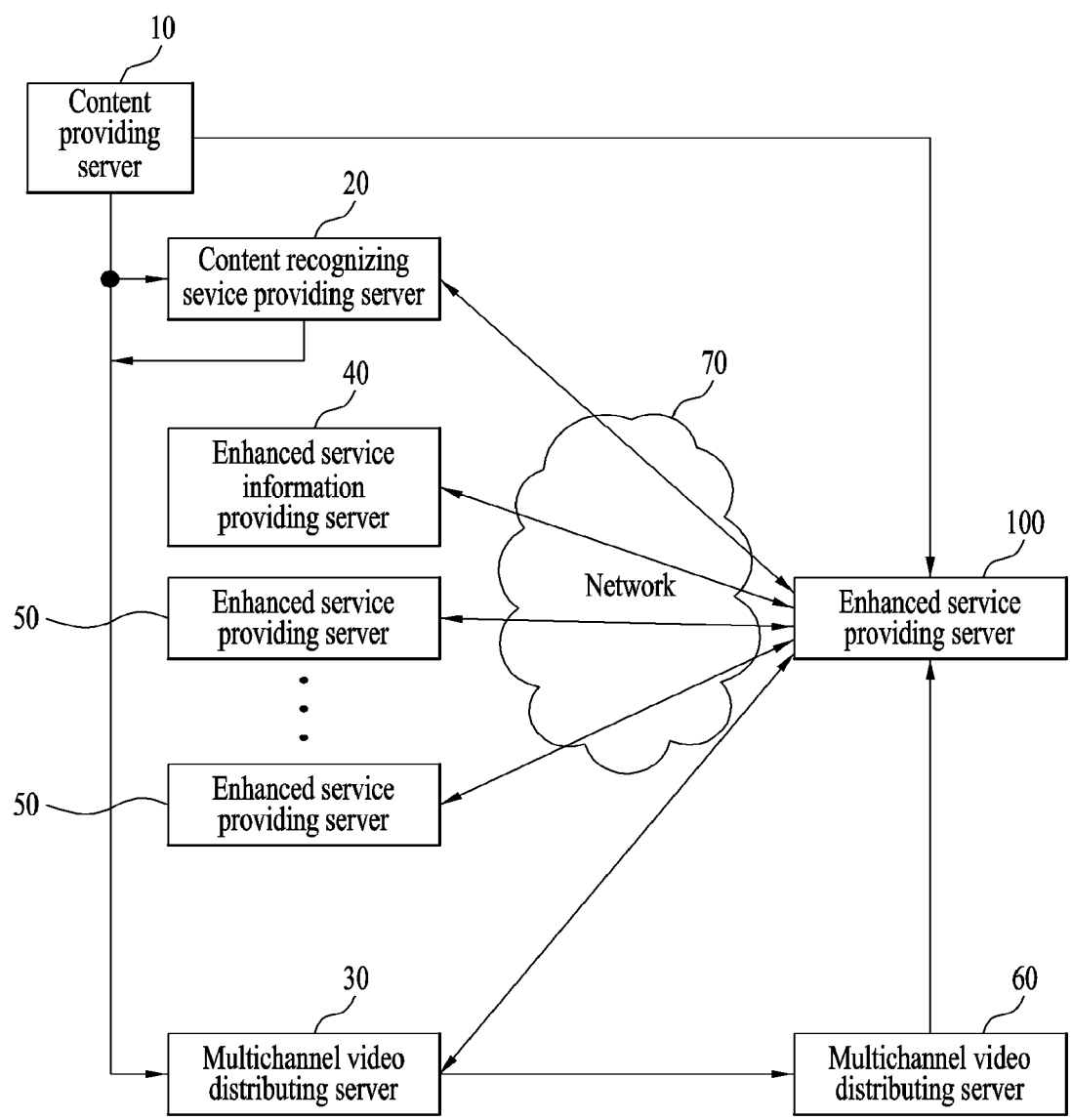
FIG. 11 is a block diagram showing a network topology according to an embodiment of the present invention.

FIG. 11 is a block diagram illustrating the network topology according to the embodiment.

As shown in FIG. 11, the network topology includes a content providing server 10, a content recognizing service providing server 20, a multi-channel video distributing server 30, an enhanced service information providing server 40, a plurality of enhanced service providing servers 50, a broadcast receiving device 60, a network 70, and a video display device 100.

The content providing server 10 may correspond to a broadcasting station and broadcasts a broadcast signal including main audio-visual contents. The broadcast signal may further include enhanced services. The enhanced services may or may not relate to main audio-visual contents. The enhanced services may have formats such as service information, metadata, additional data, compiled execution files, web applications, Hypertext Markup Language (HTML) documents, XML documents, Cascading Style Sheet (CSS) documents, audio files, video files, ATSC 2.0 contents, and addresses such as Uniform Resource Locator (URL). There may be at least one content providing server.

The content recognizing service providing server 20 provides a content recognizing service that allows the video display device 100 to recognize content on the basis of main audio-visual content. The content recognizing service providing server 20 may or may not edit the main audio-visual content. There may be at least one content recognizing service providing server.

The content recognizing service providing server 20 may be a watermark server that edits the main audio-visual content to insert a visible watermark, which may look a logo, into the main audio-visual content. This watermark server may insert the logo of a content provider at the upper-left or upper-right of each frame in the main audio-visual content as a watermark.

Additionally, the content recognizing service providing server 20 may be a watermark server that edits the main audio-visual content to insert content information into the main audio-visual content as an invisible watermark.

Additionally, the content recognizing service providing server 20 may be a fingerprint server that extracts feature information from some frames or audio samples of the main audio-visual content and stores it. This feature information is called signature.

The multi-channel video distributing server 30 receives and multiplexes broadcast signals from a plurality of broadcasting stations and provides the multiplexed broadcast signals to the broadcast receiving device 60. Especially, the multi-channel video distributing server 30 performs demodulation and channel decoding on the received broadcast signals to extract main audio-visual content and enhanced service, and then, performs channel encoding on the extracted main audio-visual content and enhanced service to generate a multiplexed signal for distribution. At this point, since the multi channel video distributing server 30 may exclude the extracted enhanced service or may add another enhanced service, a broadcasting station may not provide services led by it. There may be at least one multi channel video distributing server.

The broadcasting device 60 may tune a channel selected by a user and receives a signal of the tuned channel, and then, performs demodulation and channel decoding on the received signal to extract a main audio-visual content. The broadcasting device 60 decodes the extracted main audio-visual content through H.264/Moving Picture Experts Group-4 advanced video coding (MPEG-4 AVC), Dolby AC-3 or Moving Picture Experts Group-2 Advanced Audio Coding (MPEG-2 AAC) algorithm to generate an uncompressed main audio-visual (AV) content. The broadcast receiving device 60 provides the generated uncompressed main AV content to the video display device 100 through its external input port.

The enhanced service information providing server 40 provides enhanced service information on at least one available enhanced service relating to a main AV content in response to a request of a video display device. There may be at least one enhanced service providing server. The enhanced service information providing server 40 may provide enhanced service information on the enhanced service having the highest priority among a plurality of available enhanced services.

The enhanced service providing server 50 provides at least one available enhanced service relating to a main AV content in response to a request of a video display device. There may be at least one enhanced service providing server.

The video display device 100 may be a television, a notebook computer, a hand phone, and a smart phone, each including a display unit. The video display device 100 may receive an uncompressed main AV content from the broadcast receiving device 60 or a broadcast signal including an encoded main AV content from the contents providing server 10 or the multi channel video distributing server 30. The video display device 100 may receive a content recognizing service from the content recognizing service providing server 20 through the network 70, an address of at least one available enhanced service relating to a main AV content from the enhanced service information providing server 40 through the network 70, and at least one available enhanced service relating to a main AV content from the enhanced service providing server 50.

At least two of the content providing server 10, the content recognizing service providing server 20, the multi channel video distributing server 30, the enhanced service information providing server 40, and the plurality of enhanced service providing servers 50 may be combined in a form of one server and may be operated by one provider.

Figure 12:
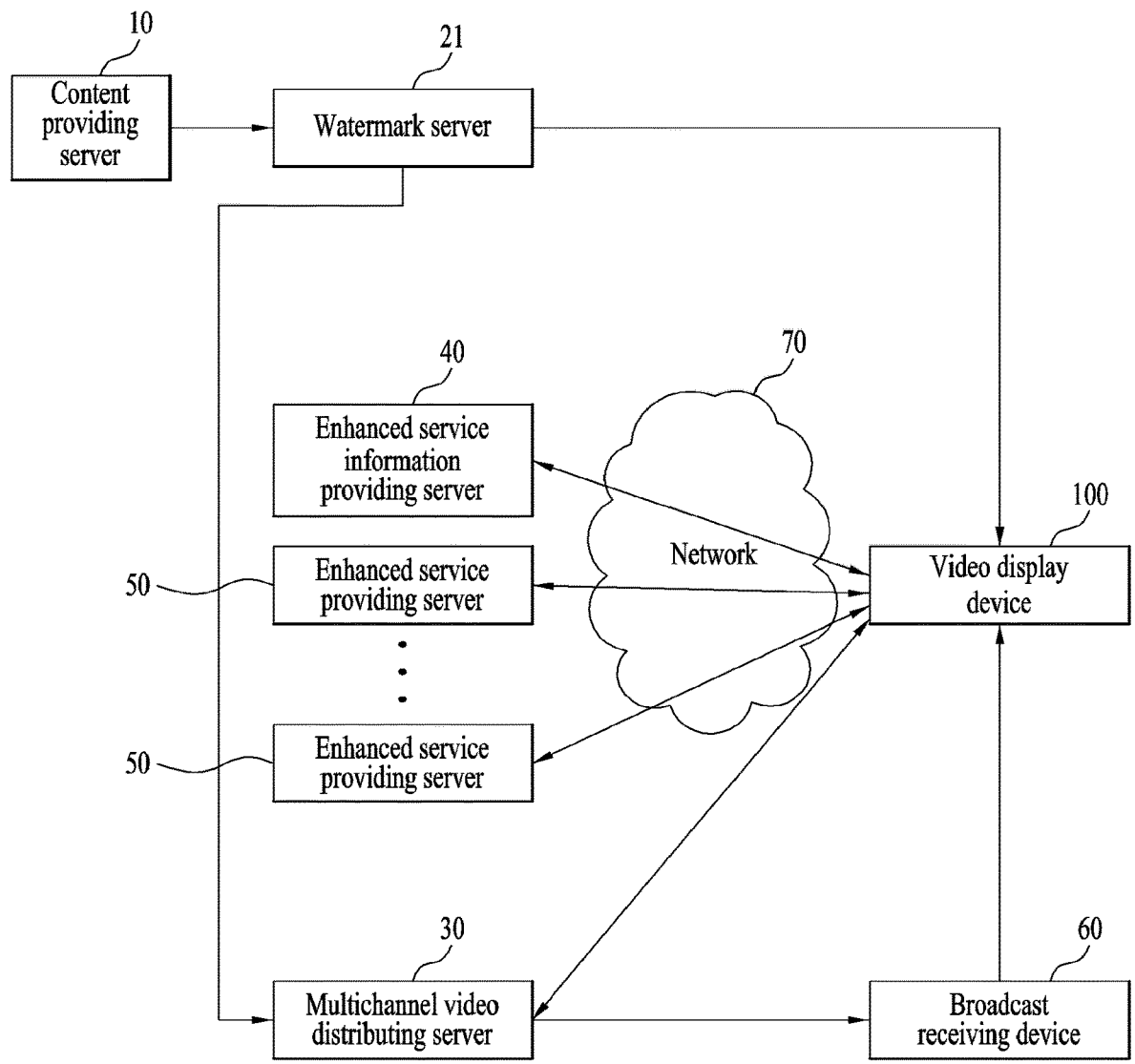
FIG. 12 is a block diagram showing a watermark-based network topology according to an embodiment of the present invention.

FIG. 12 is a block diagram illustrating a watermark based network topology according to an embodiment.

As shown in FIG. 12, the watermark based network topology may further include a watermark server 21.

As shown in FIG. 12, the watermark server 21 edits a main AV content to insert content information into it. The multi channel video distributing server 30 may receive and distribute a broadcast signal including the modified main AV content. Especially, a watermark server may use a digital watermarking technique described below.

A digital watermark is a process for inserting information, which may be almost undeletable, into a digital signal. For example, the digital signal may be audio, picture, or video. If the digital signal is copied, the inserted information is included in the copy. One digital signal may carry several different watermarks simultaneously.

In visible watermarking, the inserted information may be identifiable in a picture or video. Typically, the inserted information may be a text or logo identifying a media owner. If a television broadcasting station adds its logo in a corner of a video, this is an identifiable watermark.

In invisible watermarking, although information as digital data is added to audio, picture, or video, a user may be aware of a predetermined amount of information but may not recognize it. A secret message may be delivered through the invisible watermarking.

One application of the watermarking is a copyright protection system for preventing the illegal copy of digital media. For example, a copy device obtains a watermark from digital media before copying the digital media and determines whether to copy or not on the bases of the content of the watermark.

Another application of the watermarking is source tracking of digital media. A watermark is embedded in the digital media at each point of a distribution path. If such digital media is found later, a watermark may be extracted from the digital media and a distribution source may be recognized from the content of the watermark.

Another application of invisible watermarking is a description for digital media.

A file format for digital media may include additional information called metadata and a digital watermark is distinguished from metadata in that it is delivered as an AV signal itself of digital media.

The watermarking method may include spread spectrum, quantization, and amplitude modulation.

If a marked signal is obtained through additional editing, the watermarking method corresponds to the spread spectrum. Although it is known that the spread spectrum watermark is quite strong, not much information is contained because the watermark interferes with an embedded host signal.

If a marked signal is obtained through the quantization, the watermarking method corresponds to a quantization type. The quantization watermark is weak, much information may be contained.

If a marked signal is obtained through an additional editing method similar to the spread spectrum in a spatial domain, a watermarking method corresponds to the amplitude modulation.

Figure 13:
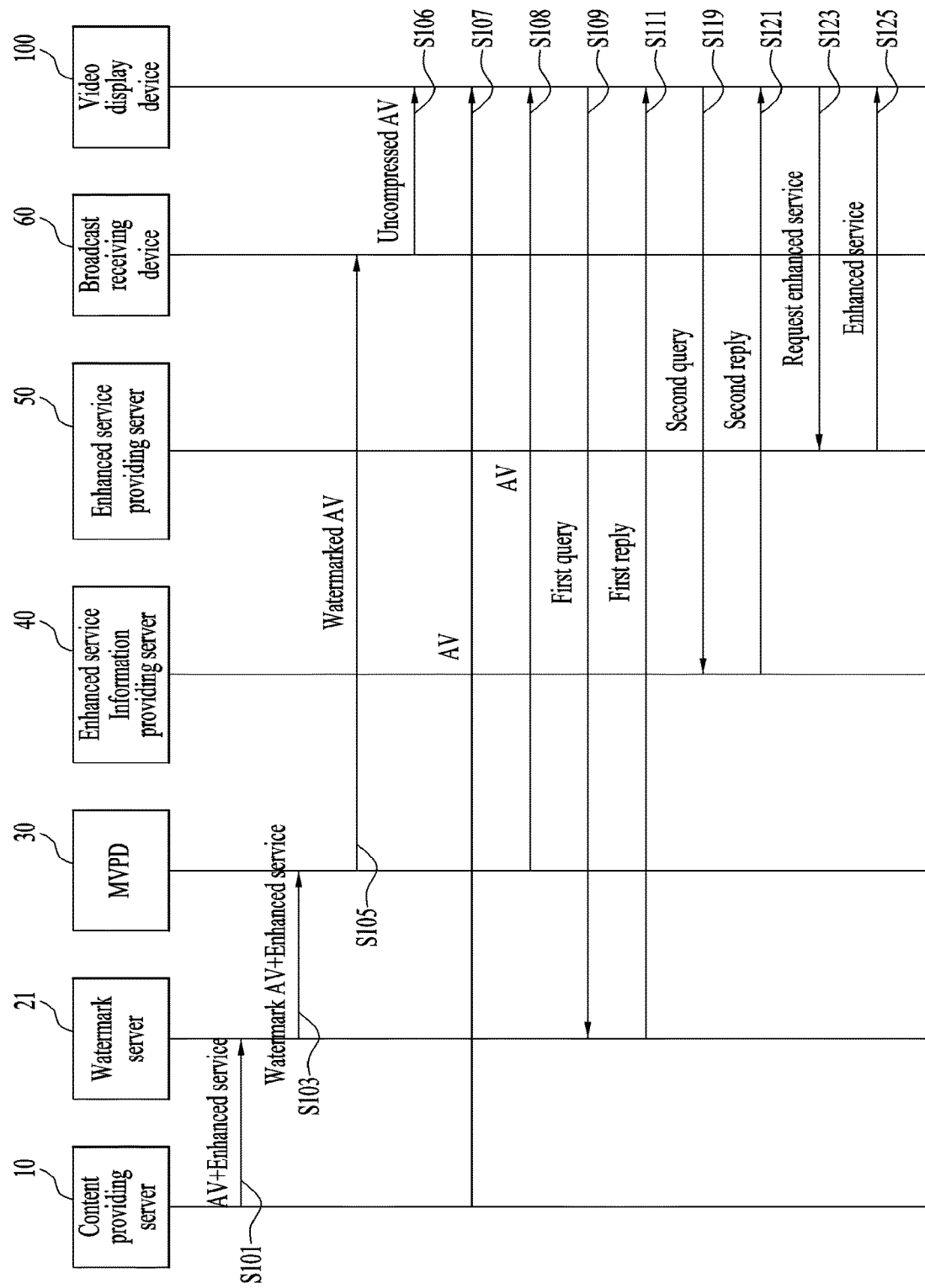
FIG. 13 is a ladder diagram showing a data flow in the watermark-based network topology according to an embodiment of the present invention.

FIG. 13 is a ladder diagram illustrating a data flow in a watermark based network topology according to an embodiment.

First, the content providing server 10 transmits a broadcast signal including a main AV content and an enhanced service in operation S101.

The watermark server 21 receives a broadcast signal that the content providing server 10 provides, inserts a visible watermark such as a logo or watermark information as an invisible watermark into the main AV content by editing the main AV content, and provides the watermarked main AV content and enhanced service to the MVPD 30 in operation S103.

The watermark information inserted through an invisible watermark may include at least one of a watermark purpose, content information, enhanced service information, and an available enhanced service. The watermark purpose represents one of illegal copy prevention, viewer ratings, and enhanced service acquisition.

The content information may include at least one of identification information of a content provider that provides main AV content, main AV content identification information, time information of a content section used in content information acquisition, names of channels through which main AV content is broadcasted, logos of channels through which main AV content is broadcasted, descriptions of channels through which main AV content is broadcasted, a usage information reporting period, the minimum usage time for usage information acquisition, and available enhanced service information relating to main AV content.

If the video display device 100 uses a watermark to acquire content information, the time information of a content section used for content information acquisition may be the time information of a content section into which a watermark used is embedded. If the video display device 100 uses a fingerprint to acquire content information, the time information of a content section used for content information acquisition may be the time information of a content section where feature information is extracted. The time information of a content section used for content information acquisition may include at least one of the start time of a content section used for content information acquisition, the duration of a content section used for content information acquisition, and the end time of a content section used for content information acquisition.

The usage information reporting address may include at least one of a main AV content watching information reporting address and an enhanced service usage information reporting address. The usage information reporting period may include at least one of a main AV content watching information reporting period and an enhanced service usage information reporting period. A minimum usage time for usage information acquisition may include at least one of a minimum watching time for a main AV content watching information acquisition and a minimum usage time for enhanced service usage information extraction.

On the basis that a main AV content is watched for more than the minimum watching time, the video display device 100 acquires watching information of the main AV content and reports the acquired watching information to the main AV content watching information reporting address in the main AV content watching information reporting period.

On the basis that an enhanced service is used for more than the minimum usage time, the video display device 100 acquires enhanced service usage information and reports the acquired usage information to the enhanced service usage information reporting address in the enhanced service usage information reporting period.

The enhanced service information may include at least one of information on whether an enhanced service exists, an enhanced service address providing server address, an acquisition path of each available enhanced service, an address for each available enhanced service, a start time of each available enhanced service, an end time of each available enhanced service, a lifetime of each available enhanced service, an acquisition mode of each available enhanced service, a request period of each available enhanced service, priority information each available enhanced service, description of each available enhanced service, a category of each available enhanced service, a usage information reporting address, a usage information reporting period, and the minimum usage time for usage information acquisition.

The acquisition path of available enhanced service may be represented with IP or Advanced Television Systems Committee—Mobile/Handheld (ATSC M/H). If the acquisition path of available enhanced service is ATSC M/H, enhanced service information may further include frequency information and channel information. An acquisition mode of each available enhanced service may represent Push or Pull.

Moreover, the watermark server 21 may insert watermark information as an invisible watermark into the logo of a main AV content.

For example, the watermark server 21 may insert a barcode at a predetermined position of a logo. At this point, the predetermined position of the logo may correspond to the first line at the bottom of an area where the logo is displayed. The video display device 100 may not display a barcode when receiving a main AV content including a logo with the barcode inserted.

For example, the watermark server 21 may insert a barcode at a predetermined position of a logo. At this point, the log may maintain its form.

For example, the watermark server 21 may insert N-bit watermark information at each of the logos of M frames. That is, the watermark server 21 may insert M*N watermark information in M frames.

The MVPD 30 receives broadcast signals including watermarked main AV content and enhanced service and generates a multiplexed signal to provide it to the broadcast receiving device 60 in operation S105. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in operation S106.

Moreover, the content providing server 10 also broadcasts a broadcast signal including a main AV content through a wireless channel in operation S107.

Additionally, the MVPD 30 may directly transmit a broadcast signal including a main AV content to the video display device 100 without going through the broadcast receiving device 60 in operation S108.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts watermark information from some frames or a section of audio samples of the obtained main AV content. If watermark information corresponds to a logo, the video display device 100 confirms a watermark server address corresponding to a logo extracted from a corresponding relationship between a plurality of logos and a plurality of watermark server addresses. When the watermark information corresponds to the logo, the video display device 100 cannot identify the main AV content only with the logo. Additionally, when the watermark information does not include content information, the video display device 100 cannot identify the main AV content but the watermark information may include content provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify a main AV content the video display device 100 only with the watermark information, it accesses the watermark server 21 corresponding to the obtained watermark server address to transmit a first query in operation S109.

The watermark server 21 provides a first reply to the first query in operation S111. The first reply may include at least one of content information, enhanced service information, and an available enhanced service.

If the watermark information and the first reply do not include an enhanced service address, the video display device 100 cannot obtain enhanced service. However, the watermark information and the first reply may include an enhanced service address providing server address. In this manner, the video display device 100 does not obtain a service address or enhanced service through the watermark information and the first reply. If the video display device 100 obtains an enhanced service address providing server address, it accesses the enhanced service information providing server 40 corresponding to the obtained enhanced service address providing server address to transmit a second query including content information in operation S119.

The enhanced service information providing server 40 searches at least one available enhanced service relating to the content information of the second query. Later, the enhanced service information providing server 40 provides to the video display device 100 enhanced service information for at least one available enhanced service as a second reply to the second query in operation S121.

If the video display device 100 obtains at least one available enhanced service address through the watermark information, the first reply, or the second reply, it accesses the at least one available enhanced service address to request enhanced service in operation S123, and then, obtains the enhanced service in operation S125.

Figure 14:
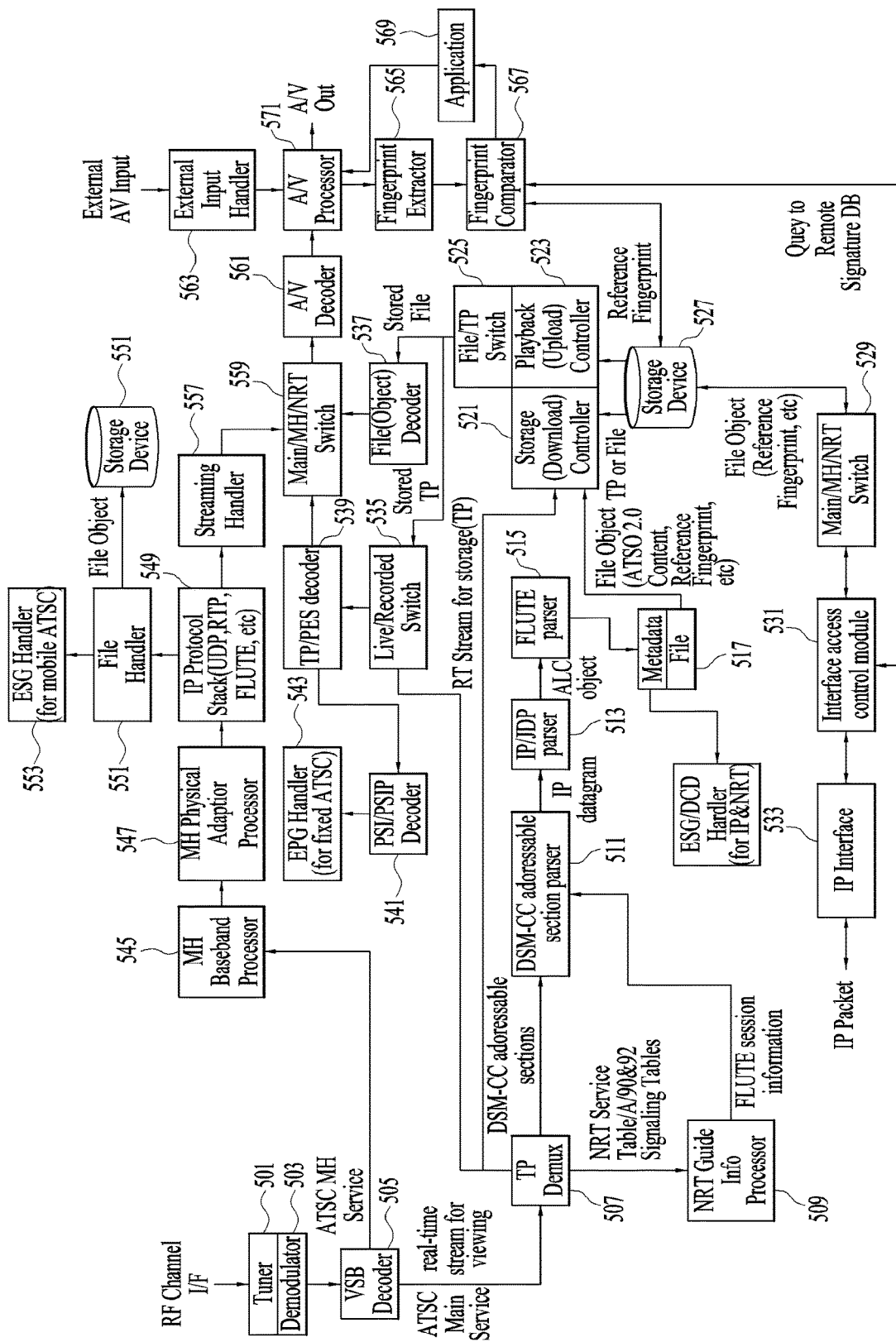
FIG. 14 is a block diagram showing a structure of a fingerprint based image display device according to another embodiment of the present invention.

FIG. 14 is a block diagram illustrating a structure of a fingerprint based video display device according to another embodiment.

As shown in FIG. 14, a tuner 501 extracts a symbol from an 8-VSB RF signal transmitted through an air channel.

An 8-VSB demodulator 503 demodulates the 8-VSB symbol that the tuner 501 extracts and restores meaningful digital data.

A VSB decoder 505 decodes the digital data that the 8-VSB demodulator 503 to restore an ATSC main service and ATSC M/H service.

An MPEG-2 TP Demux 507 filters a Transport Packet that the video display device 100 is to process from an MPEG-2 Transport Packet transmitted through an 8-VSB signal or an MPEG-2 Transport Packet stored in a PVR Storage to relay the filtered Transport Packet into a processing module.

A PES decoder 539 buffers and restores a Packetized Elementary Stream transmitted through an MPEG-2 Transport Stream.

A PSI/PSIP decoder 541 buffers and analyzes PSI/PSIP Section Data transmitted through an MPEG-2 Transport Stream. The analyzed PSI/PSIP data are collected by a Service Manager (not shown), and then, is stored in DB in a form of Service Map and Guide data.

A DSMCC Section Buffer/Handler 511 buffers and processes DSMCC Section Data for file transmission through MPEG-2 TP and IP Datagram encapsulation.

An IP/UDP Datagram Buffer/Header Parser 513 buffers and restores IP Datagram, which is encapsulated through DSMCC Addressable section and transmitted through MPEG-2 TP to analyze the Header of each Datagram. Additionally, an IP/UDP Datagram Buffer/Header Parser 513 buffers and restores UDP Datagram transmitted through IP Datagram, and then analyzes and processes the restored UDP Header.

A Stream component handler 557 may include ES Buffer/Handler, PCR Handler, STC module, Descrambler, CA Stream Buffer/Handler, and Service Signaling Section Buffer/Handler.

The ES Buffer/Handler buffers and restores an Elementary Stream such as Video and Audio data transmitted in a PES form to deliver it to a proper A/V Decoder.

The PCR Handler processes Program Clock Reference (PCR) Data used for Time synchronization of Audio and Video Stream.

The STC module corrects Clock values of the A/V decoders by using a Reference Clock value received through PCR Handler to perform Time Synchronization.

When scrambling is applied to the received IP Datagram, the Descrambler restores data of Payload by using Encryption key delivered from the CA Stream Handler.

The CA Stream Buffer/Handler buffers and processes Data such as Key values for Descrambling of EMM and ECM, which are transmitted for a Conditional Access function through MPEG-2 TS or IP Stream. An output of the CA Stream Buffer/Handler is delivered to the Descrambler, and then, the descrambler descrambles MPEG-2 TP or IP Datagram, which carriers A/V Data and File Data.

The Service Signaling Section Buffer/Handler buffers, restores, and analyzes NRT Service Signaling Channel Section Data transmitted in a form of IP Datagram. The Service Manager (not shown) collects the analyzed NRT Service Signaling Channel Section data and stores them in DB in a form of Service Map and Guide data.

The A/V Decoder 561 decodes the Audio/Video data received through an ES Handler to present them to a user.

An MPEG-2 Service Demux (not shown) may include an MPEG-2 TP Buffer/Parser, a Descrambler, and a PVR Storage module.

An MPEG-2 TP Buffer/Parser (not shown) buffers and restores an MPEG-2 Transport Packet transmitted through an 8-VSB signal, and also detects and processes a Transport Packet Header.

The Descrambler restores the data of Payload by using an Encryption key, which is delivered from the CA Stream Handler, on the Scramble applied Packet payload in the MPEG-2 TP.

The PVR Storage module stores an MPEG-2 TP received through an 8-VSB signal at the user's request and outputs an MPEG-2 TP at the user's request. The PVR storage module may be controlled by the PVR manager (not shown).

The File Handler 551 may include an ALC/LCT Buffer/Parser, an FDT Handler, an XML Parser, a File Reconstruction Buffer, a Decompressor, a File Decoder, and a File Storage.

The ALC/LCT Buffer/Parser buffers and restores ALC/LCT data transmitted through a UDP/IP Stream, and analyzes a Header and Header extension of ALC/LCT. The ALC/LCT Buffer/Parser may be controlled by an NRT Service Manager (not shown).

The FDT Handler analyzes and processes a File Description Table of FLUTE protocol transmitted through an ALC/LCT session. The FDT Handler may be controlled by an NRT Service Manager (not shown).

The XML Parser analyzes an XML Document transmitted through an ALC/LCT session, and then, delivers the analyzed data to a proper module such as an FDT Handler and an SG Handler.

The File Reconstruction Buffer restores a file transmitted through an ALC/LCT, FLUTE session.

If a file transmitted through an ALC/LCT and FLUTE session is compressed, the Decompressor performs a process to decompress the file.

The File Decoder decodes a file restored in the File Reconstruction Buffer, a file decompressed in the decompressor, or a film extracted from the File Storage.

The File Storage stores or extracts a restored file if necessary.

The M/W Engine (not shown) processes data such as a file, which is not an A/V Stream transmitted through DSMCC Section and IP Datagram. The M/W Engine delivers the processed data to a Presentation Manager module.

The SG Handler (not shown) collects and analyzes Service Guide data transmitted in an XML Document form, and then, delivers them to the EPG Manager.

The Service Manager (not shown) collects and analyzes PSI/PSIP Data transmitted through an MPEG-2 Transport Stream and Service Signaling Section Data transmitted through an IP Stream, so as to produce a Service Map. The Service Manager (not shown) stores the produced service map in a Service Map & Guide Database, and controls an access to a Service that a user wants. The Service Manager is controlled by the Operation Controller (not shown), and controls the Tuner 501, the MPEG-2 TP Demux 507, and the IP Datagram Buffer/Handler 513.

The NRT Service Manager (not shown) performs an overall management on the NRT service transmitted in an object/file form through a FLUTE session. The NRT Service Manager (not shown) may control the FDT Handler and File Storage.

The Application Manager (not shown) performs overall management on Application data transmitted in a form of object and file.

The UI Manager (not shown) delivers a user input to an Operation Controller through a User Interface, and starts a process for a service that a user requests.

The Operation Controller (not shown) processes a command of a user, which is received through a UI Manager, and allows a Manager of a necessary module to perform a corresponding action.

The Fingerprint Extractor 565 extracts fingerprint feature information from an AV stream.

The Fingerprint Comparator 567 compares the feature information extracted by the Fingerprint Extractor with a Reference fingerprint to find an identical content. The Fingerprint Comparator 567 may use a Reference fingerprint DB stored in local and may query a Fingerprint query server on the internet to receive a result. The matched result data obtained by a comparison result may be delivered to Application and used.

As an ACR function managing module or an application module providing an enhanced service on the basis of ACR, the Application 569 identifies a broadcast content in watching to provide an enhanced service related to it.

Figure 15:
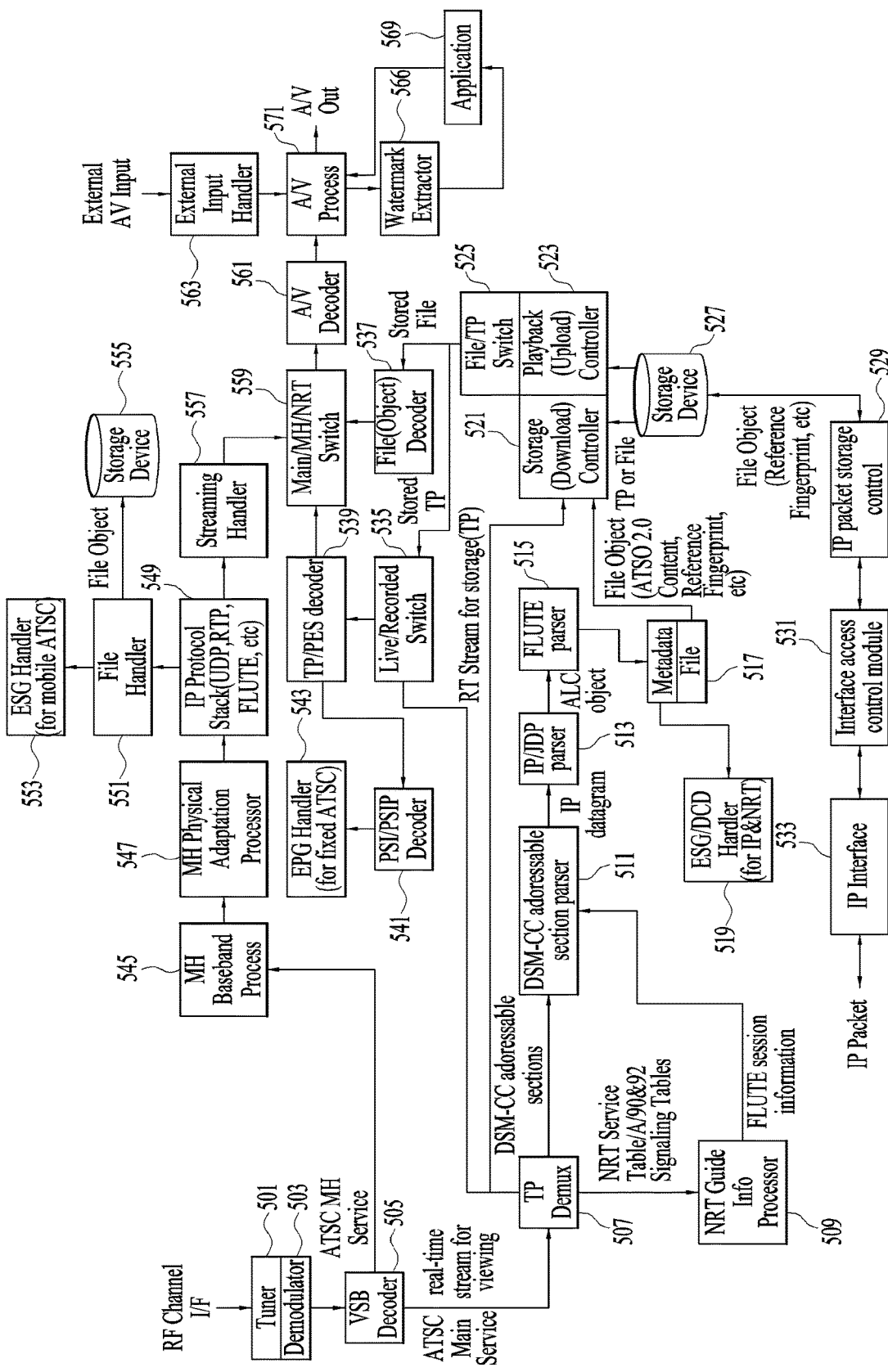
FIG. 15 is a block diagram showing a structure of a watermark-based image display device according to another embodiment of the present invention.

FIG. 15 is a block diagram illustrating a structure of a watermark based video display device according to another embodiment of the present invention.

Although the watermark based video display device of FIG. 15 is similar to the fingerprint based video display device of FIG. 14, the fingerprint based video display device does not includes the Fingerprint Extractor 565 and the Fingerprint Comparator 567, but further includes the Watermark Extractor 566.

The Watermark Extractor 566 extracts data inserted in a watermark form from an Audio/Video stream. The extracted data may be delivered to an Application and may be used.

Figures 16, 17:
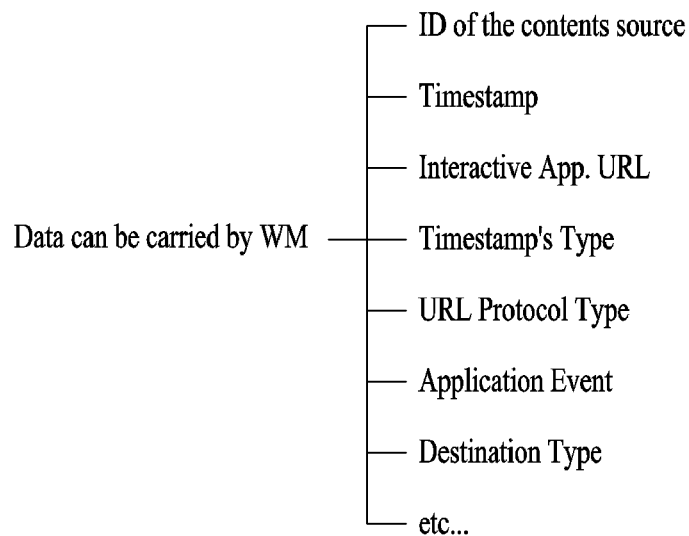
FIG. 16 is a diagram illustrating data which can be delivered through watermarking according to an embodiment of the present invention.
FIG. 17 is a diagram illustrating the meaning of each value of a timestamp type field according to an embodiment of the present invention.

FIG. 16 is a diagram showing data which may be delivered via a watermarking scheme according to one embodiment of the present invention.

As described above, an object of ACR via a WM is to obtain supplementary service related information of content from incompressible audio/video in an environment capable of accessing only incompressible audio/video (that is, an environment in which audio/video is received from a cable/satellite/IPTV, etc.). Such an environment may be referred to as an ACR environment. In the ACR environment, since a receiver receives incompressible audio/video data only, the receiver may not confirm which content is currently being displayed. Accordingly, the receiver uses a content source ID, a current point of time of a broadcast program and URL information of a related application delivered by a WM to identify displayed content and provide an interactive service.

In delivery of a supplementary service related to a broadcast program using an audio/video watermark (WM), all supplementary information may be delivered by the WM as a simplest method. In this case, all supplementary information may be detected by a WM detector to simultaneously process information detected by the receiver.

However, in this case, if the amount of WMs inserted into audio/video data increases, total quality of audio/video may deteriorate. For this reason, only minimum necessary data may be inserted into the WM. A structure of WM data for enabling a receiver to efficiently receive and process a large amount of information while inserting minimum data as a WM needs to be defined. A data structure used for the WM may be equally used even in a fingerprinting scheme which is relatively less influenced by the amount of data.

As shown, data delivered via the watermarking scheme according to one embodiment of the present invention may include an ID of a content source, a timestamp, an interactive application URL, a timestamp's type, a URL protocol type, an application event, a destination type, etc. In addition, various types of data may be delivered via the WM scheme according to the present invention.

The present invention proposes the structure of data included in a WM when ACR is performed via a WM scheme. For shown data types, a most efficient structure is proposed by the present invention.

Data which can be delivered via the watermarking scheme according to one embodiment of the present invention include the ID of the content source. In an environment using a set top box, a receiver (a terminal or TV) may not check a program name, channel information, etc. when a multichannel video programming distributor (MVPD) does not deliver program related information via the set top box. Accordingly, a unique ID for identifying a specific content source may be necessary. In the present invention, an ID type of a content source is not limited. Examples of the ID of the content source may be as follows.

First, a global program ID may be a global identifier for identifying each broadcast program. This ID may be directly created by a content provider or may be created in the format specified by an authoritative body. Examples of the ID may include TMSId of "TMS metadata" of North America, an EIDR ID which is a movie/broadcast program identifier, etc.

A global channel ID may be a channel identifier for identifying all channels. Channel numbers differ between MVPDs provided by a set top box. In addition, even in the same MVPD, channel numbers may differ according to services designated by users. The global channel ID may be used as a global identifier which is not influenced by an MVPD, etc. According to embodiments, a channel transmitted via a terrestrial wave may be identified by a major channel number and a minor channel number. If only a program ID is used, since a problem may occur when several broadcast stations broadcast the same program, the global channel ID may be used to specify a specific broadcast channel.

Examples of the ID of the content source to be inserted into a WM may include a program ID and a channel ID. One or both of the program ID and the channel ID or a new ID obtained by combining the two IDs may be inserted into the WM. According to embodiments, each ID or combined ID may be hashed to reduce the amount of data. The ID of each content source may be of a string type or an integer type. In the case of the integer type, the amount of transmitted data may be further reduced.

In addition, data which can be delivered via the watermarking scheme according to one embodiment of the present invention may include a timestamp. The receiver should know a point of time of currently viewed content. This time related information may be referred to as a timestamp and may be inserted into the WM. The time related information may take the form of an absolute time (UTC, GPS, etc.) or a media time. The time related information may be delivered up to a unit of milliseconds for accuracy and may be delivered up to a smaller unit according to embodiments. The timestamp may have a variable length according to type information of the timestamp.

Data which can be delivered via the watermarking scheme according to one embodiment may include the URL of the interactive application. If an interactive application related to a currently viewed broadcast program is present, the URL of the application may be inserted into the WM. The receiver may detect the WM, obtain the URL, and execute the application via a browser.

FIG. 17 is a diagram showing the meanings of the values of the timestamp type field according to one embodiment of the present invention.

The present invention proposes a timestamp type field as one of data which can be delivered via a watermarking scheme. In addition, the present invention proposes an efficient data structure of a timestamp type field.

The timestamp type field may be allocated 5 bits. The first two bits of the timestamp may mean the size of the timestamp and the next 3 bits may mean the unit of time information indicated by the timestamp. Here, the first two bits may be referred to as a timestamp size field and the next 3 bits may be referred to as a timestamp unit field.

As shown, according to the size of the timestamp and the unit value of the timestamp, a variable amount of real timestamp information may be inserted into the WM. Using such variability, a designer may select a size allocated to the timestamp and the unit thereof according to the accuracy of the timestamp. If accuracy of the timestamp increases, it is possible to provide an interactive service at an accurate time. However, system complexity increases as accuracy of the timestamp increases. In consideration of this tradeoff, the size allocated to the timestamp and the unit thereof may be selected.

If the first two bits of the timestamp type field are 00, the timestamp may have a size of 1 byte. If the first two bits of the timestamp type field are 01, 10 and 11, the size of the timestamp may be 2, 4 and 8 bytes, respectively.

If the last three bits of the timestamp type field are 000, the timestamp may have a unit of milliseconds. If the last three bits of the timestamp type field are 001, 010 and 011, the timestamp may have second, minute and hour units, respectively. The last three bits of the timestamp type field of 101 to 111 may be reserved for future use.

Here, if the last three bits of the timestamp type field are 100, a separate time code may be used as a unit instead of a specific time unit such as millisecond or second. For example, a time code may be inserted into the WM in the form of HH:MM:SS:FF which is a time code form of SMPTE. Here, HH may be an hour unit, MM may be a minute unit and SS may be a second unit. FF may be frame information. Frame information which is not a time unit may be simultaneously delivered to provide a frame-accurate service. A real timestamp may have a form of HHMMSSFF excluding colon in order to be inserted into the WM. In this case, a timestamp size value may have 11 (8 bytes) and a timestamp unit value may be 100. In the case of a variable unit, how the timestamp is inserted is not limited by the present invention.

For example, if timestamp type information has a value of 10 and timestamp unit information has a value of 000, the size of the timestamp may be 4 bits and the unit of the timestamp may be milliseconds. At this time, if the timestamp is Ts=3265087, 3 digits 087 located at the back of the timestamp may mean a unit of milliseconds and the remaining digits 3265 may mean a second unit. Accordingly, when this timestamp is interpreted, a current time may mean that 54 minutes 25.087 seconds has elapsed after the program, into which the WM is inserted, starts. This is only exemplary and the timestamp serves as a wall time and may indicate a time of a receiver or a segment regardless of content.

Figures 18, 19:
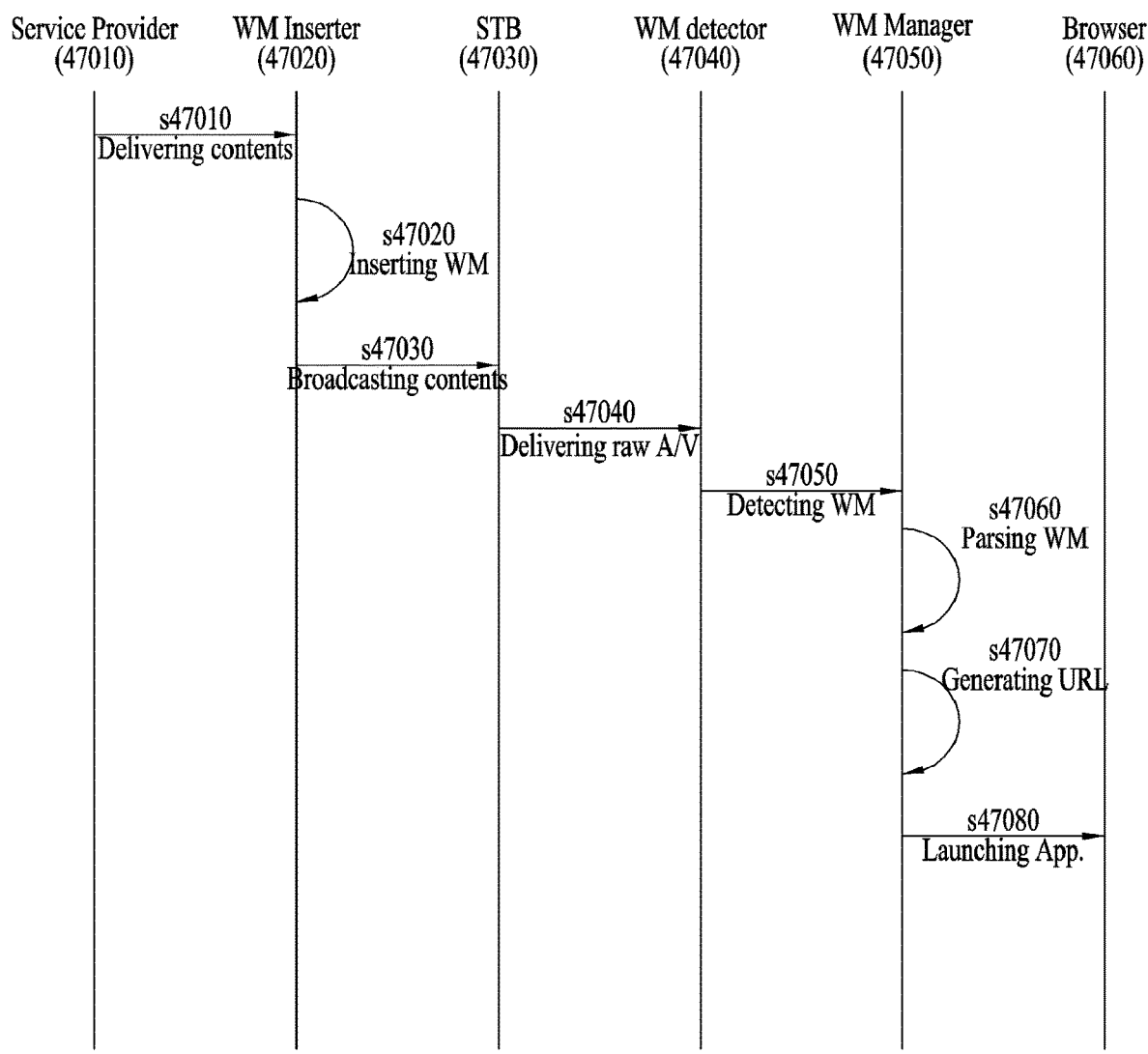
FIG. 18 is a diagram illustrating the meaning of each value of a URL protocol type field according to an embodiment of the present invention.
FIG. 19 is a sequence diagram illustrating a procedure of processing the URL protocol type field according to an embodiment of the present invention.

FIG. 18 is a diagram showing meanings of values of a URL protocol type field according to one embodiment of the present invention.

The present invention proposes a URL protocol type field as one of data which can be delivered via a watermarking scheme. In addition, the present invention proposes an efficient data structure of a URL protocol type field.

Among the above-described information, the length of the URL is generally long such that the amount of data to be inserted is relatively large. As described above, as the amount of data to be inserted into the WM decreases, efficiency increases. Thus, a fixed portion of the URL may be processed by the receiver. Accordingly, the present invention proposes a URL protocol type field.

The URL protocol type field may have a size of 3 bits. A service provider may set a URL protocol in a WM using the URL protocol type field. In this case, the URL of the interactive application may be inserted starting from a domain and may be transmitted to the WM.

A WM detector of the receiver may first parse the URL protocol type field, obtain URL protocol information and prefix the protocol to the URL value transmitted thereafter, thereby generating an entire URL. The receiver may access the completed URL via a browser and execute the interactive application.

Here, if the value of the URL protocol type field is 000, the URL protocol may be directly specified and inserted into the URL field of the WM. If the value of the URL protocol type field is 001, 010 and 011, the URL protocols may be http://, https:// and ws://, respectively. The URL protocol type field values of 100 to 111 may be reserved for future use.

The application URL may enable execution of the application via the browser (in the form of a web application). In addition, according to embodiments, a content source ID and timestamp information should be referred to. In the latter case, in order to deliver the content source ID information and the timestamp information to a remote server, a final URL may be expressed in the following form.

Request URL: http://domain/path?cid=1233456&t=5005

In this embodiment, a content source ID may be 123456 and a timestamp may be 5005. cid may mean a query identifier of a content source ID to be reported to the remote server. t may mean a query identifier of a current time to be reported to the remote server.

FIG. 19 is a flowchart illustrating a process of processing a URL protocol type field according to one embodiment of the present invention.

First, a service provider 47010 may deliver content to a WM inserter 47020 (s47010). Here, the service provider 47010 may perform a function similar to the above-described content provision server.

The WM inserter 47020 may insert a WM into the delivered content (s47020). Here, the WM inserter 47020 may perform a function similar to the above-described watermark server. The WM inserter 47020 may insert the above-described WM into audio or video by a WM algorithm. Here, the inserted WM may include the above-described application URL information, content source ID information, etc. For example, the inserted WM may include the above-described timestamp type field, the timestamp, the content ID, etc. The above-described protocol type field may have a value of 001 and URL information may have a value of atsc.org. The values of the field inserted into the WM are only exemplary and the present invention is not limited to this embodiment.

The WM inserter 47020 may transmit content, into which the WM is inserted (s47030). Transmission of the content, into which the WM is inserted, may be performed by the service provider 47010.

An STB 47030 may receive the content, into which the WM is inserted, and output incompressible A/V data (or raw A/V data) (s47040). Here, the STB 47030 may mean the above-described broadcast reception apparatus or the set top box. The STB 47030 may be mounted inside or outside the receiver.

A WM detector 47040 may detect the inserted WM from the received incompressible A/V data (s47050). The WM detector 47040 may detect the WM inserted by the WM inserter 47020 and deliver the detected WM to a WM manager.

The WM manager 47050 may parse the detected WM (s47060). In the above-described embodiment, the WM may have a URL protocol type field value of 001 and a URL value of atsc.org. Since the URL protocol type field value is 001, this may mean that http://protocol is used. The WM manager 47050 may combine http:// and atsc.org using this information to generate an entire URL (s47070).

The WM manager 47050 may send the completed URL to a browser 47060 and launch an application (s47080). In some cases, if the content source ID information and the timestamp information should also be delivered, the application may be launched in the form of http://atsc.org?cid=xxx&t=YYY.

The WM detector 47040 and the WM manager 47050 of the terminal are combined to perform the functions thereof in one module. In this case, steps s45050, s47060 and s47070 may be processed in one module.

FIG. 20 is a diagram showing the meanings of the values of an event field according to one embodiment of the present invention.

The present invention proposes an event field as one of the data which can be delivered via the watermarking scheme. In addition, the present invention proposes an efficient data structure of an event field.

The application may be launched via the URL extracted from the WM. The application may be controlled via a more detailed event. Events which can control the application may be indicated and delivered by the event field. That is, if an interactive application related to a currently viewed broadcast program is present, the URL of the application may be transmitted and the application may be controlled using events.

The event field may have a size of 3 bits. If the value of the event field is 000, this may indicate a "Prepare" command. Prepare is a preparation step before executing the application. A receiver, which has received this command, may download content items related to the application in advance. In addition, the receiver may release necessary resources in order to execute the application. Here, releasing the necessary resources may mean that a memory is cleaned or other unfinished applications are finished.

If the event field value is 001, this may indicate an "Execute" command. Execute may be a command for executing the application. If the event field value is 010, this may indicate a "Suspend" command. Suspend may mean that the executed application is suspended. If the event field value is 011, this may indicate a "Kill" command. Kill may be a command for finishing the already executed application. The event field values of 100 to 111 may be reserved for future use.

FIG. 21 is a diagram showing the meanings of the values of a destination type field according to one embodiment of the present invention.

The present invention proposes a destination type field as one of data which can be delivered via a watermarking scheme. In addition, the present invention proposes an efficient data structure of a destination type field.

With development of DTV related technology, supplementary services related to broadcast content may be provided by a companion device as well as a screen of a TV receiver. However, companion devices may not receive broadcast programs or may receive broadcast programs but may not detect a WM. Accordingly, among applications for providing a supplementary service related to currently broadcast content, if an application to be executed by a companion device is present, related information thereof should be delivered to the companion device.

At this time, even in an environment in which the receiver and the companion device interwork, it is necessary to know by which device an application or data detected from a WM is consumed. That is, information about whether the application or data is consumed by the receiver or the companion device may be necessary. In order to deliver such information as the WM, the present invention proposes a destination type field.

The destination type field may have a size of 3 bits. If the value of the destination type field is 0x00, this may indicate that the application or data detected by the WM is targeted at all devices. If the value of the destination type field is 0x01, this may indicate that the application or data detected by the WM is targeted at a TV receiver. If the value of the destination type field is 0x02, this may indicate that the application or data detected by the WM is targeted at a smartphone. If the value of the destination type field is 0x03, this may indicate that the application or data detected by the WM is targeted at a tablet. If the value of the destination type field is 0x04, this may indicate that the application or data detected by the WM is targeted at a personal computer. If the value of the destination type field is 0x05, this may indicate that the application or data detected by the WM is targeted at a remote server. Destination type field values of 0x06 to 0xFF may be reserved for future use.

Here, the remote server may mean a server having all supplementary information related to a broadcast program. This remote server may be located outside the terminal. If the remote server is used, the URL inserted into the WM may not indicate the URL of a specific application but may indicate the URL of the remote server. The receiver may communicate with the remote server via the URL of the remote server and receive supplementary information related to the broadcast program. At this time, the received supplementary information may be a variety of information such as a genre, actor information, synopsis, etc. of a currently broadcast program as well as the URL of an application related thereto. The received information may differ according to system.

According to another embodiment, each bit of the destination type field may be allocated to each device to indicate the destination of the application. In this case, several destinations may be simultaneously designated via bitwise OR.

For example, when 0x01 indicates a TV receiver, 0x02 indicates a smartphone, 0x04 indicates a tablet, 0x08 indicates a PC and 0x10 indicates a remote server, if the destination type field has a value of 0x6, the application or data may be targeted at the smartphone and the tablet.

According to the value of the destination type field of the WM parsed by the above-described WM manager, the WM manager may deliver each application or data to the companion device. In this case, the WM manager is a module for processing interworking with the companion device in the receiver and may deliver information related to each application or data.

FIG. 22 is a diagram showing the structure of data to be inserted into a WM according to embodiment #1 of the present invention.

In the present embodiment, data inserted into the WM may have information such as a timestamp type field, a timestamp, a content ID, an event field, a destination type field, a URL protocol type field and a URL. Here, the order of data may be changed and each datum may be omitted according to embodiments.

In the present embodiment, a timestamp size field of the timestamp type field may have a value of 01 and a timestamp unit field may have a value of 000. This may mean that 2 bits are allocated to the timestamp and the timestamp has a unit if milliseconds.

In addition, the event field has a value of 001, which means the application should be immediately executed. The destination type field has a value of 0x02, which may mean that data delivered by the WM should be delivered to the smartphone. Since the URL protocol type field has a value of 001 and the URL has a value of atsc.org, this may mean that the supplementary information or the URL of the application is http://atsc.org.

FIG. 23 is a flowchart illustrating a process of processing a data structure to be inserted into a WM according to embodiment #1 of the present invention.

Step s51010 of, at the service provider, delivering content to the WM inserter, step s51020 of, at the WM inserter, inserting the received content into the WM, step s51030 of, at the WM inserter, transmitting the content, into which the WM is inserted, step s51040 of, at the STB, receiving the content, into which the WM is inserted, and outputting the incompressible A/V data, step s51050 of, at the WM detector, detecting the WM, step s51060, at the WM manager, parsing the detected WM and/or step s51070 of, at the WM manager, generating an entire URL may be equal to the above-described steps.

The WM manager is a companion device protocol module in the receiver according to the destination type field of the parsed WM and may deliver related data (s51080). The companion device protocol module may manage interworking and communication with the companion device in the receiver. The companion device protocol module may be paired with the companion device. According to embodiments, the companion device protocol module may be a UPnP device. According to embodiments, the companion device protocol module may be located outside the terminal.

The companion device protocol module may deliver the related data to the companion device according to the destination type field (s51090). In embodiment #1, the value of the destination type field is 0x02 and the data inserted into the WM may be data for a smartphone. Accordingly, the companion device protocol module may send the parsed data to the smartphone. That is, in this embodiment, the companion device may be a smartphone.

According to embodiments, the WM manager or the device protocol module may perform a data processing procedure before delivering data to the companion device. The companion device may have portability but instead may have relatively inferior processing/computing capabilities and a small amount of memory. Accordingly, the receiver may process data instead of the companion device and deliver the processed data to the companion device.

Such processing may be implemented as various embodiments. First, the WM manager or the companion device protocol module may select only data required by the companion device. In addition, according to embodiments, if the event field includes information indicating that the application is finished, the application related information may not be delivered. In addition, if data is divided and transmitted via several WMs, the data may be stored and combined and then final information may be delivered to the companion device. The receiver may perform synchronization using the timestamp instead of the companion device and deliver a command related to the synchronized application or deliver an already synchronized interactive service to the companion device and the companion device may perform display only. Timestamp related information may not be delivered, a time base may be maintained in the receiver only and related information may be delivered to the companion device when a certain event is activated. In this case, the companion device may activate the event according to the time when the related information is received, without maintaining the time base.

Similarly to the above description, the WM detector and the WM manager of the terminal may be combined to perform the functions thereof in one module. In this case, steps s51050, s51060, s51070 and s51080 may be performed in one module.

In addition, according to embodiments, the companion device may also have the WM detector. When each companion device receives a broadcast program, into which a WM is inserted, each companion device may directly detect the WM and then deliver the WM to another companion device. For example, a smartphone may detect and parse a WM and deliver WM related information to a TV. In this case, the destination type field may have a value of 0x01.

FIG. 24 is a diagram showing the structure of data to be inserted into a WM according to embodiment #2 of the present invention.

In the present embodiment, data inserted into the WM may have information such as a timestamp type field, a timestamp, a content ID, an event field, a destination type field, a URL protocol type field and a URL. Here, the order of data may be changed and each datum may be omitted according to embodiments.

In the present embodiment, a timestamp size field of the timestamp type field may have a value of 01 and a timestamp unit field may have a value of 000. This may mean that 2 bits are allocated to the timestamp and the timestamp has a unit of milliseconds. The content ID may have a value of 123456.

In addition, the event field has a value of 001, which means the application should be immediately executed. The destination type field has a value of 0x05, which may mean that data delivered by the WM should be delivered to the remote server. Since the URL protocol type field has a value of 001 and the URL has a value of remoteserver.com, this may mean that the supplementary information or the URL of the application is http://remoteserver.com.

As described above, if the remote server is used, supplementary information of the broadcast program may be received from the remote server. At this time, the content ID and the timestamp may be inserted into the URL of the remote server as parameters and requested from the remote server. According to embodiments, the remote server may obtain information about a currently broadcast program via support of API. At this time, the API may enable the remote server to acquire the content ID and the timestamp stored in the receiver or to deliver related supplementary information.

In the present embodiment, if the content ID and the timestamp are inserted into the URL of the remote server as parameters, the entire URL may be http://remoteserver.com?cid=1233456&t=5005. Here, cid may mean a query identifier of a content source ID to be reported to the remote server. Here, t may mean a query identifier of a current time to be reported to the remote server.

FIG. 25 is a flowchart illustrating a process of processing a data structure to be inserted into a WM according to embodiment #2 of the present invention.

Step s53010 of, at the service provider, delivering content to the WM inserter, step s53020 of, at the WM inserter, inserting the received content into the WM, step s53030 of, at the WM inserter, transmitting the content, into which the WM is inserted, step s53040 of, at the STB, receiving the content, into which the WM is inserted, and outputting the incompressible A/V data, step s53050 of, at the WM detector, detecting the WM, and step s53060, at the WM manager, parsing the detected WM may be equal to the above-described steps.

The WM manager may communicate with the remote server via the parsed destination type field 0x05. The WM manager may generate a URL http://remoteserver.com using the URL protocol type field value and the URL value. In addition, a URL http://remoteserver.com?cid=123456&t=5005 may be finally generated using the content ID and the timestamp value. The WM manager may make a request using the final URL (s53070).

The remote server may receive the request and transmit the URL of the related application suitable for the broadcast program to the WM manager (s53080). The WM manager may send the received URL of the application to the browser and launch the application (s53090).

Similarly to the above description, the WM detector and the WM manager of the terminal may be combined to perform the functions thereof in one module. In this case, steps s53050, s53060, s53070 and s53090 may be performed in one module.

FIG. 26 is a diagram showing the structure of data to be inserted into a WM according to embodiment #3 of the present invention.

The present invention proposes a delivery type field as one of data which can be delivered via a watermarking scheme. In addition, the present invention proposes an efficient data structure of a delivery type field.

In order to reduce deterioration in quality of audio/video content due to increase in amount of data inserted into the WM, the WM may be divided and inserted. In order to indicate whether the WM is divided and inserted, a delivery type field may be used. Via the delivery type field, it may be determined whether one WM or several WMs are detected in order to acquire broadcast related information.

If the delivery type field has a value of 0, this may mean that all data is inserted into one WM and transmitted. If the delivery type field has a value of 1, this may mean that data is divided and inserted into several WMs and transmitted.

In the present embodiment, the value of the delivery type field is 0. In this case, the data structure of the WM may be configured in the form of attaching the delivery type field to the above-described data structure. Although the delivery type field is located at a foremost part in the present invention, the delivery type field may be located elsewhere.

The WM manager or the WM detector may parse the WM by referring to the length of the WM if the delivery type field has a value of 0. At this time, the length of the WM may be computed in consideration of the number of bits of a predetermined field. For example, as described above, the length of the event field may be 3 bits. The size of the content ID and the URL may be changed but the number of bits may be restricted according to embodiments.

FIG. 27 is a diagram showing the structure of data to be inserted into a WM according to embodiment #4 of the present invention.

In the present embodiment, the value of the delivery type field may be 1. In this case, several fields may be added to the data structure of the WM.

A WMId field serves as an identifier for identifying a WM. If data is divided into several WMs and transmitted, the WM detector needs to identify each WM having divided data. At this time, the WMs each having the divided data may have the same WMId field value. The WMId field may have a size of 8 bits.

A block number field may indicate an identification number of a current WM among the WMs each having divided data. The values of the WMs each having divided data may increase by 1 according to order of transmission thereof. For example, in the case of a first WM among the WMs each having divided data, the value of the block number field may be 0x00. A second WM, a third WM and subsequent WMs thereof may have values of 0x01, 0x02, .... The block number field may have a size of 8 bits.

A last block number field may indicate an identification number of a last WM among WMs each having divided data. The WM detector or the WM manager may collect and parse the detected WMs until the value of the above-described block number field becomes equal to that of the last block number field. The last block number field may have a size of 8 bits.

A block length field may indicate a total length of the WM. Here, the WM means one of the WMs each having divided data. The block length field may have a size of 7 bits.

A content ID flag field may indicate whether a content ID is included in payload of a current WM among WMs each having divided data. If the content ID is included, the content ID flag field may be set to 1 and, otherwise, may be set to 0. The content ID flag field may have a size of 1 bit.

An event flag field may indicate whether an event field is included in payload of a current WM among WMs each having divided data. If the event field is included, the event flag field may be set to 1 and, otherwise, may be set to 0. The event flag field may have a size of 1 bit.

A destination flag field may indicate whether a destination type field is included in payload of a current WM among WMs each having divided data. If the destination type field is included, the destination flag field may be set to 1 and, otherwise, may be set to 0. The destination flag field may have a size of 1 bit.

A URL protocol flag field may indicate whether a URL protocol type field is included in payload of a current WM among WMs each having divided data. If the URL protocol type field is included, the URL protocol flag field may be set to 1 and, otherwise, may be set to 0. The URL protocol flag field may have a size of 1 bit.

A URL flag field may indicate whether URL information is included in payload of a current WM among WMs each having divided data. If the URL information is included, the URL flag field may be set to 1 and, otherwise, may be set to 0. The URL flag field may have a size of 1 bit.

The payload may include real data in addition to the above-described fields.

If data is divided into several WMs and transmitted, it is necessary to know information about when each WM is inserted. In this case, according to embodiments, a timestamp may be inserted into each WM. At this time, a timestamp type field may also be inserted into the WM, into which the timestamp is inserted, in order to know when the WM is inserted. Alternatively, according to embodiments, the receiver may store and use WM timestamp type information. The receiver may perform time synchronization based on a first timestamp, a last timestamp or each timestamp.

If data is divided into several WMs and transmitted, the size of each WM may be adjusted using the flag fields. As described above, if the amount of data transmitted by the WM increases, the quality of audio/video content may be influenced. Accordingly, the size of the WM inserted into a frame may be adjusted according to the transmitted audio/video frame. At this time, the size of the WM may be adjusted by the above-described flag fields.

For example, assume that any one of video frames of content has a black screen only. If a scene is switched according to content, one video frame having a black screen only may be inserted. In this video frame, the quality of content may not deteriorate even when a large amount of WMs is inserted. That is, a user does not sense deterioration in content quality. In this case, A WM having a large amount of data may be inserted into this video frame. At this time, most of the values of the flag fields of the WM inserted into the video frame may be 1. This is because the WM have most of the fields. In particular, a URL field having a large amount of data may be included in that WM. Therefore, a relatively small amount of data may be inserted into other video frames. The amount of data inserted into the WM may be changed according to designer's intention.

FIG. 28 is a diagram showing the structure of data to be inserted into a first WM according to embodiment #4 of the present invention.

In the present embodiment, if the value of the delivery type field is 1, that is, if data is divided into several WMs and transmitted, the structure of a first WM may be equal to that shown in FIG. 28.

Among WMs each having divided data, a first WM may have a block number field value of 0x00. According to embodiments, if the value of the block number field is differently used, the shown WM may not be a first WM.

The receiver may detect the first WM. The detected WM may be parsed by the WM manager. At this time, it can be seen that the delivery type field value of the WM is 1 and the value of the block number field is different from that of the last block number field. Accordingly, the WM manager may store the parsed information until the remaining WM having a WMID of 0x00 is received. In particular, atsc.org which is URL information may also be stored. Since the value of the last block number field is 0x01, when one WM is further received in the future, all WMs having a WMID of 0x00 may be received.

In the present embodiment, all the values of the flag fields are 1. Accordingly, it can be seen that information such as the event field is included in the payload of this WM. In addition, since the timestamp value is 5005, a time corresponding to a part, into which this WM is inserted, may be 5.005 seconds.

FIG. 29 is a diagram showing the structure of data to be inserted into a second WM according to embodiment #4 of the present invention.

In the present embodiment, if the value of the delivery type field is 1, that is, if data is divided into several WMs and transmitted, the structure of a second WM may be equal to that shown in FIG. 35.

Among WMs each having divided data, a second WM may have a block number field value of 0x01. According to embodiments, if the value of the block number field is differently used, the shown WM may not be a second WM.

The receiver may detect the second WM. The WM manager may parse the detected second WM. At this time, since the value of the block number field is equal to that of the last block number field, it can be seen that this WM is a last WM of the WMs having a WMId value of 0x00.

Among the flag fields, since only the value of the URL flag is 1, it can be seen that URL information is included. Since the value of the block number field is 0x01, this information may be combined with already stored information. In particular, the already stored atsc.org part and the /apps/app1.html part included in the second WM may be combined. In addition, in the already stored information, since the value of the URL protocol type field is 001, the finally combined URL may be http://atsc.org/apps/app1.html. This URL may be launched via this browser.

According to the second WM, a time corresponding to a part, into which the second WM is inserted, may be 10.005 seconds. The receiver may perform time synchronization based on 5.005 seconds of the first WM or may perform time synchronization based on 10.005 seconds of the last WM. In the present embodiment, the WMs are transmitted twice at an interval of 5 seconds. Since only audio/video may be transmitted during 5 seconds for which the WM is not delivered, deterioration in quality of content may be prevented. That is, even when data is divided into several WMs and transmitted, quality deterioration may be reduced. A time when the WM is divided and inserted may be changed according to embodiments.

Figure 30:
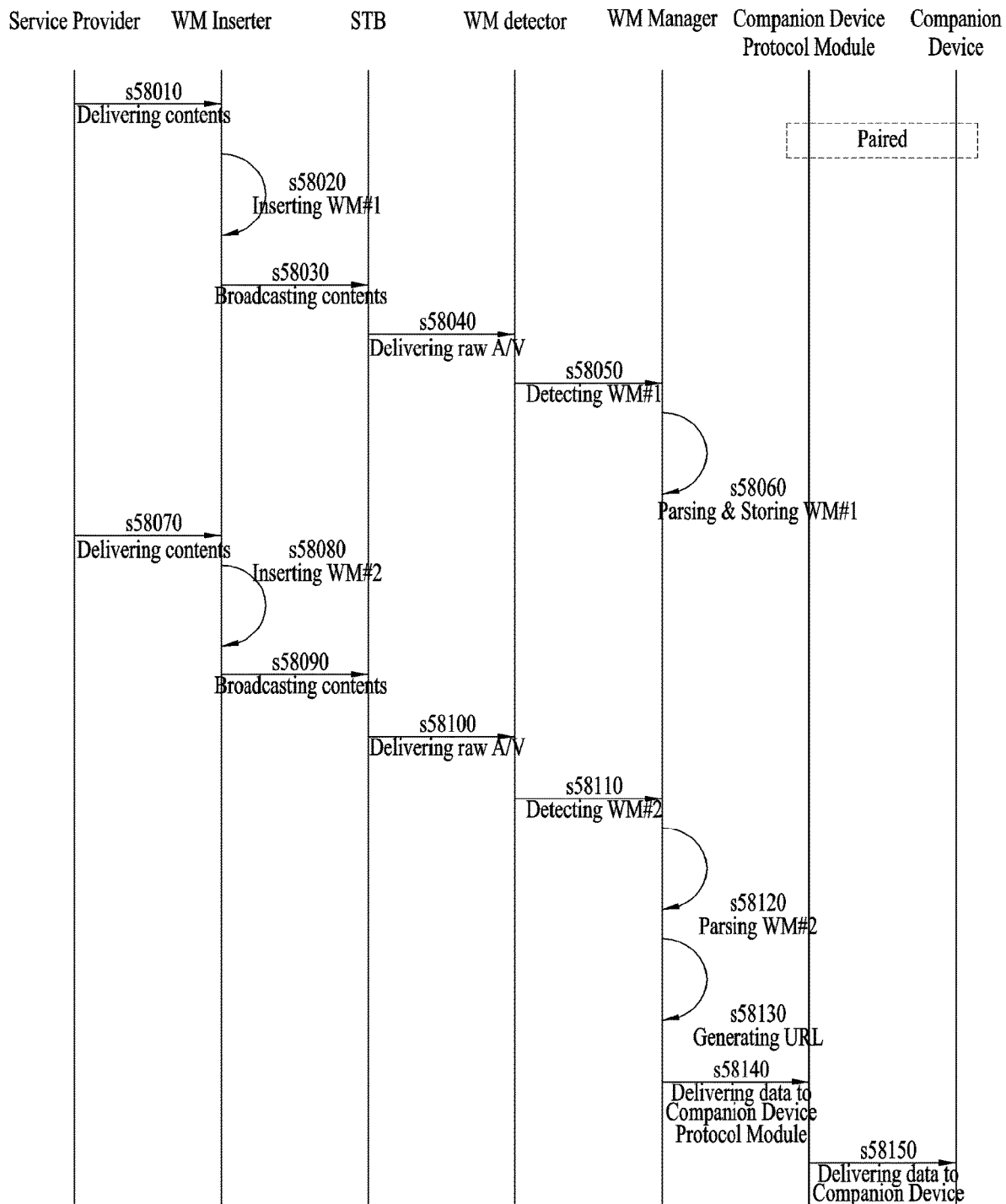
FIG. 30 is a sequence diagram illustrating a procedure of processing the data structure to be inserted into a WM according to embodiment #4 of the present invention.

FIG. 30 is a flowchart illustrating a process of processing the structure of data to be inserted into a WM according to embodiment #4 of the present invention.

Step s58010 of, at the service provider, delivering content to the WM inserter, step s58020 of, at the WM inserter, inserting the received content into the WM #1, step s58030 of, at the WM inserter, transmitting the content, into which the WM #1 is inserted, step s58040 of, at the STB, receiving the content, into which the WM #1 is inserted, and outputting the incompressible A/V data, and step s58050 of, at the WM detector, detecting the WM #1 may be equal to the above-described steps.

WM #1 means one of WMs into which divided data is inserted and may be a first WM in embodiment #4 of the present invention. As described above, the block number field of this WM is 0x00 and URL information may be atsc.org.

The WM manager may parse and store detected WM #1 (s58060). At this time, the WM manager may perform parsing by referring to the number of bits of each field and the total length of the WM. Since the value of the block number field is different from the value of the last block number field and the value of the delivery type field is 1, the WM manager may parse and store the WM and then wait for a next WM.

Here, step s58070 of, at the service provider, delivering the content to the WM inserter, step s58080 of, at the WM inserter, inserting the received content to WM #2, step s58090 of, at the WM inserter, transmitting the content, into which WM #2 is inserted, step s58100 of, at the STB, receiving the content, into which WM #2 is inserted, and outputting incompressible A/V data and/or step s58110 of, at the WM detector, detecting WM #2 may be equal to the above-described steps.

WM #2 means one of WMs into which divided data is inserted and may be a second WM in embodiment #4 of the present invention. As described above, the block number field of this WM is 0x01 and URL information may be /apps/app1.html.

The WM manager may parse and store detected WM #2 (s58120). The information obtained by parsing WM #2 and the information obtained by parsing already stored WM #1 may be combined to generate an entire URL (s58130). In this case, the entire URL may be http://atsc.org/apps/app1.html as described above.

Step s58140 of, at the WM manager, delivering related data to the companion device protocol module of the receiver according to the destination type field and step s58150 of, at the companion device protocol module, delivering related data to the companion device according to the destination type field may be equal to the above-described steps.

The destination type field may be delivered by WM #1 as described above. This is because the destination flag field value of the first WM of embodiment #4 of the present invention is 1. As described above, this destination type field value may be parsed and stored. Since the destination type field value is 0x02, this may indicate data for a smartphone.

The companion device protocol module may communicate with the companion device to process the related information, as described above. As described above, the WM detector and the WM manager may be combined. The combined module may perform the functions of the WM detector and the WM manager.

Figure 31:
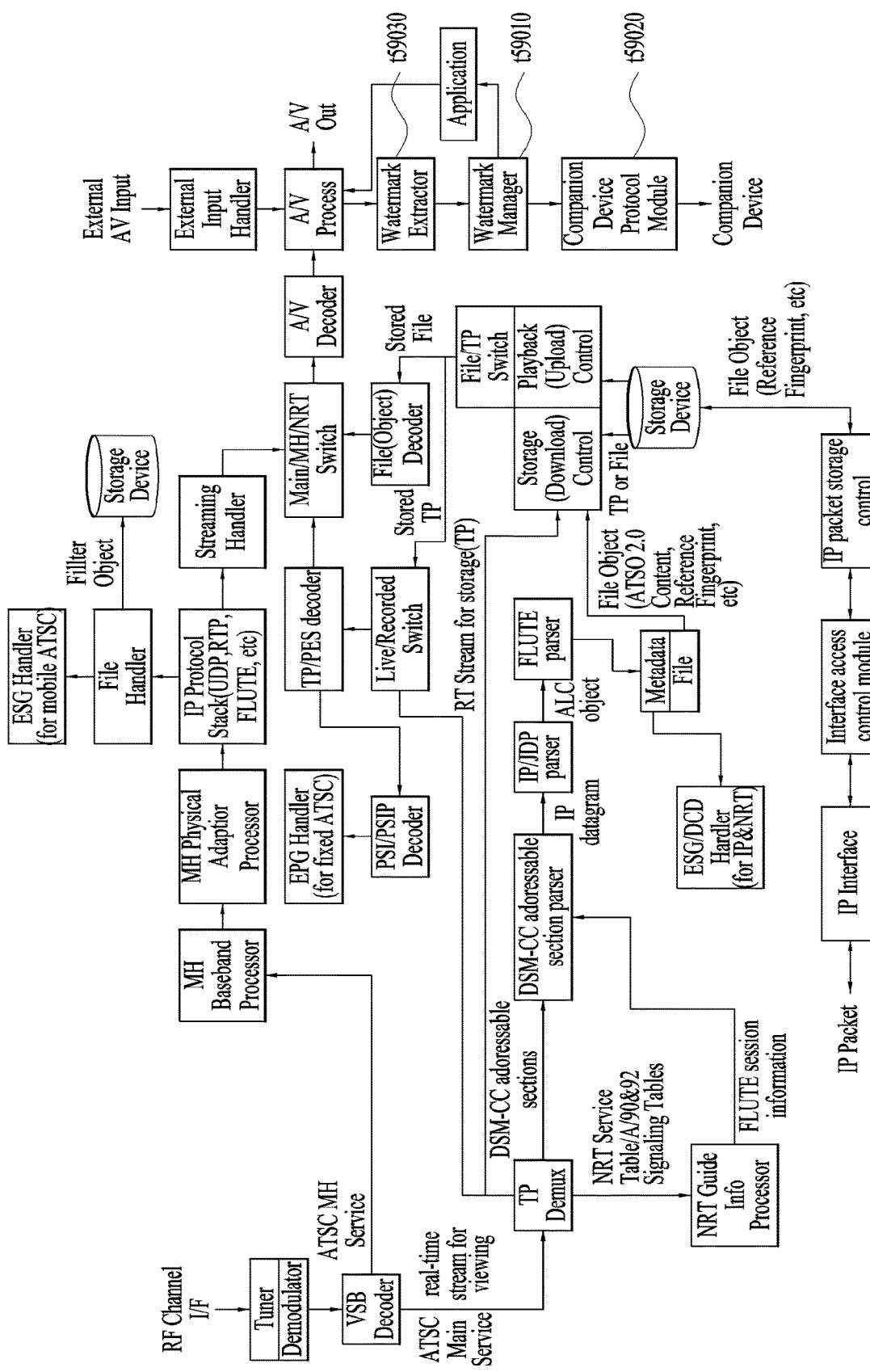
FIG. 31 is a diagram illustrating a structure of a watermark-based image display device according to another embodiment of the present invention.

FIG. 31 is a diagram showing the structure of a watermark based image display apparatus according to another embodiment of the present invention.

This embodiment is similar to the structure of the above-described watermark based image display apparatus, except that a WM manager t59010 and a companion device protocol module t59020 are added under a watermark extractor s59030. The remaining modules may be equal to the above-described modules.

The watermark extractor t59030 may correspond to the above-described WM detector. The watermark extractor t59030 may be equal to the module having the same name as that of the structure of the above-described watermark based image display apparatus. The WM manager t59010 may correspond to the above-described WM manager and the companion device protocol module t59020 may correspond to the above-described companion device protocol module. Operations of the modules have been described above.

FIG. 32 is a diagram showing the structure of a watermark payload according to another embodiment of the present invention.

The watermark payload of the shown embodiment may include domain type information, server URL information, timestamp information and/or trigger type information. In some embodiments, the shown watermark payload may be used as an audio or video watermark. Here, the watermark may be referred to as a WM. In some embodiments, the WM payload may have a size of 50 bits and a WM system may deliver 50 bits at an interval of 1.5 seconds.

The domain type information may indicate the type of the WM payload. The domain type information may indicate how the sizes of the server URL information and timestamp information of the payload are assigned. According to the domain type information, there is a trade-off in a scope of uniqueness between a server code of a server URL field and an interval code of a timestamp field. The domain type information may indicate whether the payload has a small domain, a medium domain or a large domain according to the size assigned to the field. In some embodiments, the domain type information may have a size of 1 bit. In this case, the domain type information may indicate whether the payload has a small domain or a large domain.

The server URL information may include a server code. This server code may be a value for identifying a server operating as a starting point for supplementary content acquisition. Sever URL information or server code may be in the format of an Internet address or IP address capable of acquiring supplementary content or a specific code mapped to such an address. It is possible to access a URL which may be confirmed through the server URL information to acquire a variety of supplementary content.

The supplementary content may mean content which may be provided to a viewer in addition to services/content currently transmitted from an MVPD to a receiver. The supplementary content may include services, content, timeline, application data, alternate components or application related information. The supplementary content may be referred to as interactive service information. In addition, the supplementary content may include application property information for providing an interactive service of a broadcast service/content. In addition, the supplementary content may include event information of a specific application. Here, the event information may be notification or signaling information for initiating actions to be performed by the application.

The timestamp information may include an interval code. This interval code may be a value for identifying the interval of the content into which the payload is embedded. The timestamp information or the interval code may identify the embedding interval of the payload or may identify transmission time information of the content into which the WM packet or WM payload is embedded or how many WM packets or WM payloads are embedded. When it is identified how many WM packet or WM payloads are embedded, the time interval between WMs may be predetermined. In some embodiments, the timestamp information may be referred to as interval information.

The trigger type information may signal when an event is available. Changing the value of the trigger type information within consecutive WM payloads may indicate that an event is available/acquired from an event server. Here, the event may be the above-described event information. Here, the event may be a dynamic event. The dynamic event may mean an event, the start time of which is known at the last minute. For example, event information of a live broadcast service may be a dynamic event. Here, the event server is a dynamic event server and may be an HTTP server. In some embodiments, trigger type information may be referred to as query information, a query flag, etc.

That is, the trigger type information may indicate whether a URL according to server URL information needs to be accessed. In some embodiments, the trigger type information may indicate whether application property information is acquired or whether event information is acquired upon accessing the URL. The event information is time sensitive information and thus needs to be distinguished from the application property information, in order to prevent necessary time sensitive information from not being acquired by unnecessarily using resources to acquire non-time-sensitive information. In some embodiments, the trigger type information may indicate whether the application property information to be acquired is changed, which will be described in detail below.

In some embodiments, the server URL information and the timestamp information may have a size of 30 bits or 17 bits (small domain type), a size of 22 bits or 25 bits (medium domain type) and a size of 18 bits or 29 bits (large domain type). In some embodiments, these values may be changed. In this case, the small domain may have one billion server codes and an interval code of about 54.6 hours, the medium domain may have 4.2 million server codes and an interval code of about 1.59 years and the large domain may have 262,144 server codes and an interval code of about 25.5 years.

In some embodiments, the server URL information and the timestamp information may have a size of 31 bits or 17 bits (small domain type) and a size of 23 bits or 25 bits (large domain type). In this case, the domain type information may have a size of 1 bit and the trigger type information may have a size of 1 bit. In some embodiments, these values may be changed.

In some embodiments, the trigger type information of the shown WM payload may have a size of 2 bits. If the trigger type information is 00, this indicates that the application property information may be acquired by accessing the server URL and this property information is not changed as compared to the property information capable of being acquired using the server URL of a previous WM. If the trigger type information is 01, this indicates that the application property information may be acquired by accessing the server URL and this property information is changed as compared to the property information capable of being acquired using the server URL of the previous WM. If the trigger type information is 10, this indicates that event information may be acquired by accessing the server URL. The trigger type information of 11 may be reserved for future use.

In some embodiments, if the trigger type information is assigned 2 bits, the meaning of the value of the trigger type information may be changed. For example, if the trigger type information is 00, this indicates that there is no additional app, component or information capable of being acquired by making a request from a server at this interval. In this case, a request (query) may not be sent to the server. If the trigger type information is 01, this indicates that there is an additional app, component or information capable of being acquired by making a request from a server at this interval. In this case, a request (query) may be sent to the server. If the trigger type information is 10, this indicates that event information may be acquired by accessing the server URL. Accordingly, in this case, even when a request is made recently, a request should be made again. The trigger type information of 11 may be reserved for future use.

In some embodiments, the structures of the above-described WM payloads may be combined. In addition, in some embodiments, the assigned sizes of the information of the above-described payloads may be combined. For example, trigger type information of 1 bit or trigger type information of 2 bits may be combined, for the sizes of the server URL information and the timestamp information according to the small, medium and large domains. In addition, domain type information of 1 bit or the domain type information of 2 bits may be combined, for each case.

FIG. 33 is a diagram showing change in watermark payload structure using service/content information according to one embodiment of the present invention.

Service information and/or content information may be added to and delivered in each WM payload structure or each combinable WM payload structure. Here, the service information may be related to a service, into which the WM is embedded. This service information may be in the format of a service ID or channel ID. When the service information is included and delivered in the WM payload, a server may selectively provide only supplementary content (interactive service) of a specific service/channel. In addition, when a service/channel which is being viewed is changed, an interactive service of a previous service/channel may be rapidly finished. Here, the content information may be related to content, into which the WM is embedded. The content information may be in the format of a content ID. When the content information is included and delivered in the WM payload, the server may selectively provide supplementary content (interactive service) of specific content.

In the shown embodiment (t502010), service information and/or content information is added to one of the above-described WM payloads. In the shown embodiment (t502020), the above-described WM payload structure is minimized and then service information and/or content information are added. In this case, the domain type information is omitted and the sizes of the server URL information, the timestamp information and the trigger type information are reduced to 18 bits, 17 bits and 2 bits, respectively. In the two embodiments, the service information and content information may have arbitrary sizes (x and y bits) according to a related broadcast system. In some embodiments, only one of the service information and the content information may be added.

FIG. 34 is a diagram showing change in watermark payload structure using an NSC field according to one embodiment of the present invention.

Each of the above-described WM payload structures may be changed to add a no supplemental content (NSC) field. The NSC field may indicate whether supplementary content is available. The NSC field may operate as a 1-bit flag. The supplementary content has been described above.

1 bit for the NSC field may be acquired by reducing the size of the above-described domain type information. In some embodiments, the size of the domain type information may be reduced to 1 bit. As described above, the domain type information may include the type of the WM payload. In this case, the domain type information may indicate whether the WM payload is a small domain or a large domain. That is, if two types of domain are sufficient, 1 bit of the domain type information is assigned to the NSC field to indicate whether supplementary content is available. In some embodiments, the NSC field may be added to the above-described WM payload structure without reducing the size of the domain type information.

In this embodiment, in the small domain, the server URL field may have a size of 22 bits and the timestamp field may have a size of 25 bits. In the large domain, the server URL field may have a size of 18 bits and the timestamp field may have a size of 29 bits. The small domain may have about 4.2 million server codes and an interval code of about 1.59 years and the large domain may have about 262,144 server codes and an interval code of about 25.5 years. Here, the trigger type information may have a size of 1 bit or 2 bits.

According to the information on the WM payload, the receiver may send a request (query) to the server. The request may be sent (1) when the receiver receives (tunes) a first watermarked segment and makes a request, (2) when a request is further made according to request information of supplementary content and (3) when a request is made according to the above-described trigger type information.

According to addition of the NSC field, a request may not be made when supplementary content is not present. For example, when the receiver first receives a watermark, a request may not be made. Accordingly, in channel surfing, addition of the NSC field may be efficient. In addition, even when supplementary content is not present, the service/content may be marked (watermarked) in order to report service usage. Even in this case, addition of the NSC field may be efficient. In particular, addition of the NSC field may be further efficient in a mechanism for delivering a report for storage & usage. That is, generally, addition of the NSC field may be efficient when a large amount of content is marked (watermarked) but supplementary content is not present. In addition, the continuously watermarked content may be preferable in an SMPTE open ID. In this case, continuously marked content may aid two SDOs in determining a common WM solution.

FIG. 35 is a diagram showing a watermark payload structure for linking video and audio watermarks according to one embodiment of the present invention.

The present invention proposes a method of simultaneously embedding a video WM and an audio WM as one embodiment. To this end, a portion of a video WM payload may be assigned to an audio WM payload. A portion (e.g., 50 bits) of the video WM payload (e.g., 30 to 60 bytes) may carry duplicate information of the audio WM payload. The duplicate information may be equal to the information of the audio WM payload and a copy of the audio WM payload.

In addition, the video WM and the audio WM may be synchronized and transmitted. The video WM may include at least one or more message blocks and one of the message blocks may have the WM payload of the structure. In this case, the audio WM embedded in the audio of the service/content may have the same WM payload as the video WM. At this time, a first video frame of a message block for delivering a video WM payload may be time aligned with a first part of an audio WM corresponding thereto. In some embodiments, the video WM and the audio WM may be time aligned within a predetermined error. In some embodiments, the message block may include a plurality of video frames and each video frame may have the same video WM payload which is repeated. In some embodiments, a portion of the audio WM payload may be assigned to carry the copy of the video WM payload.

For example, a problem may occur when a user retrieves and displays an electronic service guide (ESG) from an MVPD set top box (STB). First, only when the audio WM is used, although the ESG is displayed, audio may be continuously played. However, an audio WM client may not know that the ESG is being displayed. Accordingly, an application may be continuously executed and graphics may overlap the ESG, thereby causing disturbance.

In addition, if only the video WM is used, when the ESG is displayed, the video WM client may recognize that the WM disappears and judge that a viewer has changed channels or has completed an interactive event. Accordingly, although the viewer tries to turn the ESG off without changing the channels and to resume the interactive service at a predetermined point, the application may be finished by the video WM client.

Accordingly, the audio WM and the video WM are efficiently used in tandem. Unlike the audio WM, the video WM may inform the receiver that main video is not focused upon on the screen (the ESG is used). In addition, unlike the video WM, the audio WM may continuously provide WM information while the ESG is used. Accordingly, the receiver may track whether the WMs or the related supplementary content are changed while operating the ESG.

Accordingly, the ESG being displayed on the screen may be recognized by the video WM and appropriate receiver operation may be continuously performed by the audio WM. For example, if the application does not provide graphics (e.g., background app), the application may be continuously executed regardless of the ESG. For example, if the application provides graphics, the application may be suppressed until the ESG disappears. For example, when the application receives an event, the receiver may process the event on the background until the ESG disappears. That is, this problem may be solved by linking the audio WM and the video WM.

Figure 36:
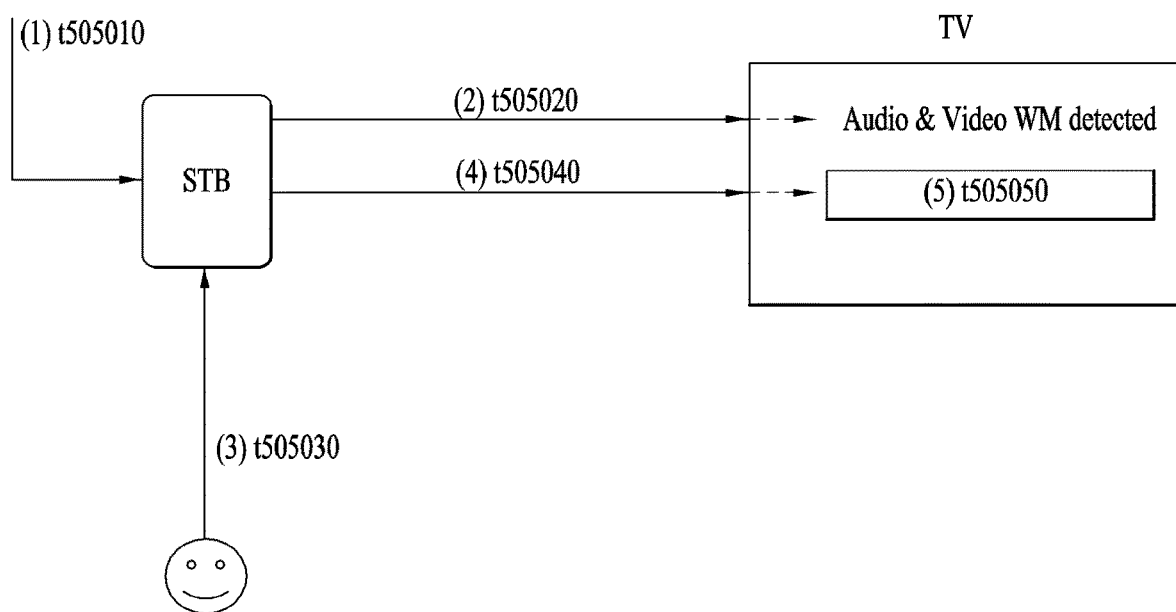
FIG. 36 is a diagram illustrating an operation using linked video-audio watermarks according to an embodiment of the present invention.

FIG. 36 is a diagram showing operation using linked video and audio watermarks according to one embodiment of the present invention.

First, operation when an ESG is displayed on a screen by a user will be described. First, an original service/content may be delivered from a broadcast station to an MVPD such as an STB (t505010). An external input source such as an STB or a cable may deliver the original service/content to a receiver (t505020). Here, the delivered AV content is in an uncompressed state and may have the linked audio WM and video WM. The receiver may sense the audio WM and the video WM and perform operation corresponding thereto.

Here, the user may request an ESG from a remote controller of the STB (t505030). The STB may display the ESG on a TV screen (t505040). The ESG may be overlaid on the AV content which is being played back. The TV receiver may sense the audio WM but may not sense the video WM (t505050). The receiver may recognize that main video content is covered with the other graphics such as ESG, access the linked audio WM and seamlessly perform necessary operation.

Next, operation when the user mutes content will be described. Steps t505010 to t505020 of the TV receiver receiving AV content through the STB have been described above. Here, the user may request mute from the remote controller of the STB (t505030). The STB may mute the AV content (t505040). The TV receiver may sense the video WM but may not sense the audio WM (t505050). The receiver may recognize that the main audio content is muted and acquire audio WM payload data through the linked video WM payload. Therefore, the receiver can seamlessly perform necessary operation.

Figure 37:
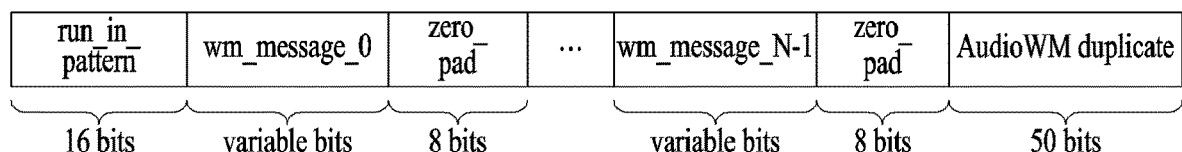
FIG. 37 is a diagram illustrating a video WM payload format according to an embodiment of the present invention.

FIG. 37 is a diagram illustrating a video WM payload format according to an embodiment of the present invention.

Referring to (a), configuration fields of a video WM payload (or video watermark) according to an embodiment of the present invention are shown.

The video WM payload may include a run_in_pattern field, at least one wm_message( ) field, at least one zero_pad field and/or an AudioWM duplicate field (or audio watermark).

The run_in_pattern field indicates that a video line includes a WM (watermark) having a specific format. For example, the run_in_pattern field is 16 bits and may have a value of "0xEB52".

The wm_message( ) field may include a WM message and/or a WM message block. The WM message may include all data. The WM message may include at least one WM message block. The WM message block may be a fragment of the WM message. For example, the wm_message( ) field can be referred to as the aforementioned message block. In addition, the WM message may include a video WM and/or an audio WM.

The zero_pad field may have a value of "0" used to pad the end of a frame.

The AudioWM duplicate field may include an audio WM and/or an audio WM payload. For example, the AudioWM duplicate field may include information which is a duplicate of the audio WM payload. This duplicate information is the same as information of the audio WM payload and may be a copy. The AudioWM duplicate field can be included in a video WM and may be included in the wm_message( ) field of the video WM payload.

Hereinafter, the wm_message( ) field will be described in more detail.

For example, the wm_message( ) field may include a wm_message_id field, a wm_message_block_length field, a wm_message_version field, a fragment_number field, a last_fragment field and/or a wm_message_bytes( ) field.

The wm_message_id field can identify the syntax and/or semantics of data bytes transmitted in a message block. The wm_message_id field may be referred to as a WMId field. For example, the wm_message_id field can indicate one of a content ID message, a presentation time message, a URI message, a vpl_message, an audio WM, an event message and an emergency alert message.

The wm_message_block_length field can specify the number of bytes remaining in the wm_message( ) field. The wm_message_block_length field may be referred to as a block length field.

The fragment_number field can indicate the number of a current message fragment or a value obtained by subtracting "1" from the number of the current message fragment. The fragment_number field may be referred to as a block number field.

The last_fragment field can indicate the fragment number of the last fragment used to transmit a complete WM message (or wm_message( )). The last_fragment field may be referred to as a last block number field.

The wm_message_bytes( ) field may be referred to as a payload including actual data. When the last_fragment field is "0", the wm_message_bytes( ) field can include a WM message of a complete instance identified by the wm_message_id field. When the last_fragment field is not "0", the wm_message_bytes( ) field can include fragment data of the corresponding WM message. For example, the wm_message_bytes( ) field can include at least one of a content ID message, a presentation time message, a URI message, a vpl_message (or audio WM), an event message and an emergency alert message.

The wm_message version field can indicate the version of a WM message.

Referring to (b), a video WM payload according to an embodiment of the present invention is shown.

One video WM payload may include all pieces of data.

For example, the video WM payload can include a run_in_pattern field, at least one wm_message( ) field (wm_message_0, . . . , wm_message_N−1) and/or an AudioWM duplicate field. The wm_message( ) field may include a complete WM message or at least one divided WM message block. In this case, although one video WM payload can include all pieces of data, the size of the video WM payload may increase.

In addition, one video WM payload may be divided into a plurality of video WM payloads. For example, a divided video WM payload may include a run_in_pattern field, at least one wm_message( ) field (wm_message_0, . . . , wm_message_N−1) and/or an AudioWM duplicate field. The wm_message( ) field may include at least one divided WM message block. The AudioWM duplicate field may be included in a divided video WM payload or at least one divided WM message block.

In this case, each divided video WM payload can include divided data of a WM message and thus the size of each video WM payload can be decreased.

Figure 38:
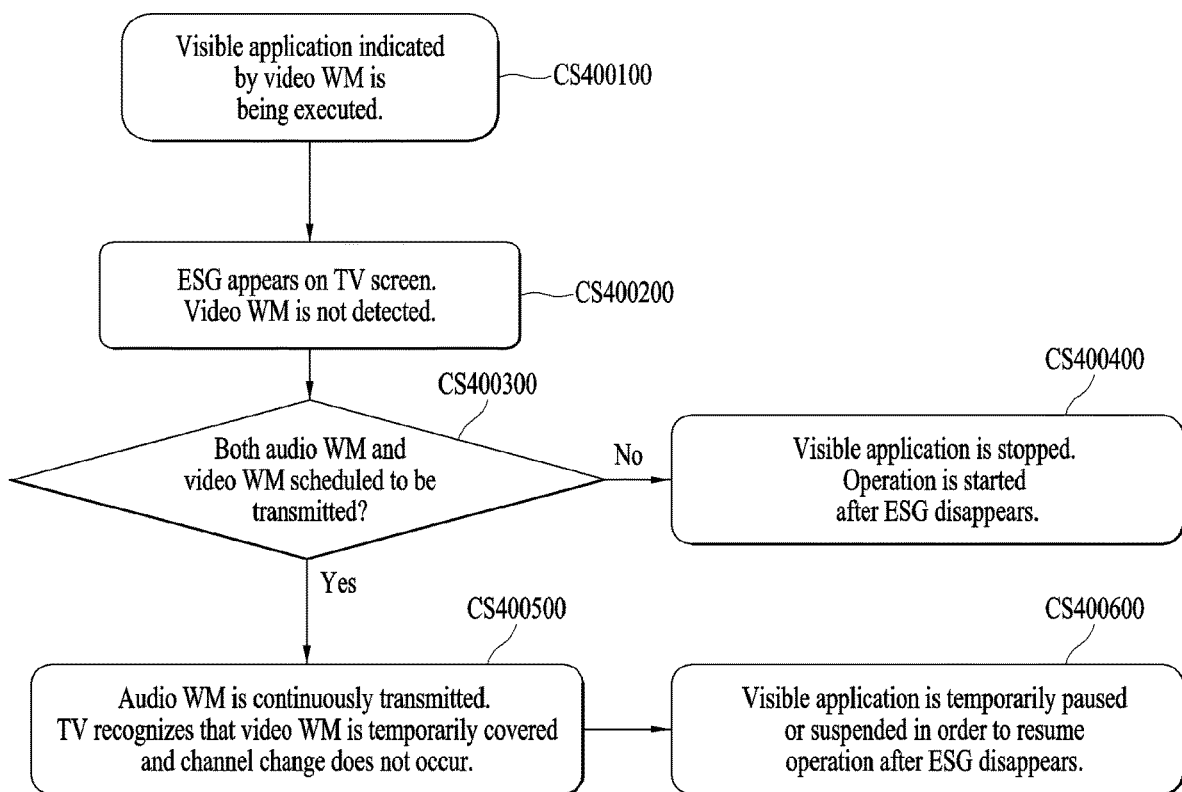
FIG. 38 is a diagram illustrating a receiver operation when a user displays an ESG on a screen while a visible application is executed according to an embodiment of the present invention.

FIG. 38 illustrates a receiver operation when a user displays an ESG on a screen while a visible application is executed according to an embodiment of the present invention.

First, an original service/content may be received through an MVPD such as an STB from a broadcaster. An external input source such as an STB and a cable can deliver the original service/content to a receiver. Here, delivered AV content may be in an uncompressed state and have a linked audio WM and video WM. The receiver can detect the audio WM and the video WM and perform operations according thereto.

Then, a visible application indicated by the video WM can be operated in the receiver (CS400100). The visible application may be an application which visually appears on a screen of the receiver.

Thereafter, the user may request an ESG using a remote controller of the STB. For example, the user can push a button of the remote controller of the STB in order to view the ESG.

Then, the ESG is displayed on the screen (e.g., TV screen) of the receiver (CS400200). The ESG may be overlaid on the AV content being reproduced. In this case, the receiver detects the audio WM but may not detect the video WM.

Subsequently, the receiver may determine whether both the audio WM and the video WM are scheduled to be transmitted (CS400300).

When both the audio WM and the video WM are not scheduled to be transmitted, the receiver needs to stop the visible application. After the ESG disappears, the receiver can start the operation of the corresponding application upon detection of the video WM again (CS400400).

When both the audio WM and the video WM are scheduled to be transmitted, the receiver can continuously receive the audio WM (CS400500). In addition, the receiver can be aware that the video WM has been temporarily covered and channel change does not occur. That is, the receiver can recognize that channel change does not occur on the basis of the continuously transmitted audio WM.

Then, the receiver can temporarily pause or suspend the operation of the visible application in order to resume the operation of the visible application after the ESG disappears (CS400600). Here, a state of the application at the moment when the operation of the application is paused or suspended may be stored and used when the operation of the application is resumed.

Accordingly, the user may not operate an application (e.g., visible application) indicated by the audio WM on the ESG or may not display the application on the screen upon recognizing that main video content has been covered by other graphics such as the ESG.

Figure 39:
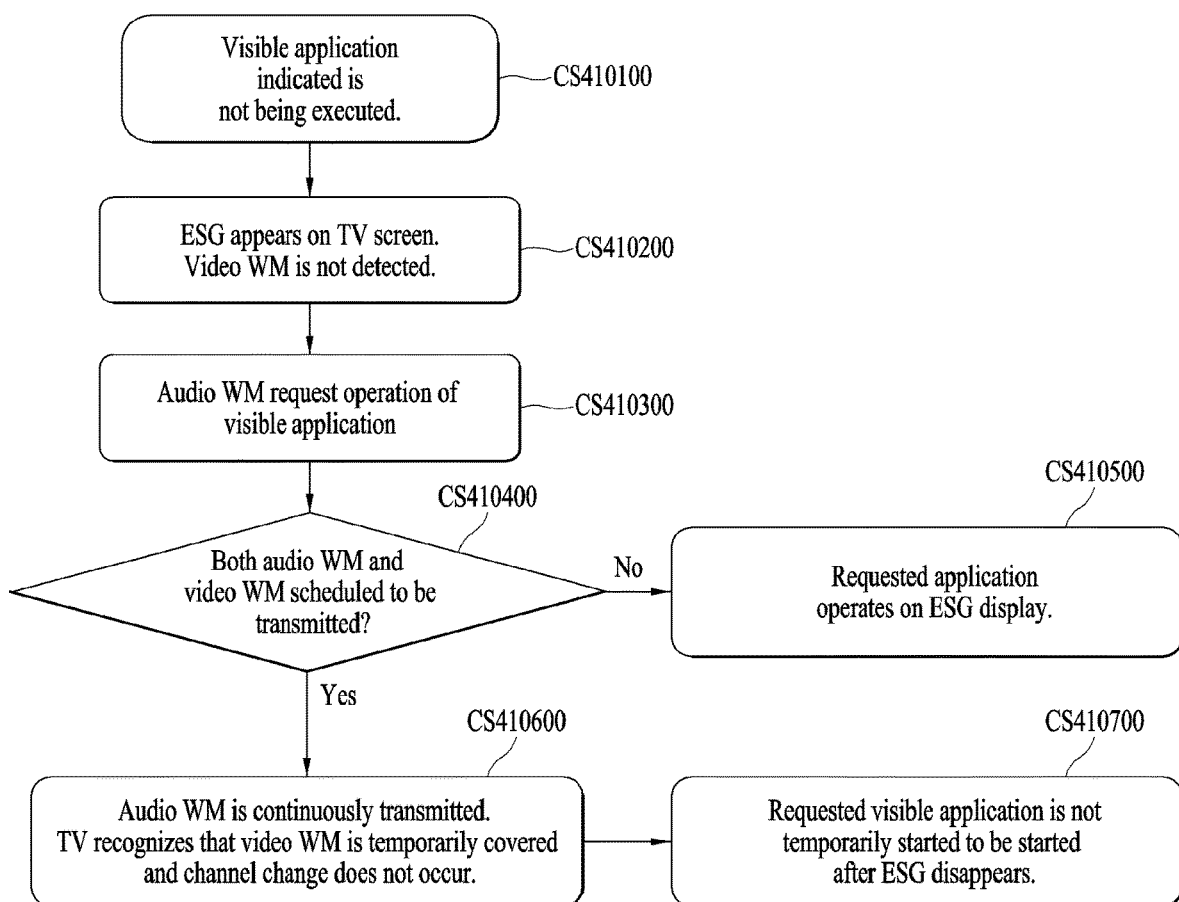
FIG. 39 is a diagram illustrating a receiver operation when a visible application is executed after an ESG is displayed on a screen according to an embodiment of the present invention.

FIG. 39 illustrates a receiver operation when a visible application is executed after an ESG is displayed on a screen according to an embodiment of the present invention.

A basic operation of the receiver may include the aforementioned description. The following description is based on a difference from the above-described receiver operation.

Distinguished from the above description, a visible application is not executed in the receiver (CS410100). A user may request an ESG using a remote controller of an STB.

Then, the ESG is displayed on the screen (e.g., TV screen) of the receiver (CS410200). The ESG may be overlaid on AV content being reproduced. In this case, the receiver detects an audio WM but may not detect a video WM.

Thereafter, the receiver requests execution of the visible application using the audio WM (CS410300).

Subsequently, the receiver may determine whether both the audio WM and the video WM are scheduled to be transmitted (CS410400).

When both the audio WM and the video WM are not scheduled to be transmitted, the receiver needs to execute the requested visible application on the ESG (CS410500). That is, the visible application can be started after the ESG is displayed on the screen.

When both the audio WM and the video WM are scheduled to be transmitted, the receiver can continuously receive the audio WM (CS410600). In addition, the receiver can be aware that the video WM has been temporarily covered and channel change does not occur. That is, the receiver can recognize that channel change does not occur on the basis of the continuously transmitted audio WM.

Then, the receiver may not start the visible application in order to start the visible application after the ESG disappears (CS410700).

Accordingly, the receiver may not operate an application (e.g., visible application) indicated by the audio WM on the ESG or may not display the application on the screen upon recognizing that main video content has been covered by other graphics such as the ESG.

Figure 40:
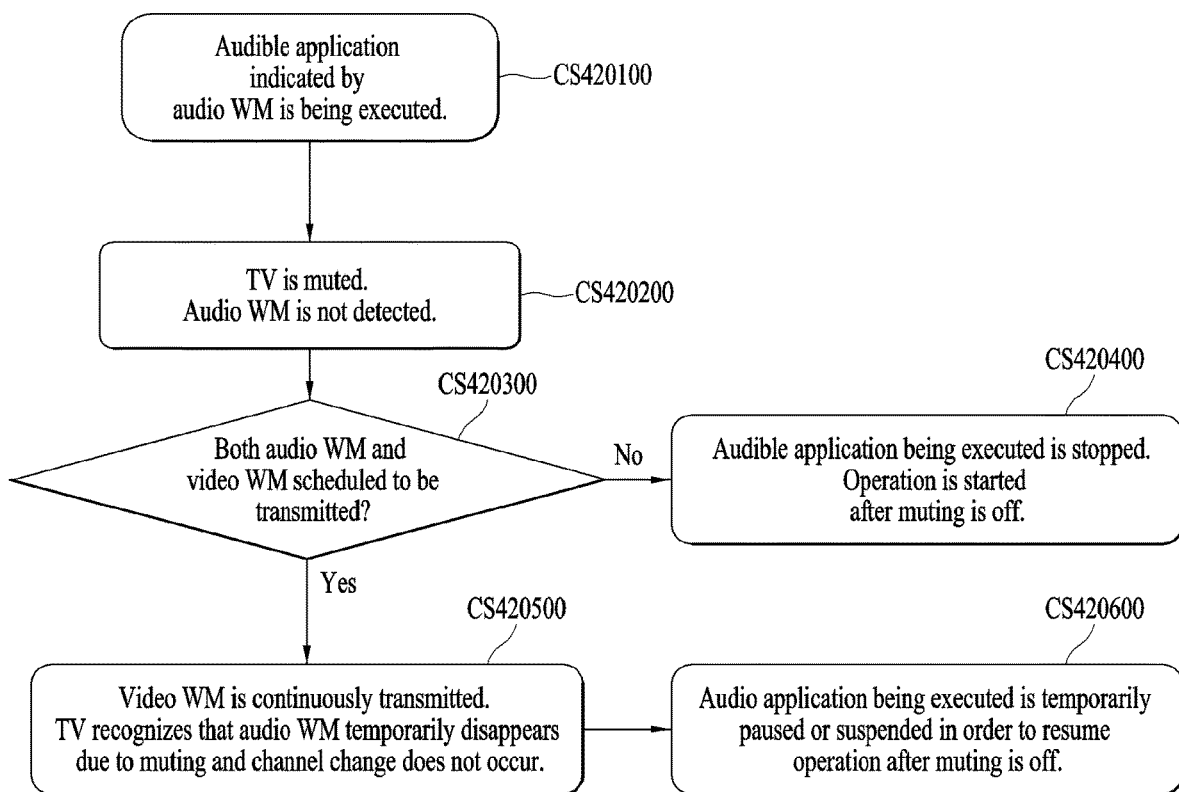
FIG. 40 is a diagram illustrating a receiver operation when a receiver is muted by a user while an audible application is executed according to an embodiment of the present invention.

FIG. 40 illustrates a receiver operation when a receiver is muted by a user while an audible application is executed according to an embodiment of the present invention.

A basic operation of the receiver may include the aforementioned description. The following description is based on a difference from the above-described receiver operation.

An audible application indicated by an audio WM can be executed in the receiver (CS420100). The audible application may be an application which generates sound through a speaker of the receiver.

The user may request muting using a remote controller of an STB. For example, the user can push a button of the remote controller of the STB for muting.

Then, the receiver (e.g., TV) is muted (CS420200). The receiver detects a video WM but may not detect an audio WM.

Subsequently, the receiver may determine whether both the audio WM and the video WM are scheduled to be transmitted (CS420300).

When both the audio WM and the video WM are not scheduled to be transmitted, the receiver needs to stop the audible application being executed. Then, the receiver can start the corresponding application upon detection of the audio WM again after muting is turned off (CS420400).

When both the audio WM and the video WM are scheduled to be transmitted, the receiver can continuously receive the video WM (CS420500). In addition, the receiver can be aware that the audio WM has temporarily disappeared due to muting and channel change does not occur. That is, the receiver can recognize that channel change does not occur on the basis the continuously transmitted video WM.

To resume the operation after muting is off, the receiver may temporarily pause or suspend the audible application being executed. Here, a state of the application at the moment when the operation of the application is paused or suspended may be stored and used when the operation of the application is resumed.

Accordingly, the user may not generate sound of an application (e.g., audible application) indicated by the video WM upon recognizing that main audio content is muted.

Figure 41:
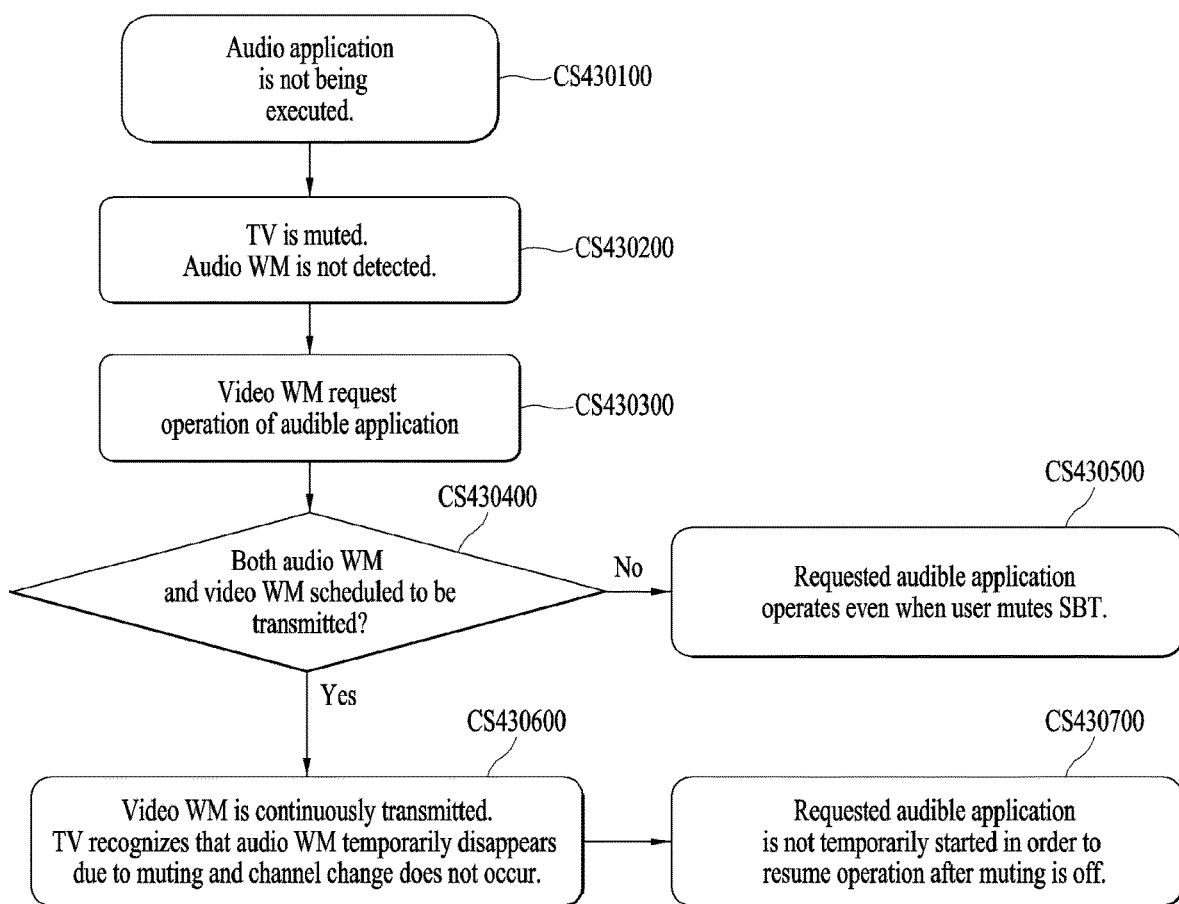
FIG. 41 is a diagram illustrating a receiver operation when an audible application executed after a receiver is muted according to an embodiment of the present invention.

FIG. 41 illustrates a receiver operation when an audible application is executed after muting according to an embodiment of the present invention.

A basic operation of the receiver may include the aforementioned description. The following description is based on a difference from the above-described receiver operation.

Distinguished from the above description, an audible application is not executed in the receiver (CS430100). A user may request muting using a remote controller of an STB.

Then, the TV is muted (CS430200). In this case, the receiver detects a video WM but may not detect an audio WM.

The receiver requests execution of the audible application using the video WM (CS430300).

Then, the receiver may determine whether both the audio WM and the video WM are scheduled to be transmitted (CS430400).

When both the audio WM and the video WM are not scheduled to be transmitted, the receiver needs to execute the audible application although the user has muted the receiver and/or the STB (CS430500). That is, the audible application can be started after the receiver is muted.

When both the audio WM and the video WM are scheduled to be transmitted, the receiver can continuously receive the video WM (CS430600). In addition, the receiver can be aware that the audio WM has temporarily disappeared due to muting and channel change does not occur. That is, the receiver can recognize that channel change does not occur on the basis of the continuously transmitted video WM.

Subsequently, the receiver may not immediately start the audible application in order to start the operation after muting is turned off.

Accordingly, the receiver may not generate sound of the application (e.g., audible application) indicated by the video WM upon recognizing that main audio content has been muted.

Figure 42:
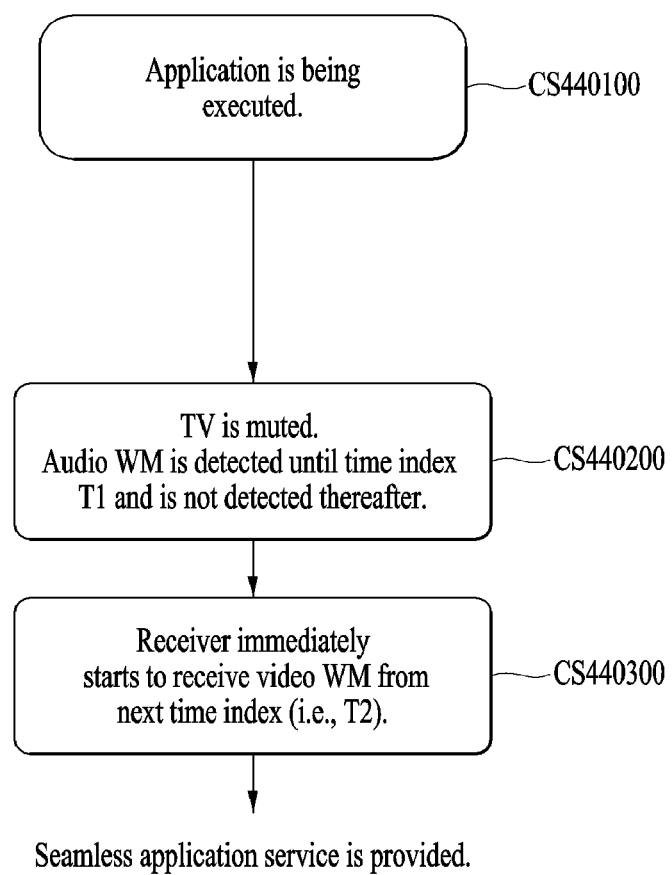
FIG. 42 is a diagram describing advantages of video WM including audio WM according to an embodiment of the present invention.

FIG. 42 is a diagram describing advantages of a video WM including an audio WM according to an embodiment of the present invention.

An application is executed in a receiver (CS440100). The receiver can receive information related to the application such as attributes and events through an audio WM. A user can push a button of the remote controller of the STB for muting.

Then, the receiver is muted (CS440200). For example, the receiver can detect the audio WM until a time index T1 but cannot detect the audio WM after that point.

The receiver starts to receive the video WM from the next time index (i.e., T2) (CS440300). For example, the video WM can include the audio WM.

Accordingly, the receiver can provide a seamless application service on the basis of the audio WM.

Figure 43:
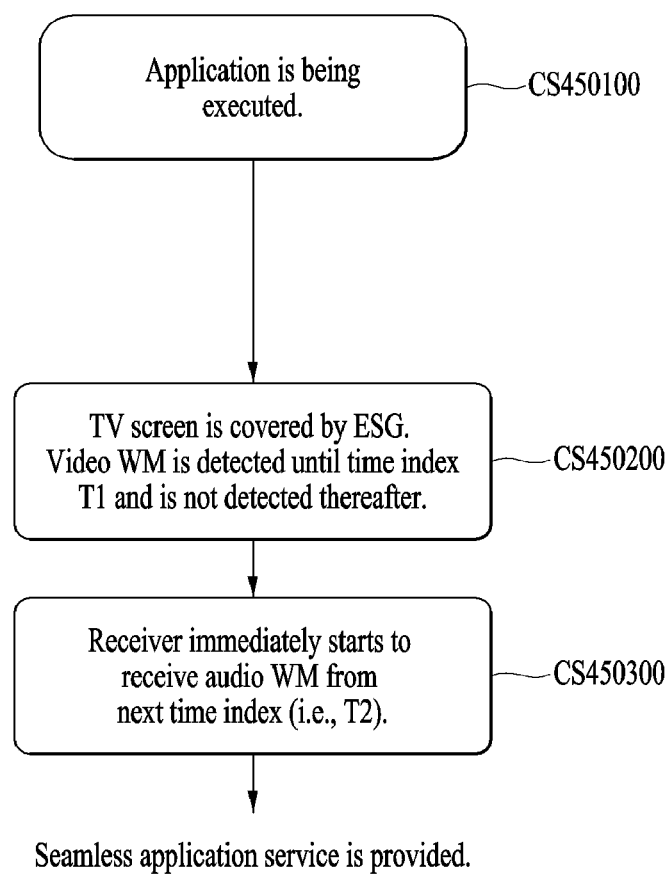
FIG. 43 is a diagram describing advantages of video WM including audio WM according to another embodiment of the present invention.

FIG. 43 is a diagram describing advantages of a video WM including an audio WM according to another embodiment of the present invention.

An application is executed in a receiver (CS450100). The receiver can receive information related to the application such as attributes and events through a video WM. A user can push a button of the remote controller of the STB in order to display an ESG.

Then, the screen of the receiver is covered by the ESG (CS450200). For example, the receiver can detect the video WM until a time index T1 but cannot detect the video WM after that point.

The receiver starts to receive the audio WM from the next time index (i.e., T2) (CS450300). For example, the video WM can include the audio WM. Since the audio WM is transmitted through the video WM, the receiver can be aware of the audio WM segment immediately following the finally received video WM segment. That is, the receiver can recognize the audio WM segment immediately following the finally received video WM segment on the basis of the audio WM included in the finally received video WM and acquire the next audio WM which is separately received.

Accordingly, the receiver can provide a seamless application service on the basis of the audio WM.

FIG. 44 is a diagram illustrating a wm_message( ) format according to another embodiment of the present invention.

As described above, the wm_message( ) field may include an entire WM message or one WM message block. A WM message may include at least one WM message block. A WM message block may be a WM message fragment. When a specific WM message format is defined as not being fragmented or a WM message is delivered without being fragmented according to an embodiment, the wm_message( ) field can include the entire WM message. A WM message block may be called a WM message fragment.

There are various types of WM messages, for example, a content_id_message( ) a channel_id_message( ), a uri_message( ), a vpl_message( ), a dynamic_event_message( ) and/or an EA_message( ). WM messages types may further include a presentation_time_message( ), a display_override_message( ), and the like.

The content_id_message( ) may be a WM message which delivers a content ID related to a corresponding program (=content). This WM message may deliver information such as a major/minor channel number related to the service of the corresponding content according to an embodiment.

The channel_id_message( ) may be a WM message which delivers a service ID related to a corresponding channel (=service). Information included in this WM message may be delivered through the content_id_message( ) and this WM message may not be defined according to an embodiment.

The uri_message( ) may be a WM message used to deliver various types of URIs. The uri_message( ) may include URI type information, a URI string length and/or a URI string. URIs of a signaling server for SLS delivery, an ESG server for ESG delivery, a usage reporting server, and a dynamic event HTTP server/Web Socket server for dynamic event delivery can be transmitted.

The vpl_message( ) may be a WM message used for the aforementioned link between a video WM and an audio WM. This WM message may be used to deliver the same WM payload as the aforementioned audio WM payload. When this message is delivered along with video data, an audio WM can deliver the same WM payload. A video WM payload and an audio WM payload having such information may be called a vpl payload. These may be time-aligned as described. The aforementioned AudioWM duplicate can be omitted when the vpl_message( ) is used.

The dynamic_event_message( ) may be a WM message for delivering a dynamic event and event signaling. This WM message may be called an event message. Details will be described below.

The EA_message( ) may be a WM message which delivers emergency alert (EA) related information. This WM message may be called an EA message.

The presentation_time_message( ) may indicate a presentation time of a video frame carrying the corresponding WM to the receiver. This WM message may include presentation time information and the like.

The display_override_message( ) may be a WM message which indicates a specific interval in which audio needs to be reproduced without being deformed or a specific interval in which video needs to be reproduced without being obstructed by overlay graphics. This is for the purpose of preventing a case in which EA information is not effectively delivered to a user when an EA is burned in audio/video.

The wm_message( ) according to the illustrated embodiment may include a wm_message_id field, a wm_message_length field, a wm_message_sequence field, a fragment_number field and/or a last_fragment field. The fields may be the same as the aforementioned wm_message_id field, the wm_message_block_length field, the fragment_number field and the last_fragment field.

The wm_message( ) according to the illustrated embodiment may include one of WM messages such as the content_id_message( ), the channel_id_message( ), the uri_message( ), the vpl_mesage( ), the dynamic_event_message( ), the presentation_time_message( ), the display_override_message( ) and the EA_message( ) or one of WM message blocks fragmented from the corresponding WM message according to the value of the wm_message_id. A WM message may be additionally added or some of the aforementioned WM message may not be used according to an embodiment.

When a WM message is fragmented into two or more WM message blocks and delivered, a wm_message( ) which delivers the last fragment may further include 32-bit CRC information that covers the entire WM message.

Although the aforementioned wm_message( ) has been described as information included in a video WM payload, it may be used as information included in an audio WM payload according to an embodiment.

FIG. 45 is a diagram illustrating a structure of an audio WM payload according to another embodiment of the present invention.

An MVPD can signal an emergency alert in various ways. First, the MVPD can forcibly tune an STB to an MVPD channel which displays an EA message. Otherwise, the MVPD can cause the current MVPD channel to display an EA message. This can be achieved when the MVPD and a broadcaster agree on retransmission. In this case, the MVPD may generate an EA message thereof and provide the same on content.

When the MVPD displays an EA message through the current broadcast channel (i.e., when the MVPD does not forcibly tune the STB), a problem may be generated if the user displays a personalized graphic overlay or additional interactive content on the screen. To deliver an EA message to a viewer without obstructing the viewer, the receiver may need to rapidly take down overlays when EA is generated. Such take-down may need to be performed using a WM. Here, the overlays are graphic overlays which cover TV screens and may include application screens.

The aforementioned operation is based on the assumption that the EA message has been burned-in at a certain point upstream in an MVPD scenario. That is, the EA message has been embedded in video/audio media data as video or audio data. The aforementioned operation can be performed by a transmission side or the MVPD.

In this case, the burned-in EA message may be obstructed by alternative or supplementary content. For example, a WM may cause the receiver to render certain interactivity (play along in a game show, and the like). Such interactive graphics and audio may obstruct all or some EA messages. In addition, a WM may cause a target advertisement to be embedded. In this case, audio and video from an HDMI may not be rendered to viewers. Accordingly, the burned-in EA message may not be provided to viewers.

In such cases, the receiver can continuously monitor content delivered from an STB and the like in order to detect a WM change even during playback of a target advertisement. Accordingly, when a viewer changes channels or when other situations occur and thus the receiver needs to stop the target advertisement or interactivity rendering, the receiver can be aware of such situation.

A video WM may include message type information about an EA message in order to allow the receiver to rapidly recognize generation of EA and to take down a graphic overlay, target content or the like. An audio WM includes a trigger flag such that the receiver can send a new query to a server.

For example, how fast the receiver responds to a trigger can be detected through the audio WM. With respect to the audio WM, the receiver may need to recognize a trigger in the WM first, request the trigger from a server, parse a recovery file and then take down supplementary content. A total time required to perform such procedure may be changed according to network traffic, a connection speed, a random float time for spreading a query, and the like. However, a long period time is taken in an emergency situation when periods of time taken in respective processes are added.

To solve this problem, a 1-bit flag (EA flag) for EA may be added to the audio WM. Upon detection of the EA flag, the receiver can stop all graphic overlays and immediately return to a main broadcast program. Accordingly, a server query procedure and the like may be omitted. In addition, it is possible to reduce the dependence of a response time on an Internet connection situation. Of course, an additional query may be performed as necessary.

The aforementioned solution may be achieved by methods other than the method of adding the 1-bit EA flag. First, a WM insertion method is divided into two types of processing, and when a WM is inserted, a receiver may be controlled to recognize an EA situation using specific processing. Alternatively, a duration in which an overlay and the like need to be in a state in which they have been taken down in order to display an EA message may be signaled instead of the 1-bit EA flag. This may be signaled through the aforementioned display_override_message( ).

Furthermore, other WM solutions may be provided. For example, an audio WM may be completely removed during EA. An WM extractor may interpret complete removal of the audio WM as channel change and thus all graphics can be taken down. In this case, however, a viewer cannot execute an audience measurement function. Alternatively, it is possible to prevent situations in which EA is missed according to obstruction by using the audio WM along with the video WM all the time. In this case, however, the receiver must have both video/audio WM detectors.

The illustrated WM payload structure is an audio WM payload structure for including the aforementioned EA flag. An illustrated embodiment t45010 is the aforementioned general audio WM payload structure having no EA flag. A domain_type field has a size of 1 bit and indicates whether the payload has a small domain or a large domain. Accordingly, the domain_type field can be followed by a server code and an interval code assigned bits. Ranges of the server code and the interval code according to domain types are as shown (t45060). The server code and the interval code may be followed by a 1-bit trigger flag (query flag). The query_flag can indicate whether there is dynamic event update, as described above, and a server address for obtaining a dynamic event can be delivered through a recovery file or a WM.

An illustrated embodiment t45020 may be a structure in which the payload further includes an EA flag. The EA flag has been described above. The EA flag can indicate that a burn-in EA message is currently displayed when set to 1. The EA flag can indicate that the burn-in EA message is not displayed when set to 0. When the EA flag is set to 1, the receiver can immediately stop graphic overlay and output of additional audio content.

The EA flag may be positioned after the domain_type field according to an embodiment. An illustrated embodiment t45030 may be a structure in which the EA flag replaces the domain_type field. In this case, the domain_type field does not exist and only one bit allocation configuration for the server code and the interval code can be used.

Illustrated embodiments t45040 and t45050 are tables showing payload structures including the aforementioned EA flag. They respectively represent payload structures in a small domain and a large domain. These embodiments are similar to the above-described embodiment t45020 but differ therefrom in that the EA flag is positioned after the query_flag.

FIG. 46 is a diagram illustrating a structure of an EA_message( ) according to an embodiment of the present invention.

The EA_message( ) which provides information related to EA may be delivered through a video WM. The video WM can provide a larger payload than an audio WM and thus is better for related information delivery. In addition, when the receiver detects that the wm_message_id value of the video WM is the EA_message( ) type, the receiver can stop (take down) all other overlays and return to main content. That is, the wm_message_id value may serve as the aforementioned EA flag. This may be performed through an A flag, a WM processing scheme or the display_override_message( ).

The EA_message( ) is one of the aforementioned WM messages. The EA_message( ) may have various structures according to embodiments. The EA_message( ) may be called an EA message according to context.

An EA_message( ) according to an illustrated embodiment t46010 may include a CAP_message_ID_length field, a CAP_message_ID field, a CAP_message_url_length field, a CAP_message_url field, an expires field, a urgency field and/or a severity_certainty field.

The CAP_message_ID_length field can indicate the length of the CAP_message_ID field.

The CAP_message_ID field can indicate the ID of a CAP (Common Alerting Protocol) message provided through the CAP_message_url field. This field may have the same value as the ID field in the CAP message.

The CAP_message_url_length field can indicate the length of the CAP_message_url field.

The CAP_message_url field can indicate a URL through which the corresponding CAP message can be acquired.

The expires field can indicate the latest expiration date among expiration dates of info elements of the corresponding CAP message. This can be represented on the basis of TAI (International Atomic Time).

The urgency field can indicate that urgency of a most urgent info element of the corresponding message is "immediate" when set to 1 and can be set to 0 in other cases.

The severity_certainty field may be a code value derived from certainty and severity information of the corresponding CAP message. The certainty information can indicate which one of "unknown"/"unlikely", "possible", "likely" and "observed" corresponds to certainty of a corresponding emergency. The severity information can indicate which one of "unknown"/"minor", "moderate", "severe" and "extreme" corresponds to severity of corresponding emergency.

An EA_message( ) according to an illustrated embodiment t46020 may include an EA_present_flag field, an EA_present_version field, an EA_message_ID field, an EA_message_version field, an EA_message_text_length field and/or an EA_message_text field. The EA_message( ) may further include an EA_rich_media_length field and/or an EA_rich_media_url field according to an embodiment.

The EA_present_flag field can indicate whether a wake_up bit on physical layer signaling has been activated. This field can indicate that the wake_up bit has been activated, that is, EA exists when set to 1 and indicate that the wake-up bit is deactivated, that is, EA does not exist when set to 0.

The EA_present_version field can indicate a version number of the wake-up bit. This may have a format defined in physical layer signaling. The EA_message_ID field can indicate the ID of a corresponding EA message. This may be the same as the aforementioned CAP_message_ID. The EA_message_version field can indicate the version of the corresponding EA message. The EA_message_text_length field can indicate the length of the EA_message_text field. The EA_message_text field can provide a banner text value of the corresponding EA message. The EA_rich_media_length field can indicate the length of the EA_rich_media_url field.

The EA_rich_media_url field can provide a URL through which rich media related to the corresponding EA message. Rich media may refer to media content including video and audio which represent emergency information of the corresponding EA message.

The EA_message( ) according to an illustrated embodiment t46030 may include an EA_present_flag field, an EA_present_version field, a CAP_message_ID field, a CAP_message_version field, a CAP_message_url_length field, a CAP_message_url field and/or an EA_message_overlay_area field.

The EA_present_flag field and the EA_present_version field have been described above. The CAP_message_ID field, the CAP_message_version field, the CAP_message_url_length field and the CAP_message_url field may be the same as the aforementioned EA_message_ID field, EA_message_version field, EA_message_url_length field and EA_message_url field.

The EA_message_overlay_area field can indicate an overlay area occupied by a burn-in EA message on a receiver screen. For example, this field can provide two positions of an upper left position and a lower right position to indicate a rectangular area covered by a burn-in banner. This field may also be included in EA messages in different forms from the embodiment t46030 as necessary.

An EA_message( ) according to an illustrated embodiment t46040 may include an EA_present_flag field, an EA_present_version field, an EA_message_ID field, an EA_message_version field, an EA_message_text_length field, an EA_message_text field, an EA_rich_media_url_length field, an EA_rich_media_url field, an EAT_server_url_length field, an EAT_server_url field and/or an EAM_position field.

The EA_present_flag field, the EA_present_version field, the EA_message_ID field, the EA_message_version field, the EA_message_text_length field, the EA_message_text field, the EA_rich_media_url_length field and the EA_rich_media_url field have been described above.

The EAT_server_url_length field can indicate the length of the EAT_server_url field.

The EAT_server_url field can indicate a URL for acquiring an EAT (Emergency Alert Table). The EAT may be a signaling table which provides information related to one or more EAs.

The EAM_position field can be the same as the aforementioned EA_message_overlay_area field.

FIG. 47 is a diagram illustrating an audio WM payload structure according to another embodiment of the present invention.

A DE (Dynamic Event) flag may be added to the aforementioned WM payload structure. This WM payload structure may be an audio WM payload structure. The DE flag can indicate presence of absence of a dynamic event.

A broadcaster can indicate that there is a new event that needs to be acquired by the receiver through an MVPD in real time. Upon acquisition of the DE flag, the receiver can recognize presence of the new dynamic event. In addition, the receiver can access an event server to recognize whether an event message for the corresponding event can be acquired. The receiver may already know the address of the event server through a recovery file or a WM.

An illustrated embodiment t47010 may be a structure in which the payload further includes the DE flag. The DE flag has been described above. When the DE flag is set to 1, the receiver can request an event message for the corresponding event from the event server. Accordingly, the receiver can acquire the event message. That is, the receiver can immediately stop all graphic overlays and additional audio content.

The DE flag may be positioned after the domain_type field according to an embodiment. The DE flag may serve as the aforementioned query_flag according to an embodiment. In this case, the DE flag is not used and thus is omitted in the WM payload structure and only the query_flag can be used. Here, only the domain_type field, the server code field, the interval code field and the query_flag field can be included in the WM payload. When the query_flag indicates whether supplementary content (recovery file) has been updated, the query_flag and the DE flag may simultaneously exist according to an embodiment.

Illustrated embodiments t47020 and t47030 are tables showing payload structures including the DE flag. They respectively show payload structures in a small domain and a large domain. These embodiments are similar to the aforementioned embodiment t47010 but differ therefrom in that the DE flag is positioned after the query_flag.

FIG. 48 is a diagram illustrating a structure of a dynamic_event_message( ) according to an embodiment of the present invention.

A dynamic event or an event may be delivered to the receiver through various methods. First, whether a dynamic event is available through query_flag information of an audio WM is checked and then the receiver sends a query to a server and receives an event message. The event message may be a message which provides event signaling with respect to the corresponding dynamic event. The event message may be the same as the dynamic_event_message( ) which will be described below or may have a similar format thereto.

Further, the dynamic_event_message( ) may be delivered to the receiver as one of WM messages of a video WM payload. As described above, the dynamic_event_message( ) is one of WM messages and can be fragmented into WM message blocks and delivered to the receiver.

The dynamic_event_message( ) is one of the aforementioned WM messages. The dynamic_event_message( ) may have various structures according to embodiments. The dynamic_event_message( ) may be called an event message according to context.

A dynamic_event_message( ) according to an illustrated embodiment t48010 may include a delivery_protocol_type field, a scheme_id_uri_strlen field, a scheme_id_uri_string field, a value_strlen field, a value_string field, a timescale field, a presentation_time field, a presentation_time_ms field, a duration field, an id field, a data_length field, a data field, a reserved1_field_length field and/or a reserved1 field.

The delivery_protocol_type field can indicate a delivery protocol of a broadcast service to which the corresponding dynamic event is applied. This field can indicate a ROUTE/DAH protocol or an MMT protocol.

The scheme_id_uri_strlen field can indicate the length of the scheme_id_uri_string field.

The scheme_id_uri_string field can indicate schemeIdUri information of an event stream of the corresponding event. This information may be used to identify an application related to the corresponding event according to an embodiment.

The value_strlen field can indicate the length of the value_string field.

The value_string field can indicate value information of an event stream of the corresponding event. This field can indicate actual values of parameters defined according to the aforementioned schemeIdUri information.

The timescale field can indicate a timescale for an event stream of the corresponding event.

The presentation_time field can indicate a presentation time of the corresponding event. This time can be represented on the basis of TAI.

The presentation_time_ms field may be an offset in milliseconds based on the presentation_time. This field can have values in the range of 0 to 999. Accordingly, a correct actual presentation time of an event can be indicated in milliseconds through calculation of presentation_time+(presentation_time_ms/1000).

The duration field can indicate the duration of the corresponding event. This may be represented in the aforementioned timescale unit.

The id field can indicate the ID of the corresponding event.

The data_length field can indicate the length of the data field.

The data field can indicate data necessary to respond to the corresponding event. This field may be omitted when such data is not necessary.

The reserved1_field_length field can indicate the length of the reserved1 field. The reserved1 field may be a space reserved for future use.

A dynamic_event_message( ) according to an illustrated embodiment t48020 may be modified from the dynamic_event_message( ) according to the aforementioned embodiment t48010.

In this embodiment, when service delivery is performed according to the ROUTE/DASH protocol depending on a value of the delivery_protocol_type, the dynamic_event_message( ) may further include an MPD_id_length field, an MPD_id field, a period_id_length field and/or a period_id field. When service delivery is performed according to the MMT protocol, the dynamic_event_message( ) may further include an asset_id_length field, an asset_id field and/or an MPU_seq_num field. Further, the meaning of the presentation_time field may be changed and the presentation_time_ms field may be omitted according to an embodiment.

The presentation_time field can indicate a presentation time of the corresponding event. This can be represented according to timescale. The presentation_time field differs from the aforementioned presentation_time field in that the former indicates a presentation time as a value relative to a presentation time of a specific data unit on the basis of the specific data unit instead of indicating the presentation time on the basis of TAI.

When a service is delivered according to the ROUTE/DASH protocol, a presentation time can be indicated on the basis of a start time of a DASH period. An MPD may include a plurality of period elements. The DASH period which is a basis can be referenced by an MPD ID and a period ID which will be described below.

When a service is delivered according to the MMT protocol, a presentation time can be indicated on the basis of a start time of an MMT MPU (Media Processing Unit). An asset of the MMT can sequentially include a plurality of MPUs. An MPU which is a basis can be referenced by an asset ID and an MPU sequence number value which will be described below.

The MPD_id_length field can indicate the length of the MPD_id field in bytes. The MPD_id field can identify an MPD including the aforementioned period which is a basis.

Here, the period which is a basis refers to a period which provides a reference timeline of the corresponding event.

The period_id_length field can indicate the length of the period_id field in bytes. The period_id_length field can identify the aforementioned period which is a basis within the MPD identified by the MPD_id field.

The asset_id_length field can indicate the length of the asset_id field in bytes. The asset_id field can identify an asset including the aforementioned MPU which is a basis. Here, the MPU which is a basis refers to an MPU which provides a reference timeline of the corresponding event.

The MPU_seq_num field can identify the aforementioned MPU which is a basis within the asset identified by the asset_id field.

FIG. 49 is a diagram illustrating a format of a recovery file according to an embodiment of the present invention.

Watermark segments refer to continuously marked intervals of content. Here, "marked" means "watermark-inserted". Such intervals may include WM payloads in neighboring cells. WM payloads embedded in neighboring cells may have the same server code value and also have sequentially increasing interval code values.

A query_flag value may be changed between neighboring WM payloads within one WM segment. This change can indicate whether a dynamic event is available in a server, as described above. Change of the query_flag value in neighboring WM payloads of one WM segment can indicate that a dynamic event is available in a dynamic event server.

A recovery process will be described.

Redistribution setting refers to a situation in which a device receives TV audio/video content from a certain input (input source). That is, redistribution setting may be a situation in which the device does not directly access broadcast streams from which the TV audio/video content is derived. Here, the input may refer to an HDMI cable or a set-top box, for example. For example, a situation in which the device receives TV content from a cable, a satellite, an IPTV set-top box or the like may be a redistribution situation.

The recovery process refers to a process through which a device in redistribution setting accesses supplementary content through broadband. Here, supplementary content can be provided by a broadcaster of broadcast content received through a cable or the like.

One of recovery processes which can be performed by a device in redistribution setting may be performed when the device receives an audio WM from received content or receives a vpl message within a video WM. Another recovery process may be performed when the device receives a full set of video WMs from received content.

A method of acquiring signaling information using an audio WM will be described.

A device (receiver) may perform an HTTP request to a well-known server. This request can be performed using a server code and an interval code of an audio WM as a part of a URL for the request.

The device can receive a recovery file as a response to the request. The recovery file may include original presentation time information of content at the beginning of the audio WM, information about a currently viewed service, and URL information which can be used to acquire a set of signaling files. These signaling files may be signaling files necessary to present and access supplementary content. These signaling files can be current from the date and time of the audio WM.

The device can acquire the set of the signaling files. The files may include an MPD, an AIT, an EMT, an AEI, and the like.

The device can access supplementary content using the signaling files and present the same. In this process, the time information of the recovery file can be used for synchronization between the supplementary content and audio/video received from a cable.

Each signaling file may have a "valid from" attribute, a "valid until" attribute and/or a "next URL" attribute related thereto. The "valid from" attribute and/or the "valid until" attribute define valid intervals of the corresponding signaling file. The "next URL" attribute indicates the URL of the corresponding signaling file of the scheduled next version. The device can acquire scheduled update of the corresponding signaling file as necessary through the attributes.

The query flag of the audio WM can be used to signal availability of an event. When such signaling is detected, the device can request the corresponding event using the URL of the dynamic event server optionally provided through the recovery file.

Alternatively, the device can be connected to a Web Socket server to receive a dynamic event. In this case, connection can be performed using a WebSocket server URI which can be optionally provided through the recovery file.

Such an event may be intended for an application being executed in a run-time environment. Further, the event may signal availability of unscheduled update for a signaling file. In the former case, the device can allow the corresponding event to be available in applications in which a callback routine is registered through a general method. In the latter case, the event may include URLs of updated signaling files and the device can acquire the updated signaling files through the URLs.

If the audio WM disappears, the device can stop presentation of supplementary and secondary content because the device may interpret disappearance of the audio WM as channel change to a new service which does not provide supplementary content.

When the server field of the audio WM is changed or interval fields are not consecutive, the device can stop presentation of supplementary and secondary content. Further, the device may request a new recovery file and newly start a recovery process.

According to an embodiment, in the case of the ROUT/ DASH service, the presentation time of the recovery file may be relative to the media presentation timeline of the current MPD of the service. In the case of the MMT service, the presentation time of the recovery file may be an NPT (Non-Productive Time). The presentation time may be represented as TAI irrespective of the transport protocol according to an embodiment.

A method of acquiring signaling information using a video WM will be described below.

Here, although description is based on the assumption that media time information is delivered in a channel ID WM message, the media time information may be delivered in a content ID WM message or the aforementioned presentation_time_message( ) according to an embodiment. The media time information may need to appear through a WM payload at least once per 1.5 seconds.

A device can acquire a channel ID message and a WM message having media time information through video WMs. In addition, the device can acquire signaling URIs through the uri_message( ) of a video WM.

The device can acquire signaling files using the obtained signaling URLs. The signaling files may have a multi-part MIME message form. This method may be the same as the method of using a signaling URL of a recovery file acquired using an audio WM.

The device can access supplementary content using the signaling files and present the same. In the process, the time information of the recovery file can be used for synchronization between the supplementary content and audio/video received from a cable.

Each signaling file may have a "valid from" attribute, a "valid until" attribute and/or a "next URL" attribute related thereto. The "valid from" attribute and/or the "valid until" attribute define valid intervals of the corresponding signaling file. The "next URL" attribute indicates the URL of the corresponding signaling file of the scheduled next version. The device can acquire scheduled update of the corresponding signaling file as necessary through the attributes.

Dynamic events may appear in a dynamic event WM message of a video WM. Such events may be intended for applications being executed in a run-time environment. Furthermore, the events may signal availability of unscheduled update for a signaling file. In the former case, the device can allow the corresponding event to be available in applications in which a callback routine is registered through a general method. In the latter case, the event may include URLs of updated signaling files and the device can acquire the updated signaling files through the URLs. The signaling files may have the same format as files acquired using signaling URLs. That is, they can have the "valid from" attribute, "valid until" attribute and/or "next URL" attribute.

Whenever the video WM disappears for an interval of 1.5 seconds, the device can stop presentation of supplementary content because the device may interpret disappearance of the video WM as channel change to a new service which does not provide supplementary content.

Whenever a WM payload having a channel ID WM message disappears for an interval of 1.5 seconds or when the WM payload appears with a new BSID-channel number combination or a media time has discontinuity, the device can stop presentation of supplementary content. In addition, the device can newly start a signaling acquisition process.

According to an embodiment, in the case of the ROUTE/ DASH service, a presentation time provided through the video WM may be relative to the media presentation timeline of the current MPD of the service. In the case of the MMT service, the presentation time may be an NPT (Non-Productive Time). The presentation time may be represented as TAI irrespective of the transport protocol according to an embodiment.

A recovery file format according to the illustrated embodiment will be described. A recovery file may be supplementary content which is delivered from a server upon request using the aforementioned WM information. The recovery file may be called recovery data.

The recovery file may have a JSON format or an XML format according to an embodiment. There may be a unique recovery file for each vpl WM message (vpl payload) according to an embodiment.

The recovery file according to the illustrated embodiment may include a thisComponent element, a querySpread element, an otherComponent element, a contentID element, a sourceID element and/or a service element.

The thisComponent element may include information about a media component in which a vpl payload carrying a serverCode and an intervalCode is detected. This element may include a serverCode field, an intervalCode field and/or a componentDescription field.

The serverCode field can indicate a server code value used for query for the corresponding recovery file. The intervalCode field can indicate an interval code value used for query for the corresponding recovery file. The componentDescription field can include a component description of a service component indicated by the thisComponent element.

The querySpread element can indicate a time for which a device can query the dynamic event server. This information may be intended for distributing queries of devices.

The otherComponent element can include information about components carrying a matching vpl payload which are audio/video components other than the current component indicated by the thisComponent element. For example, when the current component (component represented by the thisComponent element) is an audio component and has a specific vpl payload, the otherComponent element can describe video components including linked video WMs having the same vpl payload.

The contentID element can indicate a content ID. For example, this element can refer to an ID of content in which the corresponding WM is detected. This element may include a type field, a cid field, a validFrom field and/or a validUntil field.

The type field can indicate whether the corresponding content ID is an EIDR type or an Ad-ID type. The cid field can include an EIDR type content ID or an Ad-ID type content ID according to indicated type. That is, this field can include a content ID. The validFrom field can indicate a start point from which a content ID is valid. The validUntil field can indicate a last point at which the content ID is valid.

The sourceID element can indicate an ID of a service/content source. This element may include a country field, a bsid field, a majorChannelNo field and/or a minorChannelNo field.

The country field can indicate a country code related to an administrative entity assigned a corresponding BSID. The bsid field can indicate the ID of the entire broadcast stream. The majorChannelNo field and the minorChannelNo field can indicate major/minor channel numbers of the corresponding service.

The service element can indicate information about the corresponding service. For example, this element can include information about a service in which the corresponding WM is detected. This element may include a serviceId field, an sltSveSeqNum field, an slsProtocol field, an slsMajorProtocolVersion field, an slsMinorProtocolVersion field and/or an svcInetUrl field.

The serviceId field can indicate the ID of the corresponding service. The ID may be unique in a BSID scope. The sltSveSeqNum field can indicate the version of service information in the corresponding table. The value of this field can increase for each new version of service information in the recovery file. The slsProtocol field can indicate a transport protocol used to deliver service layer signaling (SLS) of the corresponding service. The slsMajorProtocolVersion field and the slsMinorProtocolVersion field can indicate major/minor version numbers of a transport protocol used to deliver SLS of the corresponding service. The svcInetUrl field can include URL related information for acquiring a signaling file of the corresponding service. This element may include a urlType field and/or a urlValue field. The urlType field can indicate the type of an included URL. Types of URLs which can be included may include a signaling server for SLS delivery, an EGS server for ESG delivery, a usage reporting server, and a dynamic event HTTP server/WebSocket server for dynamic event delivery.

The urlValue field can include URL information for accessing the signaling file of the corresponding service.

FIG. 50 is a diagram illustrating a recovery file format according to another embodiment of the present invention.

A recovery file of the illustrated embodiment may include an @intervalCode attribute, an @anchorCode attribute, a Choice element, an @querySpread attribute, an @bsid attribute and/or a Service element.

The @intervalCode attribute is interval code information in a vpl payload (audio WM and video WM) and may be the same as the aforementioned intervalCode field.

The @anchorCode attribute can indicate an interval code used as an anchor for a presentation time. This attribute may be intended for mapping between the first vpl payload of WM segments and a presentation time thereof.

The Choice element can provide presentation time related information. This element may include an @mpdPresentationTime attribute and/or an @mmtPresentationTime attribute.

The @mpdPresentationTime attribute can indicate an MPD presentation time corresponding to the @anchorCode. This may be intended to indicate the presentation time of an MPD which is a basis for presentation time. This attribute may further include an @mpdId attribute. This attribute may be an ID for identifying an MPD which is a basis of timeline.

The mmtPresentationTime attribute can indicate an MMT presentation time corresponding to the @anchorCode. This can be represented as a 64-bit NTP. The @querySpread attribute may be the same as the aforementioned querySpread field. The @bsid attribute may be the same as the aforementioned bsid field.

The Service element indicates service related information and may be the same as the aforementioned Service element. This element may include an @serviceId attribute, an @serviceInfoVersion attribute, an @protected attribute, an @majorChanNum attribute, an @minorChanNum attribute, an @serviceCategory attribute, an @serviceName attribute, an @slsProtocolType attribute, an @slsProtocolVersion attribute, an @serviceLanguage attribute, an @serviceCapabilities attribute, an @signalingUri attribute, a choice element and/or an @esgUri attribute.

The @serviceId attribute is a service ID and may be the same as the aforementioned serviceId field. The @serviceInfoVersion attribute is a version of service information and may be the same as the aforementioned sltSvcSeqNum field. The @protected attribute indicates that access of at least one essential component of a service is controlled when set to "true" and is set to "false" in other cases. The @majorChanNum attribute and the @minorChanNum attribute may be the same as the aforementioned majorChannelNo field and the minorChannelNo field.

The @serviceCategory attribute can indicate a service category of the corresponding service. This attribute can indicate a linear A/V service when set to 0x01, a linear audio service (audio only) when set to 0x02, and an app-based service when set to 0x03. Other values may be reserved for future use. The @serviceName attribute can indicate the service name of the corresponding service. The @slsProtocolType attribute may be the same as the aforementioned slsProtocol field. The @slsProtocolVersion attribute is the sum of the aforementioned slsMajorProtocolVersion field and slsMinorProtocolVersion field and can indicate a version number of a transport protocol used to deliver SLS of the corresponding service. The @serviceLanguage attribute can indicate a predominate language in the corresponding service.

The @serviceCapabilities attribute can indicate capabilities necessary for significant rendering of the corresponding service. This can be represented by a capability code according to an embodiment. The @signalingUri attribute can indicate the URL of a signaling server for acquiring signaling files.

The choice element may include an @eventSocketUri attribute and/or an @eventRequestUri attribute. The former can include URI information for web socket connection for dynamic events and the latter can include a URI for a request of a dynamic event. The @esgUri attribute can include the URL of an ESG server for ESG delivery.

A device knows the present wall clock time at the beginning of an audio WM and a wall clock interval between interval codes (1.5 seconds). Accordingly, the @MPDpresentationTime field can provide mapping between an MPD presentation timeline and a local time (wall clock in the device) to the device in a service based on ROUTE/DASH. The @MMTpresentationTime field can provide an offset between an NPT presentation timeline of content and a local time (wall clock in the device) to the device in a service based on MMT.

Accordingly, supplementary content can be synchronized with audio/video from an MVPD in the aforementioned cases. Such synchronization can be performed by switching the presentation time of supplementary content derived from an MPD or MMT signaling to a local wall clock time.

The aforementioned slsProtocol field and @slsProtocolType attribute can indicate that the ROUTE protocol is used when set to 0x01 and indicate that the MMT protocol is used when set to 0x02. Other values may be reserved for future use.

The 4 MSBs (Most Significant Bits) of the @slsProtocolVersion attribute can indicate a major protocol version of the ROUTE protocol indicated by the @slsProtocolType attribute. The 4 LSBs (Least Significant Bits) of the @slsProtocolVersion attribute can indicate a minor protocol version of the ROUTE protocol indicated by the @slsProtocolType attribute. Here, the major version number may be 0x01 and the minor version number may be 0x0 according to an embodiment.

When the @signalingUri attribute is used to request combined sets of signaling files, the signaling files can be delivered in the form of a multi-part MIME message. The MIME message can include a metadata envelope which references all files of combined sets. The metadata envelope may be followed by signaling files in the order of referencing by the metadata envelope. That is, a file itself may not be encapsulated.

When an item element of the metadata envelope does not include a validUntil attribute, this represents that the corresponding file does not have a scheduled expiration date/time. When the item element of the metadata envelope includes the validUntil attribute, this attribute can include a nextUrl sub-element. The nextUri sub-element can provide a URL for the next version of the corresponding file. That is, a URL for a file of a version valid after scheduled expiration of the current file can be provided. The validUntil attribute can indicate a value relative to the current MPD and NPT timeline according to an embodiment.

When the @eventRequestUri attribute is used for query of a dynamic event, the query can include a media presentation time as a query term. The media presentation time may correspond to a local time indicated by the query flag as a time when the dynamic event is available. In the case of a ROUTE/DASH based service, the @eventRequestUri attribute may further include MPD ID information. The MPD ID can form a presentation timeline reference for a presentation time.

When the @eventSocketUri attribute is used to set up a connection for a dynamic event, a query can also include a media presentation time as a query term. The presentation time may correspond to a local time at which the query is performed.

The event acquired through the query may have the form of the aforementioned event WM message according to an embodiment.

When the @esgUri is used for query of ESG data, a query language can be defined in a form conforming to OMA BCAST service guide standards.

Figure 51:
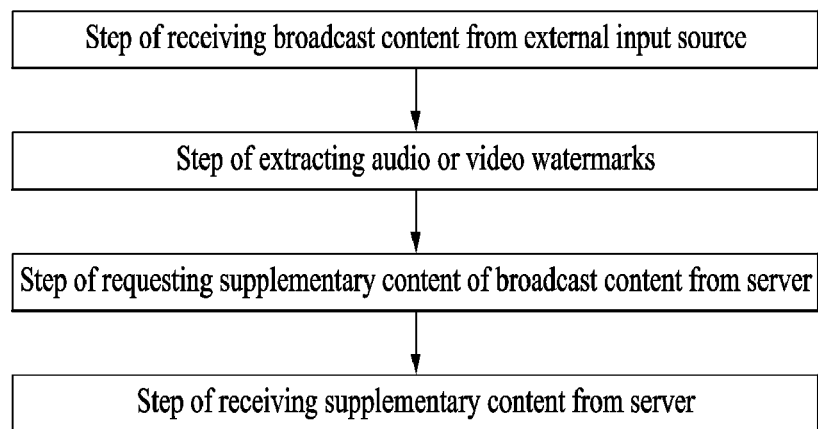
FIG. 51 is a diagram illustrating a broadcast content processing method according to an embodiment of the present invention.

FIG. 51 is a diagram illustrating a broadcast content processing method according to an embodiment of the present invention.

The broadcast content processing method according to an embodiment of the present invention may include a step of receiving broadcast content from an external input source, a step of extracting audio or video watermarks from the broadcast content, a step of requesting supplementary content of the broadcast content with a URL generated from watermarks and/or a step of acquiring the supplementary content from a server.

A reception unit of a receiver can receive broadcast content from an external input source. Here, the external input source may refer to an MVPD such as an STB, a cable or a satellite. The broadcast content is derived from broadcast streams and may be uncompressed AV content. The broadcast content may include audio and/or video components, and audio WMs and video WMs may be embedded in the components. Broadcast streams may be received by the external input source according to the ROUTE protocol or the MMT protocol. Details have been described above.

An extractor of the receiver can extract at least one of the audio WMs and the video WMs from the broadcast content. A network interface of the receiver can request supplementary content from a specific server with a URL generated from the audio or video WMs. The supplementary content is related to the broadcast content and has been described in detail above. The supplementary content may correspond to the aforementioned recovery file. The URL may be derived from a server code or a server URL information of a WM payload, or a uri_message( ) of the video WM. The network interface can acquire the supplementary content from the server. The audio/video WMs can be used for delivery of auxiliary data related to the broadcast content.

In the present embodiment, one of the video watermarks can include a payload having a fragment of a first message. Here, the first message may correspond to the aforementioned vp1 WM message. Here, the fragment of the first message is a fragment of the aforementioned vp1 WM message or vp1 payload and may correspond to a vp1 WM message block. The first message can include domain type information, server information and/or interval information. This information can correspond to the aforementioned domain type information, server code and interval code.

In a broadcast content processing method according to another embodiment of the present invention, the domain type information can specify an information type of the first message, the server information can identify a server for supplementary content acquisition, and the interval information can identify an interval of a video component in which video WMs are embedded. Such information has been described in detail above.

In a broadcast content processing method according to another embodiment of the present invention, one of the audio watermarks can include a payload having the same information as the first message. That is, an audio WM and a video WM can be linked to include a vp1 payload having the same information according to an embodiment. The first message, that is, one fragment of the vp1 payload can be delivered by the aforementioned video WM. The audio watermark can be time-aligned with the video watermark having the fragment of the first message. Linkage between audio/video WMs has been described in detail above.

In a broadcast content processing method according to another embodiment of the present invention, the first message may further include query information which signals when event signaling is available from a server. The query information can signal whether event signaling is available from a server. The query information may correspond to the aforementioned query_flag. Event signaling can correspond to the aforementioned event information which initiates operation of an application.

A broadcast content processing method according to another embodiment of the present invention may further include a step of requesting a first event message for event signaling of a first event from a server using the query information, and a step of receiving the first event message from the server. Here, the first event may correspond to the aforementioned dynamic event. The first event message may refer to the aforementioned event WM message. The present embodiment may correspond to an embodiment of acquiring event signaling information through a request for the server using the query flag of the audio WM.

In a broadcast content processing method according to another embodiment of the present invention, the first event message may include a protocol type field, an event ID field, a time field or a data field. These fields may respectively correspond to the delivery_protocol_type field, presentation time field/presentation_time_ms field, id field and data field in the aforementioned dynamic$_{13}$ event_message( ). The protocol type field can indicate a transport protocol of a broadcast service to which the first event is applied. The event ID field can identify the first event. The time field can indicate a presentation time of the first event. Here, the presentation_time field and/or the presentation_time_ms field can be used. The data field can include data necessary for the first event.

In a broadcast content processing method according to another embodiment of the present invention, a video watermark payload may further include a fragment of the second event message for event signaling of a second event. Here, the second event may correspond to the aforementioned dynamic event. The second event message may refer to the aforementioned event WM message. Here, the video WM payload is a payload indulging a message block of the aforementioned vp1 message and may further include an event WM message block according to an embodiment. The second event message may include a protocol type field, an event ID field, a time field or a data field. These fields may respectively correspond to the delivery_protocol_type field, presentation time field/presentation_time_ms field, id field and data field in the aforementioned dynamic_event_message( ). These fields can provide signaling information about the second event. The present embodiment may correspond to an embodiment of acquiring event signaling information through an event WM message of a video WM.

In a broadcast content processing method according to another embodiment of the present invention, the supplementary content may include an interval code used to request service information and/or supplementary content. The supplementary content may correspond to the aforementioned recovery file. The service information and the interval code may correspond to the aforementioned Service element and the intervalCode field.

The service information may include an SLS (Service Layer Signaling) protocol field, an SLS protocol version field, an SLS URL field or an ESG (Electronic Service Guide) URL field. These fields may correspond to the slsProtocol field, the slsMajorProtocolVersion field, the slsMinorProtocolVersion field and the svcInetUrl field of the Service element. The SLS protocol field can indicate a transport protocol used to deliver SLS, the SLS provides service level signaling information of a broadcast service, and the SLS protocol version field can indicate the version of the transport protocol used to deliver the SLS. The SLS protocol version field may refer to the slsMajorProtocolVersion field, the slsMinorProtocolVersion field or both thereof. The SLS URL field can provide a URL for accessing the SLS of the broadcast service, and the ESG URL field can provide a URL for accessing an ESG of the broadcast service. These fields may correspond to the svcInetUrl field.

In a broadcast content processing method according to another embodiment of the present invention, at least one of video WMs may include a video WM payload, and the video WM payload may include at least one message block having the same information as an audio WM payload. As described above, the video WM payload can allocate and include a space for the audio WM payload.

In a broadcast content processing method according to another embodiment of the present invention, supplementary content may include thisComponent information and/or otherComponent information. The thisComponent information can describe information about a service component in which a WM payload used to request the supplementary content is detected. The supplementary content may be requested using server information/interval information of the WM payload. The otherComponent information can describe a component having a WM payload corresponding to the WM payload among components other than the component described by the thisComponent information. The WM payload may be a video or audio WM.

A broadcast content processing method according to another embodiment of the present invention may further include a step of recognizing that, by the extractor of the receiver, one of audio or video WMs has disappeared, and a step of extracting other WMs which have not disappeared from the corresponding component. This may be intended to recognize that a video or audio WM has disappeared and access a WM having the same payload to perform seamless normal operation when an ESG is displayed on a screen or muting is performed.

A broadcast content processing method (at a transmitting side) according to an embodiment of the present invention will be described. This method is not shown.

The broadcast content processing method (at a transmitting side) according to an embodiment of the present invention may include a step in which a service data generation module generates a broadcast service having video/audio components, a step in which a WM embedding module embeds video/audio WMs in the video/audio components, a step in which the service data generation module generates signaling information related to the broadcast service and/or a step in which a transmission unit transmits broadcast service data and signaling information to an MVPD. The broadcast content processing method may further include a step in which the service data generation module generates supplementary content with respect to the broadcast service and delivers the supplementary content to a supplementary content server and the WM embedding module embeds information related to a server and the supplementary content in a WM according to an embodiment. Transmission of the service data may be performed according to ROUTE or MMT protocol.

The broadcast content processing methods (at a transmitting side) according to embodiments of the present invention may correspond to the above-described broadcast content processing methods according to embodiments of the present invention. The broadcast content processing methods may have embodiments corresponding to the above-described embodiments of the broadcast content processing methods.

The above-described steps may be omitted or replaced by other steps performing similar/identical operations according to embodiments.

Figure 52:
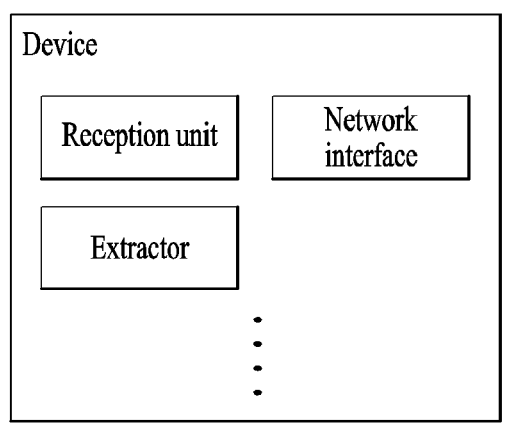
FIG. 52 is a diagram illustrating a broadcast content processing device according to an embodiment of the present invention

FIG. 52 is a diagram illustrating a broadcast content processing device according to an embodiment of the present invention.

The broadcast content processing device according to an embodiment of the present invention may include the aforementioned reception unit, extractor and/or network interface. Blocks and modules thereof have been described above. The broadcast content processing device according to an embodiment of the present invention and internal modules/blocks thereof can perform the above-described embodiments of the broadcast content processing methods of the present invention.

A broadcast content processing device (at a transmitting side) according to an embodiment of the present invention will be described. The device is not shown. The broadcast content processing device (at a transmitting side) according to an embodiment of the present invention may include the aforementioned service data generation module, WM embedding module and/or transmission unit. Blocks and modules thereof have been described above. The broadcast content processing device (at a transmitting side) according to an embodiment of the present invention and internal modules/blocks thereof can perform the above-described embodiments of the broadcast content processing methods (at a transmitting side) of the present invention.

The internal blocks/modules of the above described devices may be hardware elements provided inside/outside of the devices which perform continuous processes stored in a memory. The above-described modules may be omitted or replaced by other modules performing similar/identical operations according to embodiments.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing computer-readable recording media storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

Various embodiments have been described in the best mode for carrying out the invention.

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

What is claimed is:

1. A method processing a broadcast content, the method comprising:
    receiving a broadcast signal;
    demodulating the broadcast signal including time interleaved data, wherein the time interleaved data is interleaved by a Time interleaved (TI) block including one or more Forward Error Correction (FEC) blocks and one or more virtual FEC blocks;
    displaying a broadcast content of a broadcast service in the demodulated broadcast signal on a display screen; and
    detecting a first user input,
    in response to the first user input that is to display an Electronic Service Guide (ESG):

displaying the ESG overlaid on the broadcast content being displayed on the display, screen;
determining whether information for controlling execution of an application, that is embedded in an audio component of the broadcast content, is received; and
controlling the execution of the application based on the determination; or
in response to the first user input that indicates a mute mode to mute sound of the broadcast content:
determining whether information for controlling execution of the application, that is embedded in a video component of the broadcast content, is received; and
controlling the execution of the application based on the determination.

2. The method of claim 1, further comprising:
executing the application while displaying the broadcast content.

3. The method of claim 2, wherein controlling the execution of the application based on the determination further includes:
in response to determining that the information for controlling execution of the application is not received, immediately stopping the execution of the application so that the application is started over after the ESG disappears from the display screen; and
in response to determining that the information for controlling execution of the application is received, temporarily suspending the execution of the application so that the application is resumed after the ESG disappears from the display screen.

4. The method of claim 2, wherein controlling the execution of the application based on the determination further includes:
in response to determining that the information for controlling execution of an application is not received, immediately stopping the execution of the application so that the application is stared over after receiving a second user input to turn off the mute mode; and
in response to determining that the information for controlling execution of the application is received, temporarily suspending the execution of the application so that the application is resumed after receiving a second user input to turn off the mute mode.

5. The method of claim 1, wherein controlling the execution of the application based on the determination further includes:
in response to determining that the information for controlling execution of the application requests to execute the application which is not executed:
determining whether second information for controlling execution of the application embedded in an audio component subsequent to the audio component is received,
in response to determining that the second information for controlling execution of the application is not received, immediately executing the application with the ESG; and
in response to determining that the second information for controlling execution of the application is received, executing the application after the ESG disappears from the display screen.

6. The method of claim 1, wherein controlling the execution of the application based on the determination further includes:
in response to determining that the information for controlling execution of the application requests to execute the application which is not executed:
determining whether second information for controlling execution of the application embedded in a video component subsequent to the video component, is received,
in response to determining that the second information for controlling execution of the application is not received, immediately executing the application regardless of the mute mode; and
in response to determining that the second information for controlling execution of the application is received, executing the application after receiving the second user input to turn off the mute mode.

7. The method of claim 1, wherein the broadcast service is delivered to an external input source according to either a Real-Time Object Delivery over Unidirectional Transport (ROUTE) protocol or an MPEG Media Transport (MMT) protocol.

8. The method of claim 1, wherein the information for controlling execution of the application embedded in the audio component is same as the information for controlling execution of the application embedded in the video component.

9. The method of claim 1, wherein the application is either an audible application or a visible application.

10. A device processing a broadcast content, the device comprising:
a receiver configured to receive a broadcast signal;
a demodulator configured to demodulate the broadcast signal including time interleaved data, wherein the time interleaved data is interleaved by a Time Interleaved (T1) block including one or more Forward Error Correction (FEC) blocks and one or more virtual FEC blocks;
a display screen configured to display a broadcast content of a broadcast service in the demodulated broadcast signal;
a user interface managing processor configured to detect a first user input;
an extractor configured to extract information for controlling execution of an application embedded in an audio component of the broadcast content, and information for controlling execution of the application embedded in a video component of the broadcast content; and
a controller configured to control execution of the application, wherein:
in response to the first user input that is to display an Electronic Service Guide (ESG), the display screen is further configured to display the ESG overlaid on the broadcast content being displayed on the display screen, the extractor is configured to determine whether the information for controlling execution of the application embedded in the audio component is received, and the controller is configured to control the execution of the application based on the determination; or
in response to the first user input that indicates a mute mode to mute sound of the broadcast content, the extractor is further configured to determine whether the information for controlling execution of the application embedded in the video component is received, and the controller is configured to control the execution of the application based on the determination.

11. The device of claim 10, wherein the application is executed while displaying the broadcast content.

12. The device of claim 11, wherein:
in response to determining that the information for controlling execution of the application is not received, the controller is further configured to immediately stop the execution of the application so that the application is started over after the ESG disappears from the display screen, and in response to determining that the information for controlling execution of the application is received, the controller is further configured to temporarily suspend the execution of the application so that the application is resumed after the ESO disappears from the display screen.

13. The device of claim 11, wherein:

in response to determining that the information for controlling execution of the application is not received, the controller is further configured to immediately stop the execution of the application so that the application is stared over after receiving a second user input to turn off the mute mode, and in response to determining that the information for controlling execution of the application is received, the controller is further configured to temporarily suspend the execution of the application so that the application is resumed after receiving a second user input to turn off the mute mode.

14. The device of claim 10, wherein:

in response to determining that the information for controlling execution of the application requests to execute the application which is not executed, the extractor is further configured to determine whether second information for controlling execution of the application embedded in an audio component subsequent to the audio component, is received, in response to determining that the second information for controlling execution of the application is not received, the controller is further configured to immediately execute the application with the ESG, and in response to determining that the second information for controlling execution of the application is received, the controller is further configured to execute the application after the ESG disappears from the display screen.

15. The device of claim 10, wherein:

in response to determining that the information for controlling execution of the application requests to execute the application which is not executed, the extractor is further configured to determine second information for controlling execution of the application embedded in a video component subsequent to the video component, is received, in response to determining that the second information for controlling execution of the application is not received, the controller is further configured to immediately execute the application regardless of the mute mode, and in response to determining that the second information for controlling execution of the application is received, the controller is further configured to execute the application after receiving the second user input to turn off the mute mode.

16. The device of claim 10, wherein the broadcast service is delivered to an external input source according to either a Real-Time Object Delivery over Unidirectional Transport (ROUTE) protocol or an MPEG Media Transport (MMT) protocol.

17. The device of claim 10, wherein the information for controlling execution of the application embedded in the audio component is same as the information for controlling execution of the application embedded in the video component.

18. The device of claim 10, wherein the application is either an audible application or a visible application.

* * * * *